United States Patent [19]
Sato et al.

[11] Patent Number: 5,764,496
[45] Date of Patent: Jun. 9, 1998

[54] INVERTER DEVICE INCLUDING AN AUXILIARY POWER SUPPLY WITH A SMOOTHING CAPACITOR

[75] Inventors: Katsumi Sato; Masanori Mishima; Minoru Maehara; Kenichi Yuki, all of Kadoma, Japan

[73] Assignee: Matsushita Electric Works, Ltd., Osaka, Japan

[21] Appl. No.: 799,187

[22] Filed: Feb. 12, 1997

Related U.S. Application Data

[63] Continuation of Ser. No. 414,708, Mar. 31, 1995, abandoned.

[30] Foreign Application Priority Data

Mar. 15, 1995 [JP] Japan ................ 7-056160
Mar. 15, 1995 [JP] Japan ................ 7-056311

[51] Int. Cl.$^6$ .................................... H02M 5/458
[52] U.S. Cl. ................ 363/37; 363/34; 363/124
[58] Field of Search ................ 363/34, 37, 124, 363/131, 132

[56] References Cited

U.S. PATENT DOCUMENTS

| | | | |
|---|---|---|---|
| 4,564,897 | 1/1986 | Okamoto et al. | 363/132 |
| 4,729,088 | 3/1988 | Wong | 363/124 |
| 5,049,788 | 9/1991 | Lee | 363/132 |
| 5,182,702 | 1/1993 | Hiramatsu et al. | 363/132 |
| 5,224,025 | 6/1993 | Divan et al. | 363/34 |
| 5,251,119 | 10/1993 | Maehara | 363/37 |
| 5,274,540 | 12/1993 | Maehara | 363/37 |
| 5,331,534 | 7/1994 | Suzuki et al. | 363/34 |
| 5,408,403 | 4/1995 | Nerone et al. | 363/37 |
| 5,410,466 | 4/1995 | Maehara | 363/132 |
| 5,459,651 | 10/1995 | Maehara | 363/37 |
| 5,517,403 | 5/1996 | Maehara | 363/132 |

FOREIGN PATENT DOCUMENTS

| | | | |
|---|---|---|---|
| 0617567 | 9/1994 | European Pat. Off. | H05B 41/29 |
| WO9009087 | 8/1990 | WIPO | H05B 41/29 |

*Primary Examiner*—Jeffrey L. Sterrett
*Attorney, Agent, or Firm*—Leydig, Voit & Mayer, Ltd.

[57] ABSTRACT

An inverter device includes a rectifier for rectifying an AC voltage produced by an A.C. power source; an inverter circuit receiving a first DC output voltage and outputting a high frequency voltage for operating a load circuit; and auxiliary power supply means including a smoothing capacitor connected across the rectifier for smoothing current supplied to the load circuit, wherein the inverter circuit includes DC/DC converter receiving the first DC output voltage, for outputting a second DC output voltage less than a peak value of the first DC output voltage, and DC/AC converter receiving the second DC output voltage for outputting the high frequency voltage, the DC/DC converter and DC/AC converter sharing a common switching element, the DC/AC converter receiving a DC voltage less than the voltage produced by the A.C. power source.

21 Claims, 77 Drawing Sheets

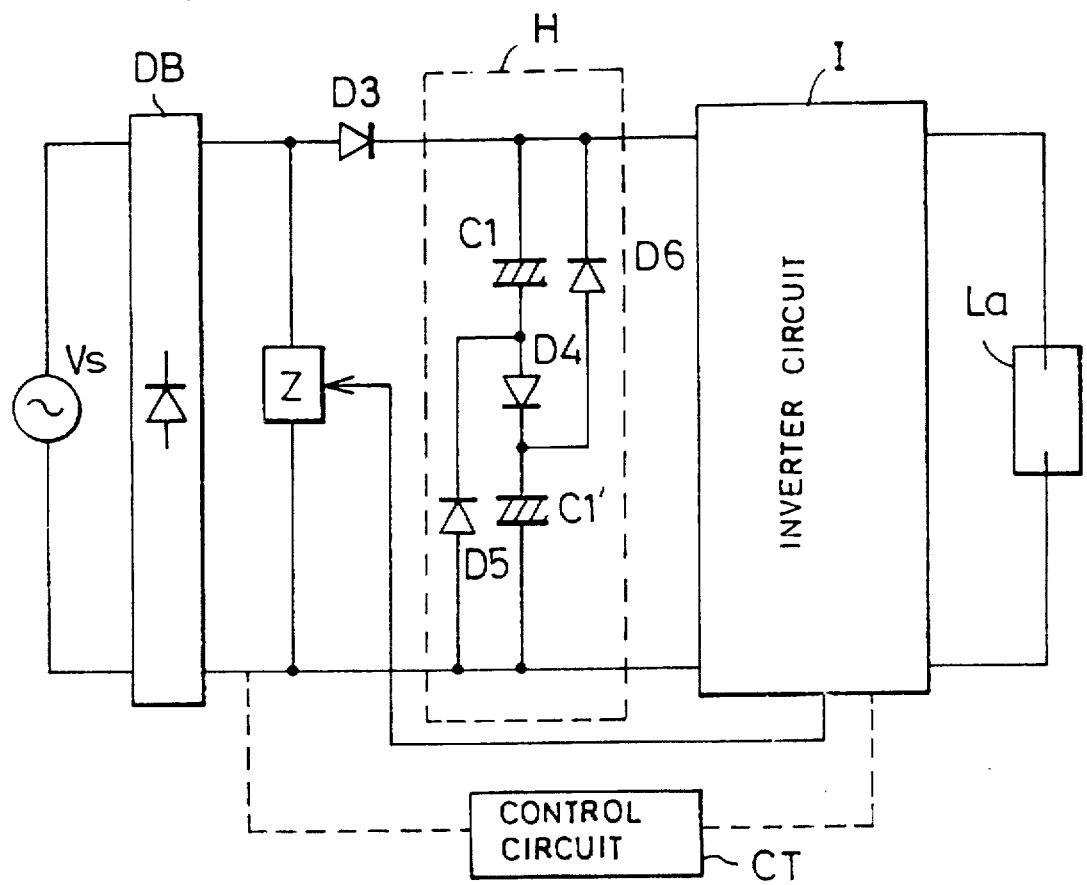

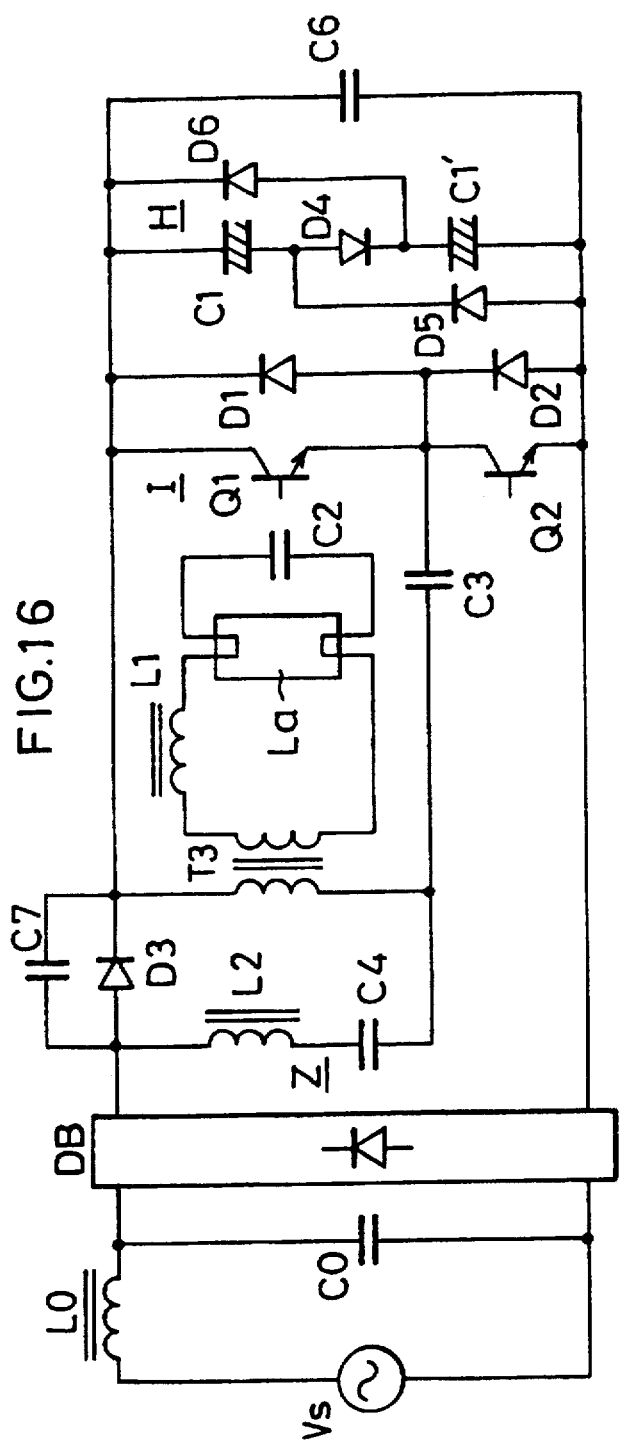
FIG.16
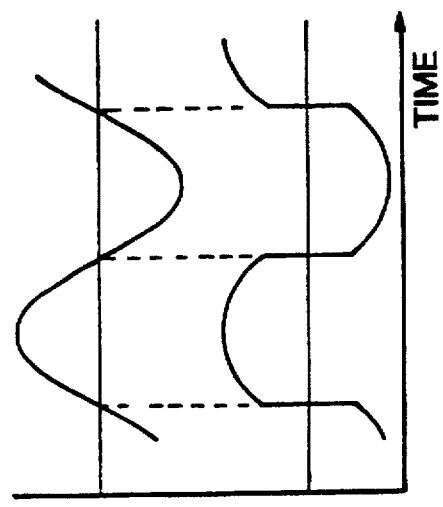
FIG. 17(a)
FIG. 17(b)

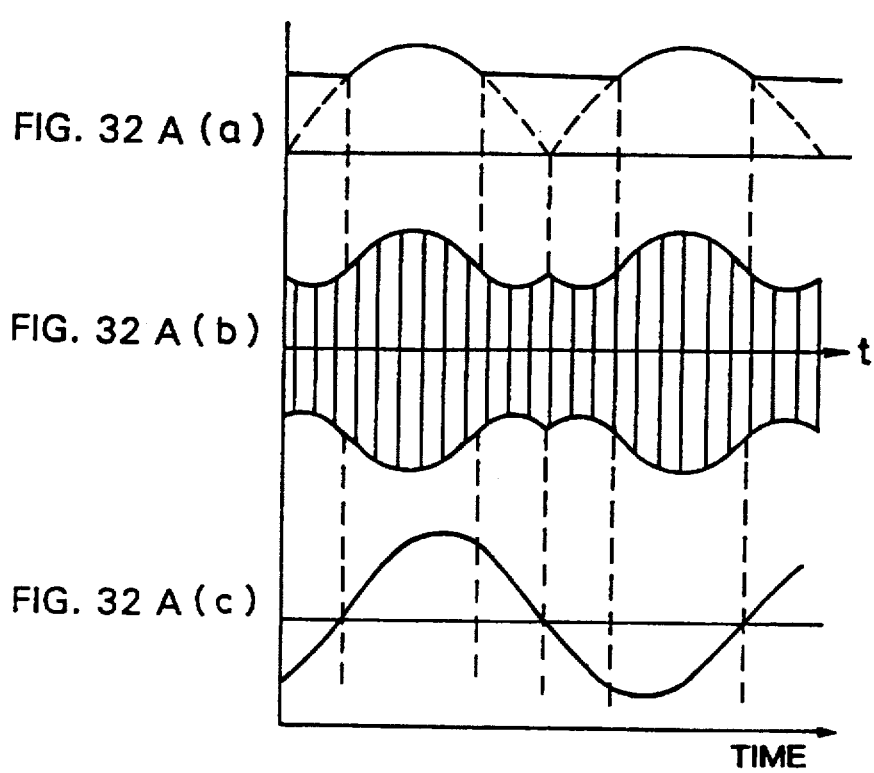
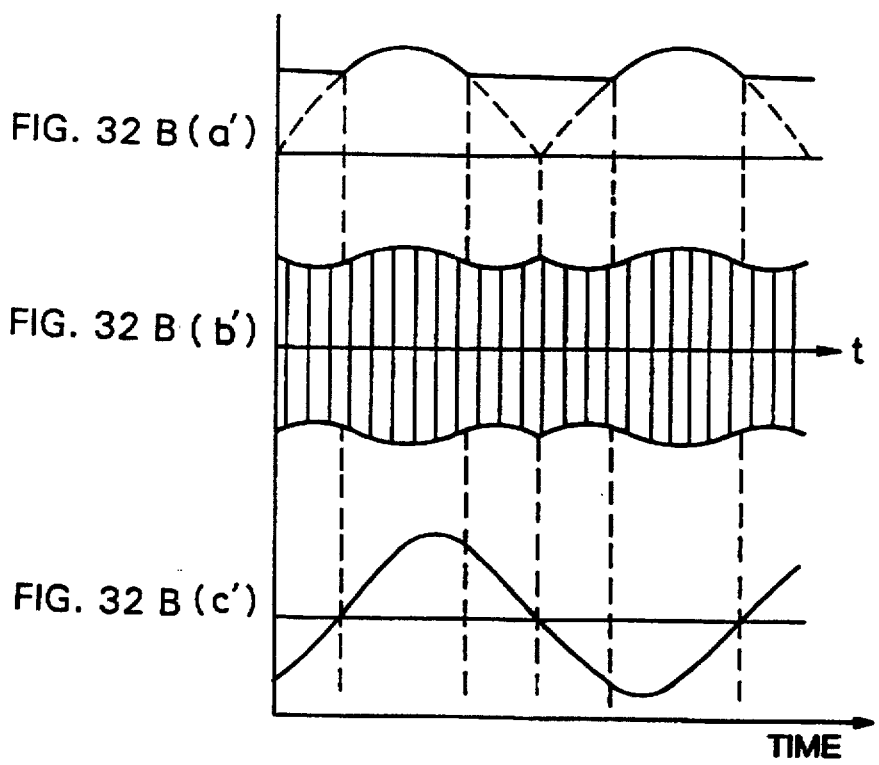

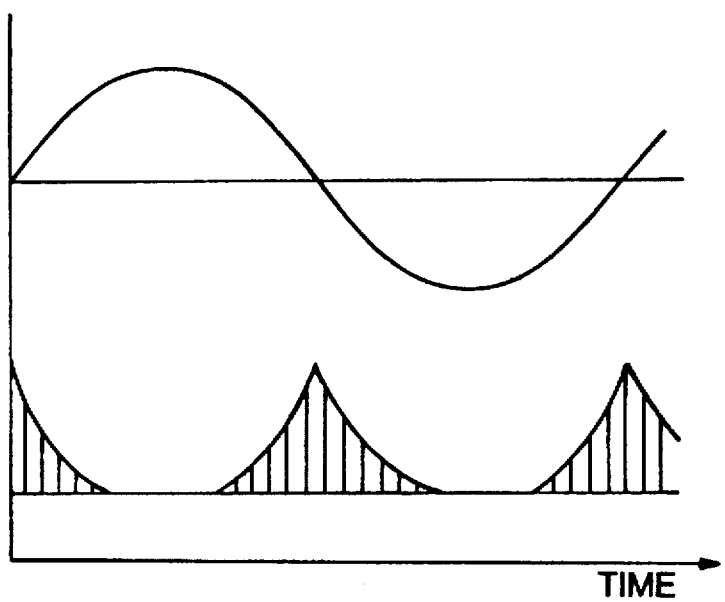
FIG. 33(a)
FIG. 33(b)
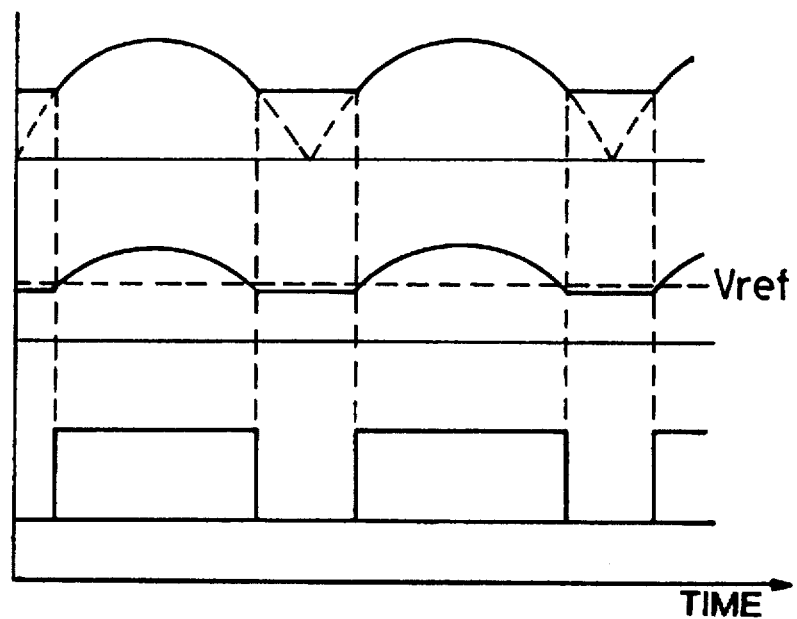
FIG. 36(a)
FIG. 36(b)
FIG. 36(c)

INVERTER DEVICE INCLUDING AN AUXILIARY POWER SUPPLY WITH A SMOOTHING CAPACITOR

This disclosure is a continuation of patent application Ser. No. 08/414,708, filed Mar. 31, 1995 now abandoned.

BACKGROUND OF THE INVENTION

The present invention relates to an inverter device which converts DC power obtained by rectifying and smoothing power of an A.C. power source into high frequency power and supplies the high frequency power to a load circuit.

DESCRIPTION OF RELATED ART

In one of known inverter devices which generally use a multiplicity of inverter circuits, an inverter circuit is connected directly to DC output ends of a full-wave rectifier. In this case, a pulsative output voltage of the full-wave rectifier is applied to the inverter circuit so that, when one of transistors in the inverter circuit is turned ON, a current flows through a path of the full-wave rectifier, transistor, inductor, capacitor and discharge lamp and again to the full-wave rectifier; whereas, when the transistor is turned OFF, the energy stored in the capacitor is discharged as a power supply so that a current flows through the capacitor, the inductor, transistor and discharge lamp and again to the capacitor.

With this arrangement, the input current of the full-wave rectifier can have a sinusoidal waveform with less harmonics components.

Through the above operation, the input current can have a waveform close to a sinusoidal waveform with less harmonics components. However, in this case, since the voltage of the power source is applied directly to the switching element, there occurs a problem that a current flowing through the discharge lamp has a zero period therein with a bad light emission efficiency.

In the arrangement of another prior art, further, a smoothing capacitor is connected to D.C. output ends of a full-wave rectifier so that an input voltage to an inverter circuit becomes substantially constant throughout its full period because the input voltage is smoothed by the capacitor. Further, since an envelope of a current flowing through a discharge lamp La becomes substantially constant, there can be realized a lamp device which has a good light emission efficiency. In this case, however, this involves another problem that, since switching is carried out nearly at a constant voltage level, the input current to the discharge lamp can also be made nearly constant but also the input current of A.C. power source has a pause period therein, leading to a low input power factor.

In order to avoid such a problem, there has been suggested such an inverter device that, for the purpose of suppressing generation of harmonics components and increasing an input power factor, an input current is made to have a nearly sinusoidal waveform as disclosed in U.S. Pat. No. 5,274, 540. In the inverter device of this U.S. Patent, a voltage of such an A.C. power source as a commercial power source Vs is full-wave rectified by such a rectifier as a diode bridge and a smoothing capacitor is connected to D.C. output ends of the rectifier through a diode, so that a voltage across the smoothing capacitor is used as a DC power supply to an inverter circuit. The inverter circuit is arranged so that a series circuit of first and second switching elements is connected with the smoothing capacitor in parallel, and a series circuit of a DC-components blocking capacitor, a resonance inductor and a load circuit is connected in parallel with the second switching element. Each of the first and second switching elements is made up of a transistor and a diode connected between the collector and emitter of the transistor in an inverse parallel relationship thereto. The load circuit comprises a discharge lamp and a capacitor. The capacitor forms part of a current path for preheating filaments of the discharge lamp and also forms part of a resonance circuit together with the inductor. In order to reduce harmonics components in the input current and improving its input power factor, an impedance element comprising a series circuit of the inductor and capacitor is inserted between one of the DC output ends of the rectifier (junction point between the rectifier and diode) and one end of the load circuit (junction point between the inductor and discharge lamp).

In operation of the above circuit, the both transistors in the inverter circuit are alternately turned ON and OFF at a high switching frequency to prevent the both transistors from being turned ON at the same time under the control of a control circuit (not shown). Accordingly, when the first transistor is turned ON, a current flows from the smoothing capacitor through a path of the first transistor, capacitor, inductor and discharge lamp (also via a capacitor in parallel with the discharge lamp).

When the first transistor is turned OFF, the energy stored in the inductor causes a current to flow through the discharge lamp (capacitor), diode and capacitor. Thereafter, when the second transistor is turned ON, charge accumulated in the capacitor is discharged through a path of the second transistor, discharge lamp (capacitor) and inductor; whereas, when the transistor is turned OFF, the energy stored in the inductor and the charge accumulated in the capacitor are discharged through a path of the diode, smoothing capacitor and discharge lamp (capacitor). That is, turning OFF of the second transistor causes the smoothing capacitor to be charged. When the transistors are alternately turned ON and OFF in this way, the current flowing the discharge lamp is inverted in its flowing direction so that a high frequency AC current can be supplied to the discharge lamp.

As will be clear from the foregoing explanation, the basic operation of the inverter circuit is not influenced by the impedance element. Thus, even in the case of no provision of the impedance element, the inverter device can be operated as an inverter circuit but this also involves a problem which follows. That is, when a voltage drop across the diode is ignored, no input current flows from the A.C. power source to the rectifier while the output voltage of the rectifier is lower than the voltage across the smoothing capacitor, that is, the input current undesirably has a pause period at intervals of its half cycle of the voltage of the A C. power source. In other words, since the input current can flow only for a period which the charging current to the smoothing capacitor flows, the waveform of the input current collapses remarkably from a sinusoidal waveform, increases harmonics components therein.

In this case, when an impedance element is provided in such a manner as mentioned above, the following operation can be realized. More in detail, when the second transistor is turned ON, a current also flows from the rectifier through the inductor, capacitor, inductor, capacitor and second transistor. Thereafter, when the transistor is turned OFF, the energy stored in the inductor is discharged so that a current flows through a path of the inductor, capacitor, inductor, capacitor, diode, smoothing capacitor and rectifier. That is, when the second transistor is turned OFF, not only with the energy stored in the inductor and the charge accumulated in the capacitor but also with the output of the rectifier, the smoothing capacitor is charged. Further, during On period and OFF period thereafter of the transistor, the capacitor is charged.

Meanwhile, when the first transistor is turned ON, the charge accumulated in the capacitor causes a current to flow through a path of the inductor, diode, transistor, capacitor and inductor. In this case, the capacitor and inductor collectively form a resonance circuit. Thereafter, when the first transistor is turned OFF, the energy stored in the inductor causes a current to flow through the capacitor, inductor, diode, smoothing capacitor, diode and capacitor. After the first transistor is turned OFF, a current flows through such a path as mentioned above to charge the capacitor. Thus, when second transistor is next turned ON, the voltage across the capacitor is added to the output voltage of the rectifier.

In this way, for periods during which the second transistor is in its ON state and from the turning OFF of the second transistor until the turning ON of the first transistor, power is supplied from the rectifier; whereas for periods during which the first transistor is in the ON state and from the tuning OFF of the first transistor until the turning ON of second transistor, the power supply from the rectifier is stopped. Accordingly, even while the output voltage of the rectifier is lower than the voltage across the smoothing capacitor, the turning ON and OFF of the transistors cause the output voltage to be supplied from the rectifier through the impedance element intermittently at a high frequency, with the result of the fact that the pause period of the input current to the rectifier can be remarkably reduced. That is, substantially no pause period is present in the input current throughout a full period of the voltage of the A.C. power source and the input current can have a nearly sinusoidal waveform, with an increased input power factor. When a suitable filter circuit is inserted between the rectifier and A.C. power source to block passage of high frequency components generated by the turning ON and OFF of the first and second transistors, further, the waveform of the input current from the A.C. power source becomes much closer to a sinusoidal waveform, whereby the harmonics components can be reduced to a large extent.

With such circuit arrangement as mentioned above, when the output voltage of the rectifier has a pulsative waveform, the voltage across the smoothing capacitor becomes nearly linear so that, when the voltage across the smoothing capacitor is higher than a peak value of the output voltage of the rectifier, the voltage across the impedance element is added to the output voltage of the rectifier during tuning ON of the transistor. This tendency becomes remarkable, in particular, in the case of a light or no load.

SUMMARY OF THE INVENTION

It is accordingly an object of the present invention to suppress harmonics components of an input current to a low level to approach the waveform of the input current to a sinusoidal waveform, and to suppress occurrence of a period of the input current during which a discharge lamp current becomes zero for improving its input power factor and increasing a light emission efficiency.

In accordance with an aspect of the present invention, the above object is attained by providing an inverter device wherein an AC voltage of an A.C. power source is rectified by a rectifier, an inverter circuit receives a DC output voltage of the rectifier and outputs a high frequency voltage therefrom, a load circuit receives the high frequency output voltage from the inverter circuit, and an auxiliary power supply circuit includes a smoothing capacitor which is connected between output ends of the rectifier in parallel thereto and which has a smoothing action enough to continuously supply a current to the load circuit, and characterized in that the inverter circuit includes a DC/DC conversion circuit for receiving the DC output voltage of the rectifier and receiving supply of a pulsative current from the A.C. power source through a substantially full area of half cycle of the A.C. power source and for outputting a DC output voltage below a peak value of the DC output voltage of the rectifier and also includes a DC/AC conversion circuit for receiving the DC output voltage of the DC/DC conversion circuit (non-boosting type chopper) and outputting a high frequency voltage, at least one of a switching element of the DC/DC conversion circuit and a switching element of the DC/AC conversion circuit is commonly used, and the auxiliary power supply circuit supplies a DC voltage to the DC/AC conversion circuit at a level below a predetermined value of a voltage of the A.C. power source.

Other objects and advantages of the present invention will become apparent from the following detailed description of preferred embodiments thereof in connection with the accompanying drawings.

BRIEF DESCRIPTION OF THE DRAWINGS

FIG. 1 is a circuit diagram of an inverter device in accordance with an embodiment 1 of the present invention;

FIG. 16 is a circuit diagram in accordance with an embodiment 9 of the present invention;

FIG. 17 shows waveforms of signals for explaining the operation of the embodiment 9 of FIG. 16;

FIGS. 32A, 32B and 33 show waveforms of signals for explaining the operation of FIG. 31;

FIG. 36 shows waveforms of signals for explaining the operation of the embodiment 19 of FIG. 35;

Figures 3A, 3B, 3C, 3D:
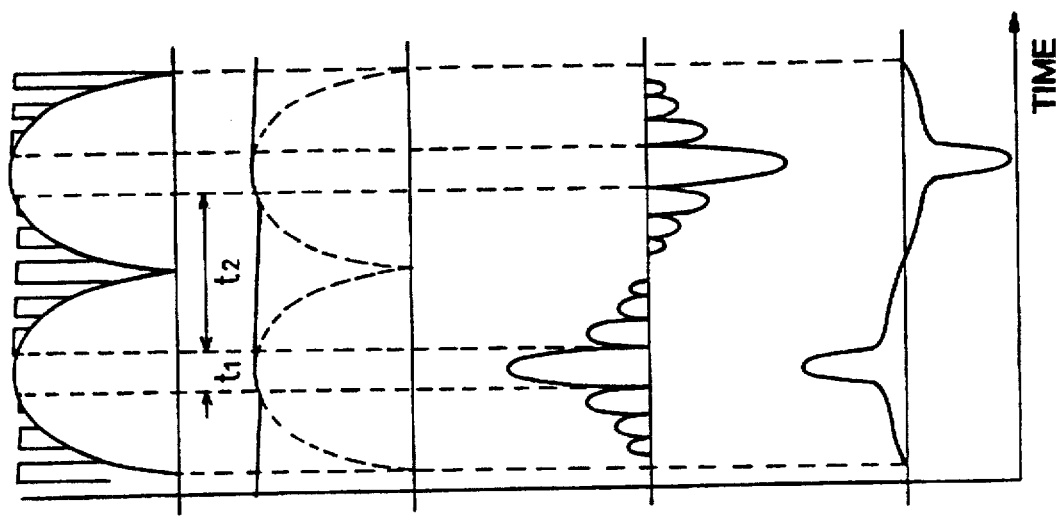
FIG. 3 shows waveforms of signals for explaining the operation of the embodiment 1 of FIG. 1.

While the present invention will now be described with reference to the embodiments shown in the drawings, it should be appreciated that the intention is not to limit the present invention only to these embodiments shown but to include all alterations, modifications and equivalent arrangements possible within the scope of appended claims.

DETAILED DESCRIPTION OF THE PREFERRED EMBODIMENTS (Embodiment 1)

Figure 4:
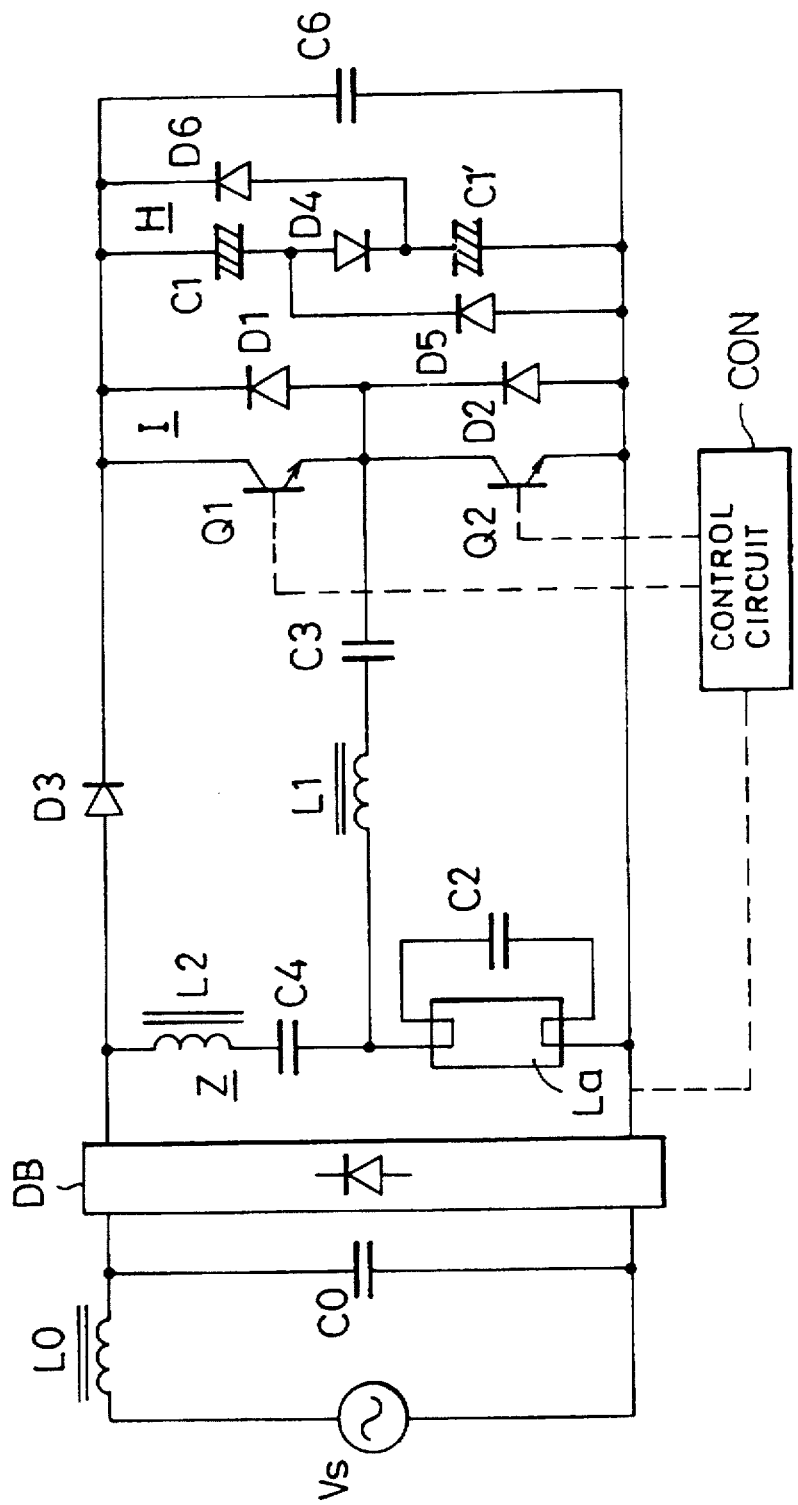
FIG. 4 is a specific circuit diagram of the inverter device of FIG. 1.

FIG. 1 shows an arrangement of a power supply circuit in accordance with a first embodiment of the present invention, which forms a basis of the present invention, and FIG. 4 is a specific circuit thereof. Explanation will be made as to the circuit arrangement. In the arrangement of the present embodiment, a full-wave rectifier DB for rectifying power of an A.C. power source Vs has an impedance element Z connected between its D.C. output ends and is connected through a diode D3 to a smoothing circuit H for ½ valley filling, and an inverter circuit I is connected between both ends of the smoothing circuit H. The circuit H includes a DC means and circuit elements arranged for forming a DC/DC conversion means together with a full-wave rectifier DB and providing a high frequency AC output so as to constitute a DC conversion means.

In this case, when as shown in FIG. 4, the inverter circuit 1 comprises first and second switching elements Q1 and Q2 and diodes D1 and D2 connected in inverse parallel with the switching elements. When an oscillating circuit of the inverter circuit I comprising an inductor L1, a capacitor C2 (see FIG. 4) and a discharge lamp La as a load as well as the impedance element Z are suitably selected in their circuit parameters, a circuit arrangement causing no boosting action can be realized. More specifically, when it is desired to apply an oscillating voltage of the resonance circuit of the inverter circuit I to the D.C. output ends of the full-wave rectifier DB through the impedance element Z, the smoothing circuit H can necessarily suppress the boosting action so long as a peak value in a voltage developing between the D.C. output ends of the full-wave rectifier DB is smaller than a peak value in the voltage of the A.C. power source Vs.

In the case where the smoothing circuit H is replaced by a smoothing capacitor C1 alone, if a peak value in a voltage V1 appearing between the D.C. output ends of the full-wave rectifier DB, then a not boosted voltage is developed across the smoothing capacitor C1. In other words, the voltage across the smoothing capacitor C1 is smaller than the peak value of the voltage V1 appearing between the D.C. output ends of the full-wave rectifier DB as shown in FIG. 3, (a) and also than the peak value of the A.C. power source Vs as shown in FIG. 3, (b). Then the input current has such a waveform as shown in FIG. 3, (c), that is, the current contains much harmonics in the vicinity of the peak value of the A.C. power source Vs; whereas, in the vicinity of 0 V of the A.C. power source Vs, the current continuously flows under the influences of high frequency superimposing action through the impedance element Z. When a suitable filter is attached to an input side, there is obtained such a waveform as shown in FIG. 3(d), i.e., with a considerably bad input power factor as a whole.

In the circuit arrangement comprising circuit parameters not having the above boosting action, in place of the smoothing capacitor C1, the ½ valley filling smoothing circuit H is used. In this case, as will be seen from the specific circuit shown in FIG. 4, the smoothing capacitor C1 conventionally used is replaced by the smoothing circuit H and a capacitor C6 for removal of high frequency components generated downstream of the diode D3 is connected in parallel to the smoothing circuit H.

In the inverter circuit I of the present embodiment, the switching elements such as transistors Q1 and Q2 are turned ON and OFF at high speed under the control of a control circuit CT, so that a high frequency voltage is applied to the discharge lamp La as a load as a resonance inductor in the resonance circuit of an inductor L1 and the capacitor C2 with the smoothing circuit H used as a power supply. The inverter circuit I is operated on a DC voltage of about ½ Vs as its power supply in zones of the voltage of the A.C. power source Vs smaller than about ½ of its peak value, while the inverter circuit I is operated on a voltage corresponding to the voltage of the A.C. power source Vs as its power supply in zones of the voltage of the A.C. power source Vs larger than about ½ of its peak value.

Explanation will be made as to the operation of how to improve the input power factor. First of all, a voltage across the discharge lamp La is oscillating at a high frequency through the operation of the above inverter. Since the impedance element Z comprising the inductor L2 and capacitor C4 also forms part of the resonance circuit, a combination of a resonance voltage being applied to the discharge lamp La and a resonance voltage caused by the inductor L2 and smoothing capacitor C1 is applied between the D.C. output ends of the full-wave rectifier DB. In this case, assuming that the applied combined voltage is represented by reference symbol V1, then circuit parameters are selected so as to satisfy a relationship which follows.

$$\tfrac{1}{2} \cdot Vs\,(peak) \leq V1\,(peak) \leq Vs\,(peak)$$

Then the voltage V1 is oscillated at a high frequency by ON and OFF operations of the transistors Q1 and Q2 of the inverter circuit I. In a zone in which the voltage of the A.C. power source Vs is larger in amplitude than the voltage V1, that is, in a zone t1 shown in FIG. 2, (a); a current flows directly from the A.C. power source Vs through a route of the full-wave rectifier DB, diode D3, smoothing capacitor C1, diode D4, smoothing capacitor C1' and again to the full-wave rectifier DB, thereby charging the capacitors C1 and C1' of the smoothing circuit H at low frequency, the capacitors C1 and C1' acting as a DC means upon their discharge. In a zone in which the voltage of the A.C. the voltage V1 is larger in amplitude than power source Vs, that is, in a zone t2; the voltage V1 is superimposed on a pulsative voltage appearing between the D.C. output ends of the full-wave rectifier DB so that the high frequency components cause the capacitors C1 and C1' of the smoothing circuit H to be charged. As mentioned above, the zone t1 in which the capacitors C1 and C1' of the smoothing circuit H are charged at low frequency and the zone t2 in which the capacitors C1 and C1' of the smoothing circuit H are charged at high frequency are repeated at intervals of its period. Shown in FIG. 2, (b) is a voltage across the smoothing circuit H, i.e., the power voltage of the inverter circuit I.

Figures 2A, 2B, 2C, 2D:
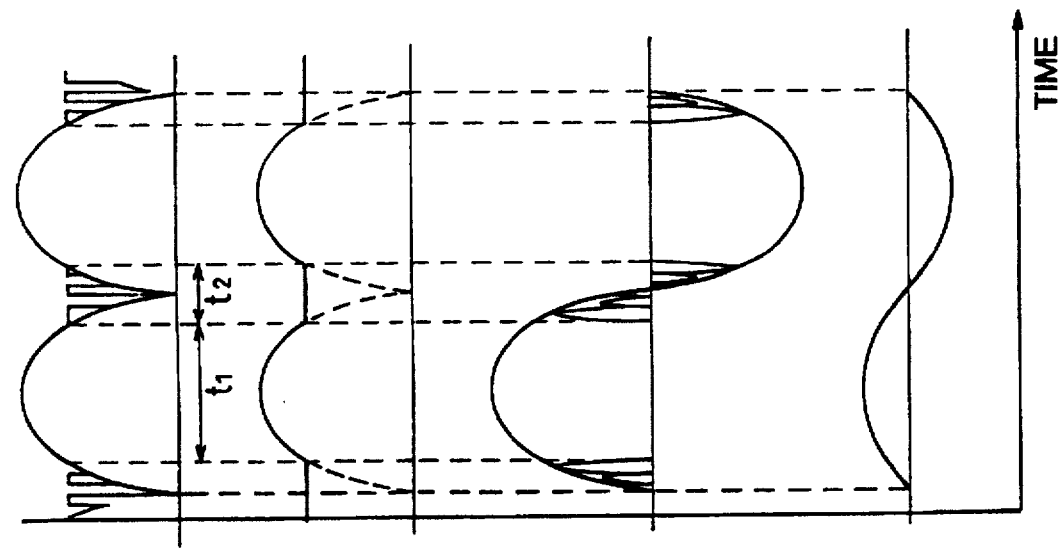
FIG. 2 shows waveforms of signals appearing in the embodiment 1 of FIG. 1.

When the amplitude of the voltage V1 fed back to the D.C. output ends of the full-wave rectifier DB is set to be more than about ½ of the A.C. power source Vs in this way, a current flows to charge the capacitors C1 and C1' of the smoothing circuit H and thus no pause period occurs in the waveform of an input current Iin as shown in FIG. 2, (c). In the detailed circuit of the FIG. 4, a low pass filter comprising an inductor L0 and a capacitor C0 is provided in the input side of the full-wave rectifier DB, so that the input current Iin has such a continuous current waveform similar to the voltage waveform of the A.C. power source Vs and close to a sinusoidal waveform as shown in FIG. 2, (d), which results in acquisition of a low input power factor. Further, since the voltage across the smoothing circuit H as the power supply of the inverter circuit I does not exceed the peak value of the A.C. power source Vs and the level of valley parts of the voltage corresponds nearly to ½·Vs, the burden imposed on the transistors Q1 and Q2 as switching elements of the inverter circuit I can be lightened.

(Embodiment 2)

In the above embodiment 1, the smoothing circuit H for ½ valley filling has been used. In the present embodiment, however, any type of circuit may be employed for a circuit enclosed by a dotted line in FIG. 1 so long as the circuit is a part smoothing circuit. In general, in the case of a smoothing circuit for n/m valley filling, the following relationship is satisfied.

$$n/m \cdot Vs \text{ (peak)} \leq V1 \text{ (peak)} \leq Vs \text{ (peak)}$$

Figure 5:
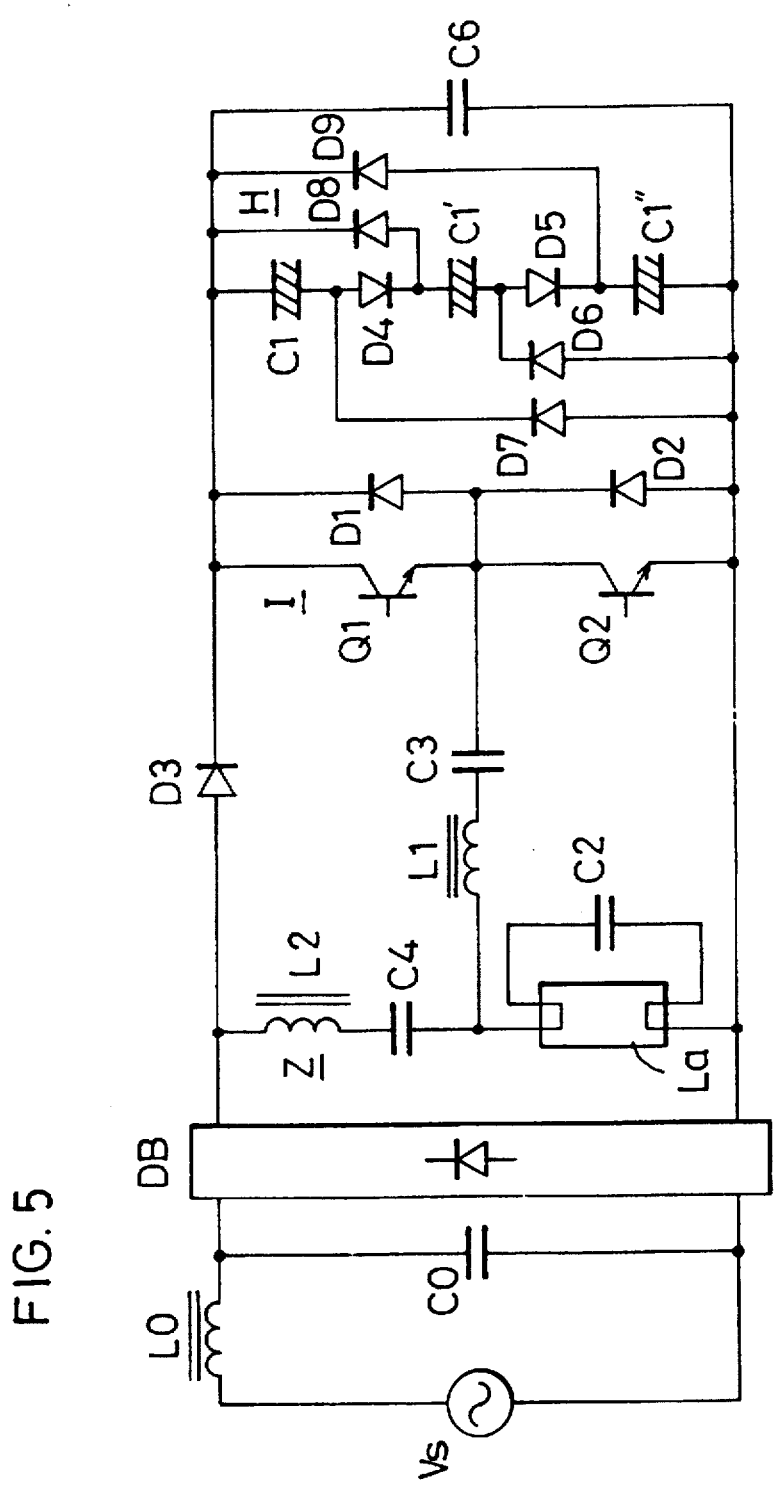
FIGS. 5 to 9 show specific circuit diagrams in accordance with embodiments 2 to 6 of the present invention, respectively.

Used as the smoothing circuit H based on the above condition in the present embodiment is a smoothing circuit H for ⅓ valley filling which comprises capacitors C1, C1' and C1", diodes D4 to D9 as shown in FIG. 5.

In the present embodiment, since a level at valley parts in the smoothed voltage is much lower than that in the embodiment 1, the burden imposed on the transistors Q1 and Q2 as the switching elements of the inverter circuit I can be reduced much than that in the embodiment 1.

(Embodiment 3)

In the foregoing respective embodiments, superimposition is carried out by applying the oscillating voltage of the resonance circuit of the inverter circuit I to a resonance voltage generated by the impedance element Z. In the present embodiment, as shown in FIG. 6, the primary winding of the transformer T1 is connected in series with the inductor L1 of the resonance circuit, the discharge lamp La is connected to the secondary winding of the transformer T1, a series circuit of the tertiary winding and impedance element Z is connected between the D.C. output ends of the full-wave rectifier DB in parallel thereto, so that an oscillating voltage induced in the tertiary winding causes a current to flow through a series circuit of the inductor L2 and capacitor C4 of the impedance element Z, whereby a resonance voltage is generated and added to a voltage across the tertiary winding of the transformer T1, thus providing substantially the same operation as in the foregoing embodiment 1.

The inductor L1 may be provided on the secondary side of the transformer T1. Further, the direction of electromotive force of the transformer T1 may be set to be opposite to the illustrated direction.

(Embodiment 4)

Figure 6:
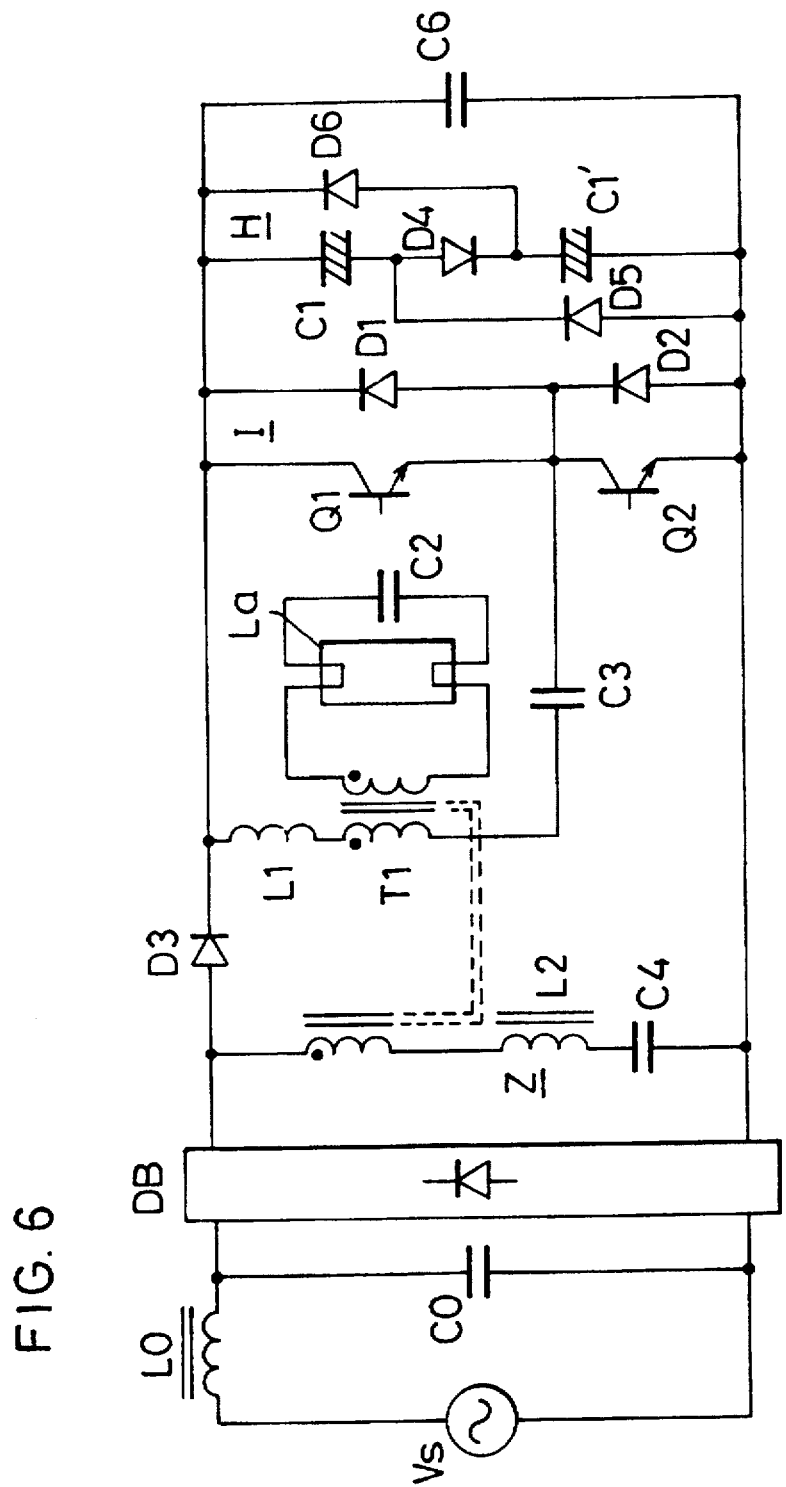
Figure 7:
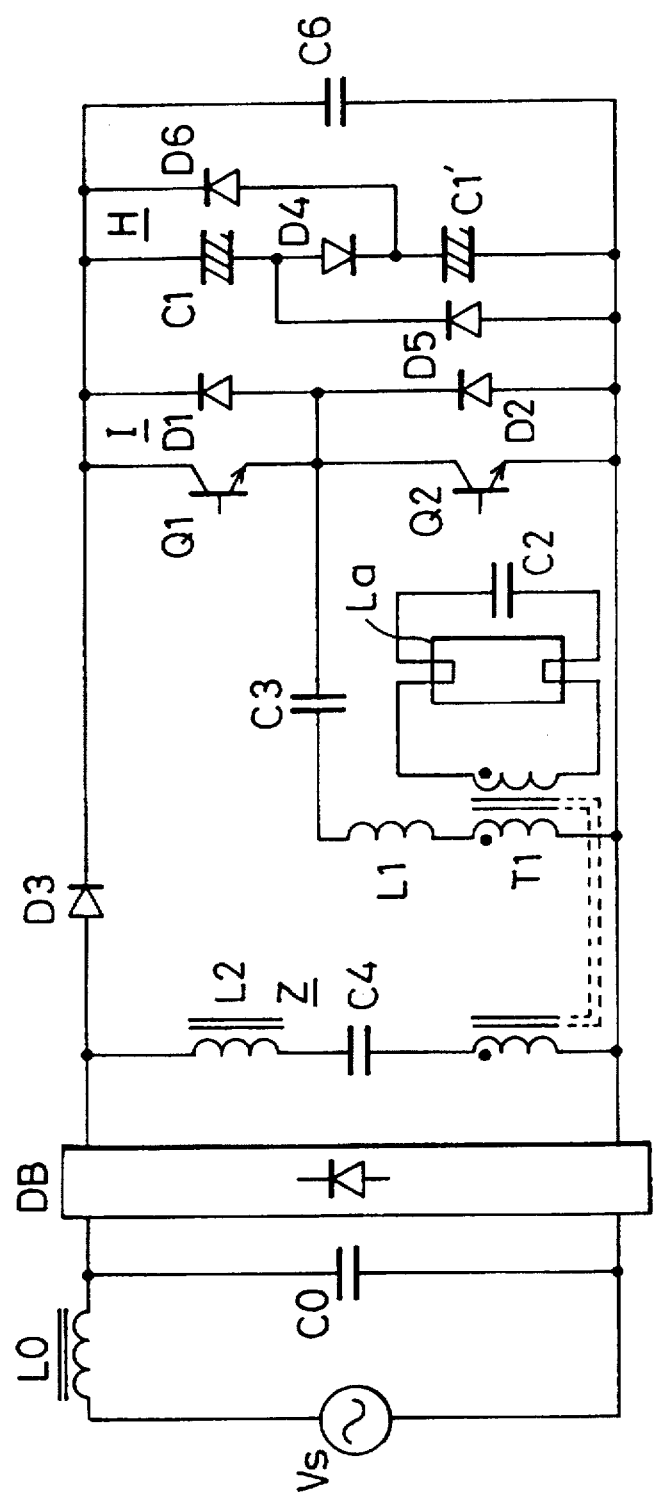

The present embodiment is basically the same in operation as the embodiment 3, except that, as shown in FIG. 7, a junction point of the inductor L1 of the oscillating circuit and a junction point of the transformer T1 for feeding the resonance voltage back are different from those in the embodiment 3 of FIG. 6.

(Embodiment 5)

Figure 8:
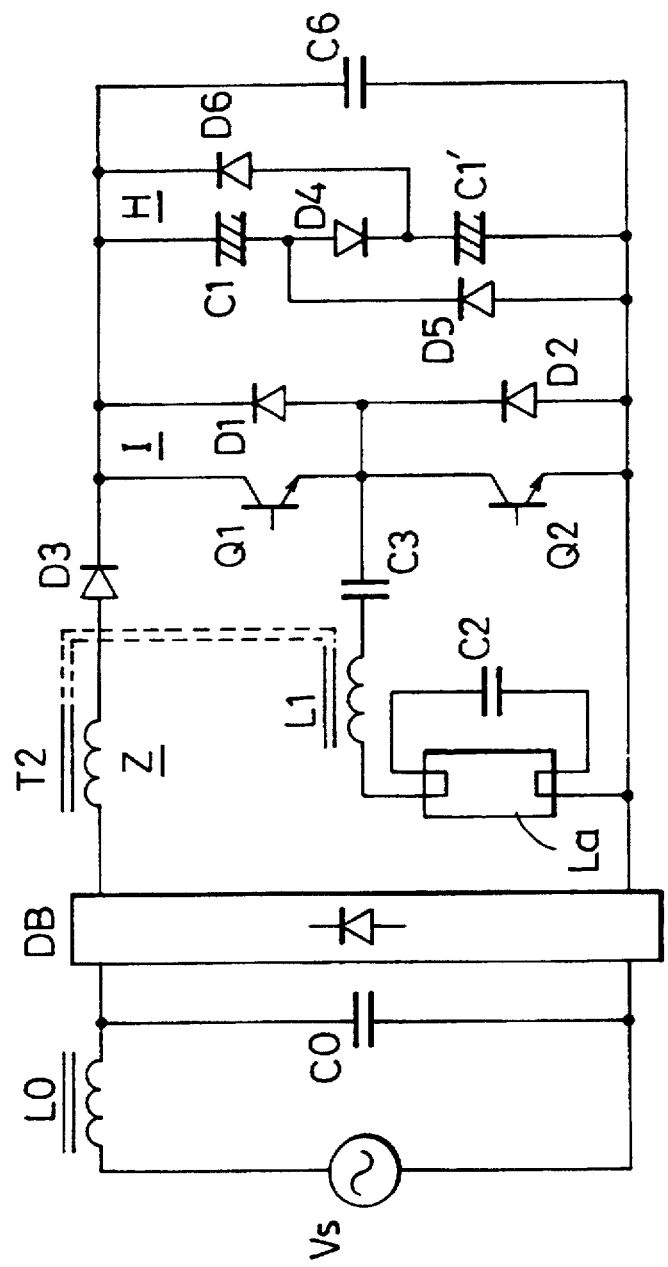

In the foregoing respective embodiments, the impedance element Z has comprised a series circuit of the inductor L2 and capacitor C4 to feed a high frequency voltage back to the full-wave rectifier DB. In the present embodiment, on the other hand, as shown in FIG. 8, the inductor L1 forming the oscillating circuit of the inverter circuit I together with a capacitor or the discharge lamp La as a load is used as the primary winding of the transformer T2 having the primary winding, and the secondary winding of the transformer T2 is provided between one of the D.C. output ends of the full-wave rectifier DB. In this case, the primary winding of the transformer T2 forms the oscillating circuit together with the capacitor C2 connected between non-power-supply side ends of filaments of the discharge lamp La.

In the present embodiment, the oscillating voltage generated in the resonance circuit of the inverter circuit I is superimposed on a pulsative voltage generated at the D.C. output ends of the full-wave rectifier DB. As in the foregoing embodiment 1, the capacitors C1 and C1' of the smoothing circuit H for ½ valley filling can be charged with a low frequency current and charged at a high frequency and the continuous input current Iin can be supplied.

(Embodiment 6)

Figure 9:
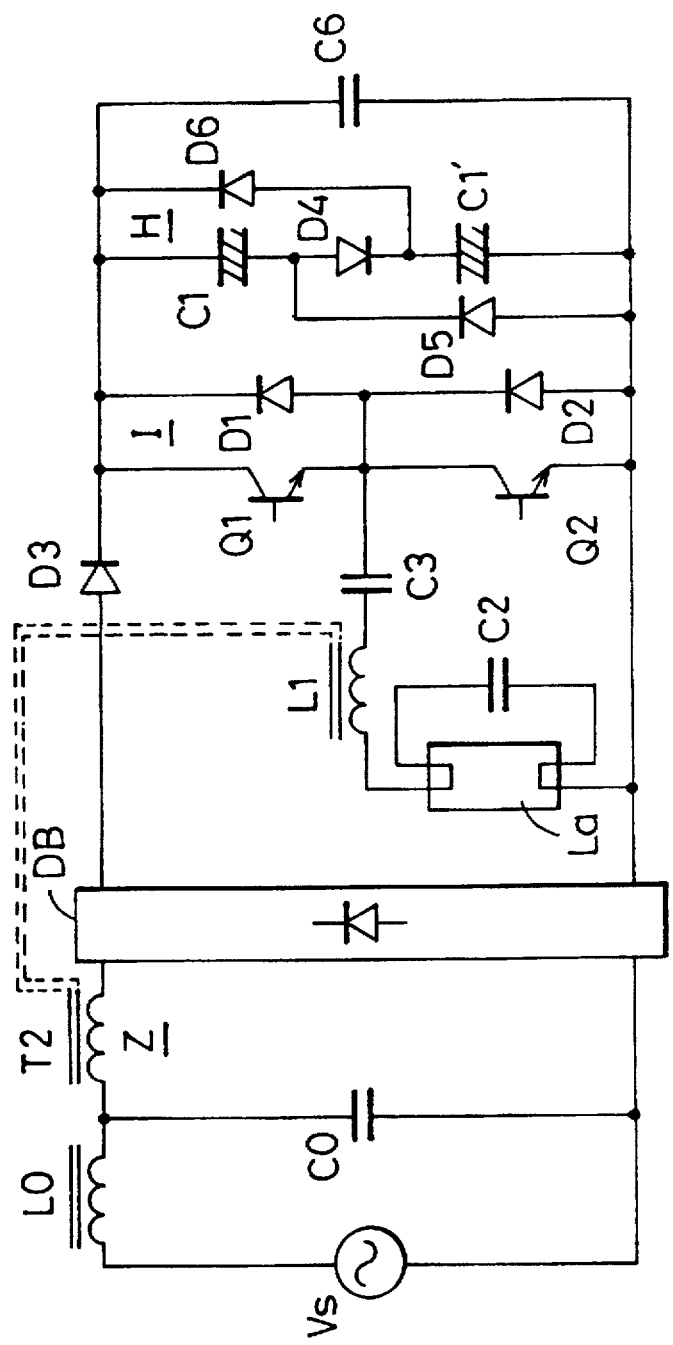

Although the secondary winding of the transformer T2 forming part of the impedance element Z for superimposition of a high frequency voltage has been connected between one of the D.C. output ends of the full-wave rectifier DB and the diode D3 in the embodiment 5; the secondary winding is inserted in the input side of the full-wave rectifier DB to cause the voltage of the secondary winding to be superimposed on the input side of the full-wave rectifier DB, i.e., on the voltage of the A.C. power source Vs as shown in FIG. 9 in the present embodiment. The operation per se of the present embodiment is substantially the same as that of the embodiment 5.

(Embodiment 7)

Figure 10:
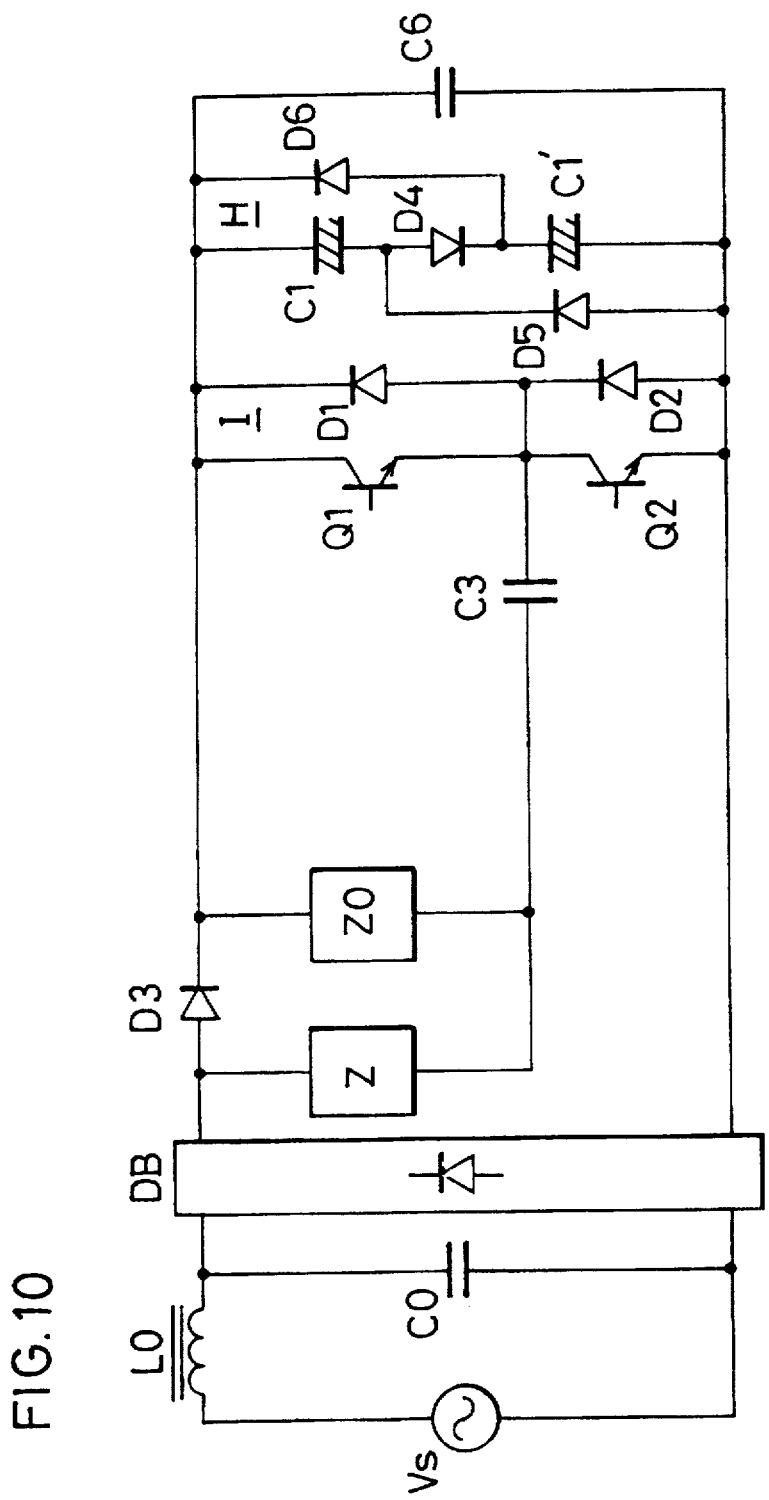
FIG. 10 is a circuit diagram of an embodiment 7.
Figure 11:
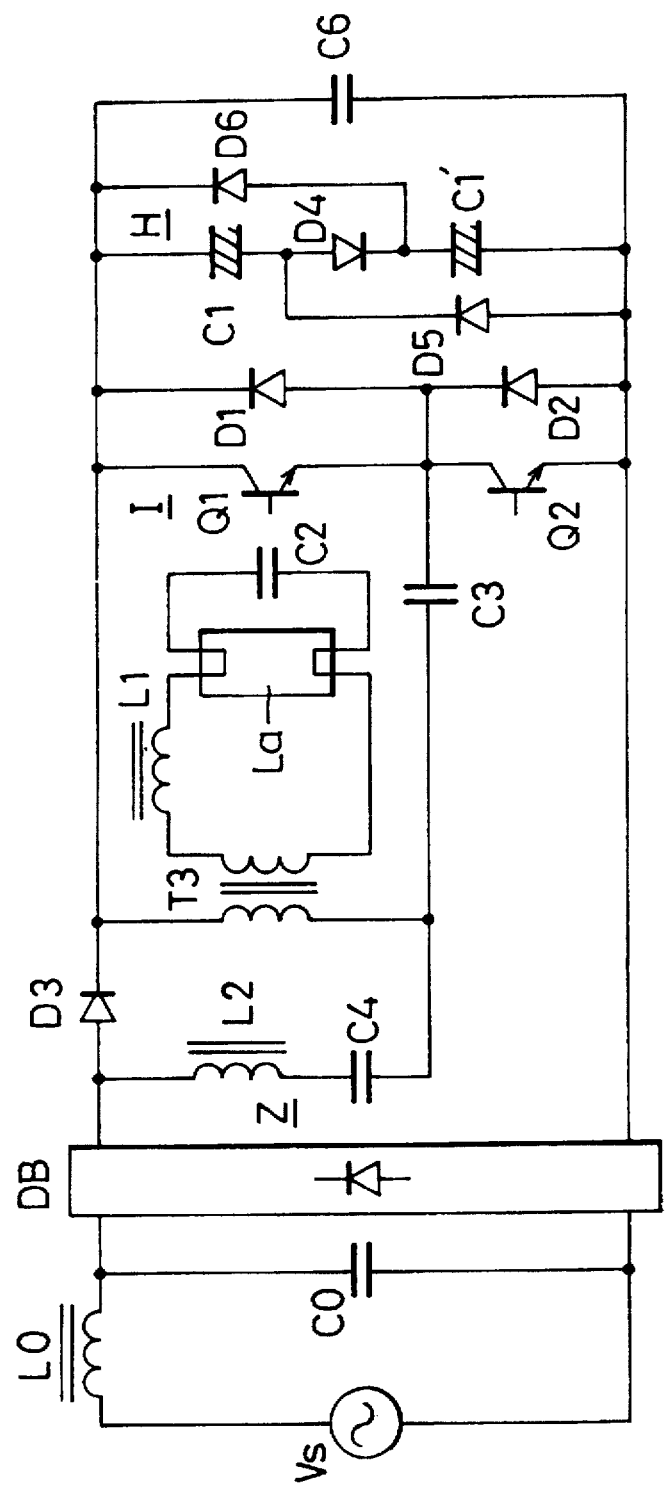
FIG. 11 is a specific circuit diagram of the embodiment of FIG. 10.

In the present embodiment, as shown in FIG. 10, the oscillating circuit Z0 including a load of the inverter circuit I is connected between a junction point of the transistors Q1 and Q2 and a cathode side of the diode D3 through the DC-components blocking capacitor C3, and the impedance element Z for feedback superimposition of a high frequency voltage is connected between the junction point of the transistors Q1 and Q2 and the anode side of the diode D3 through the capacitor C3. The specific circuit is shown in FIG. 11 in which the oscillating circuit Z0 is inserted between the capacitor C3 and the diode D3 in the form of the primary winding of the transformer T3, a series circuit of the inductor L1 and discharge lamp La as a load is connected across the secondary winding of the transformer T3, and the capacitor C2 also acting as a resonance capacitor for supplying a preheating current to filaments of the discharge lamp La is connected across non-power-supply side ends of the filaments of the discharge lamp La. Meanwhile, the impedance element Z comprises a series circuit of the inductor L2 and capacitor C4.

The operation of the inverter circuit I for improving input distortion in the present embodiment in the vicinity of a 0 V in the voltage of the A.C. power source Vs will next be explained in connection with FIGS. 12A, 12B, 13A, 13B, 14A and 14B. In the inverter circuit I, the transistors Q1 and Q2 are alternately turned ON and OFF at a high speed under the control of the control circuit. In this case, the operation of the inverter circuit I is divided into 6 modes which follow according to the ON and OFF states of the transistors Q1 and Q2 and the direction of the current flowing through the oscillating circuit Z0 and impedance element Z.

Figure 12A:
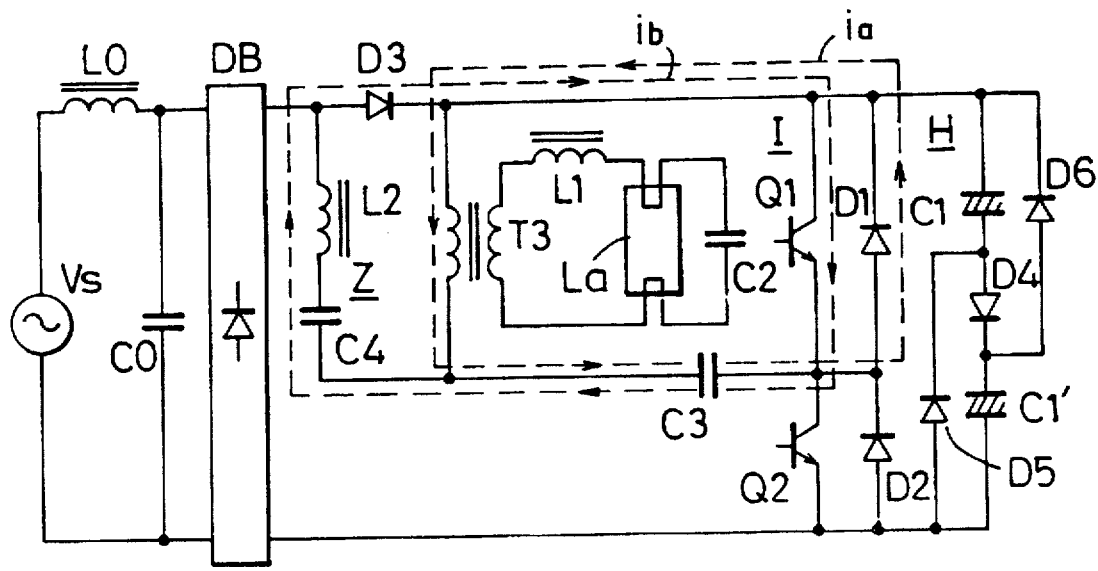
FIGS. 12A, 12B, 13A, 13B, 14A and 14B show circuit diagrams for explaining the specific operations of an embodiment 7 of FIG. 10.

First, in such a mode 1 that the transistor Q1 is in the ON state and the transistor Q2 is in the OFF state as shown in FIG. 12A, a current ia flows as a regenerative current through a path of the primary winding of the transformer T3, capacitor C3 and diode D1 and again to the primary winding of the transformer T3 in the inverter circuit I. A current ib also flows through a path of the capacitor C4, inductor L2, diode D3, transistor Q1 and capacitor C3 and again to the capacitor C4 so that a resonance voltage of the impedance element Z is applied between the D.C. output ends of the full-wave rectifier DB.

Figure 12B:
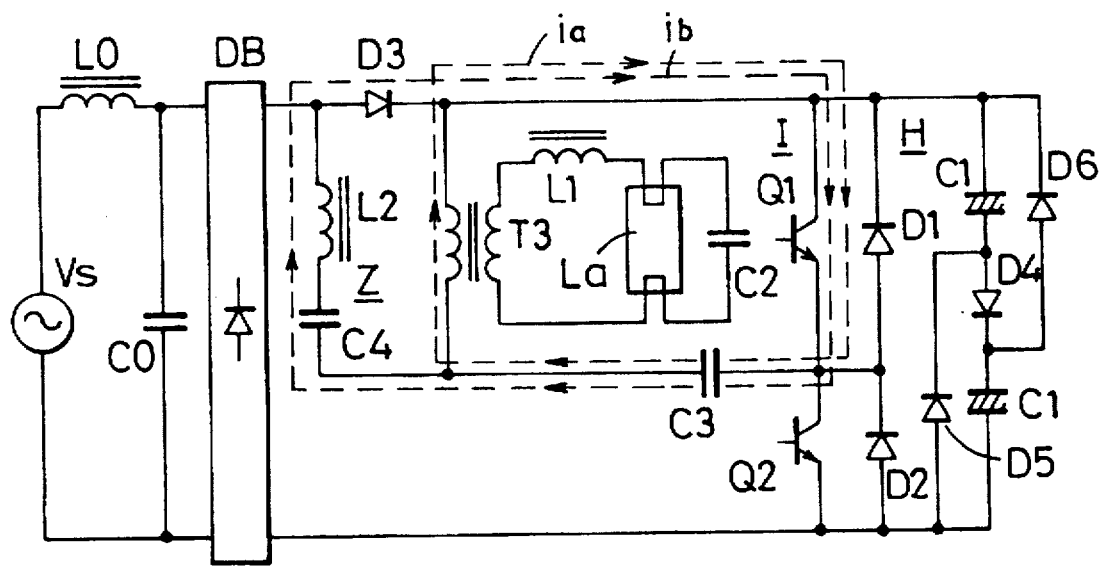

In such a mode 2 shown in FIG. 12B that the transistor Q1 is in the ON state and the transistor Q2 is in the OFF state as in FIG. 12A, the current ia flows through a path of the capacitor C3, primary winding of the transformer T3 and transistor Q1 and again to the capacitor C3 in the inverter circuit I, while the current ib flows through a path of the capacitor C4, inductor L2, diode D3, transistor Q1 and capacitor C3 and again to the capacitor C4 in the inverter circuit I, as illustrated. In such a mode 3 shown in FIG. 13A that the transistor Q1 is in the ON state and the transistor Q2 is in the OFF state as in the modes 1 and 2 of FIGS. 12A and 12B, the current ia flows through a path of the capacitor C3, primary winding of the transformer T3 and transistor Q1 and again to the capacitor C3 in the inverter circuit I. Meanwhile, the current ib flows through a path of the full-wave rectifier DB, inductor L2, capacitor C4, capacitor C3, diode D1, smoothing capacitor C1, diode D4 and capacitor C1' and again to the full-wave rectifier DB. The above operation corresponds to the ON period of the transistor Q1, during which the DC-components blocking capacitor C3 is used as a power supply.

Figure 13A:
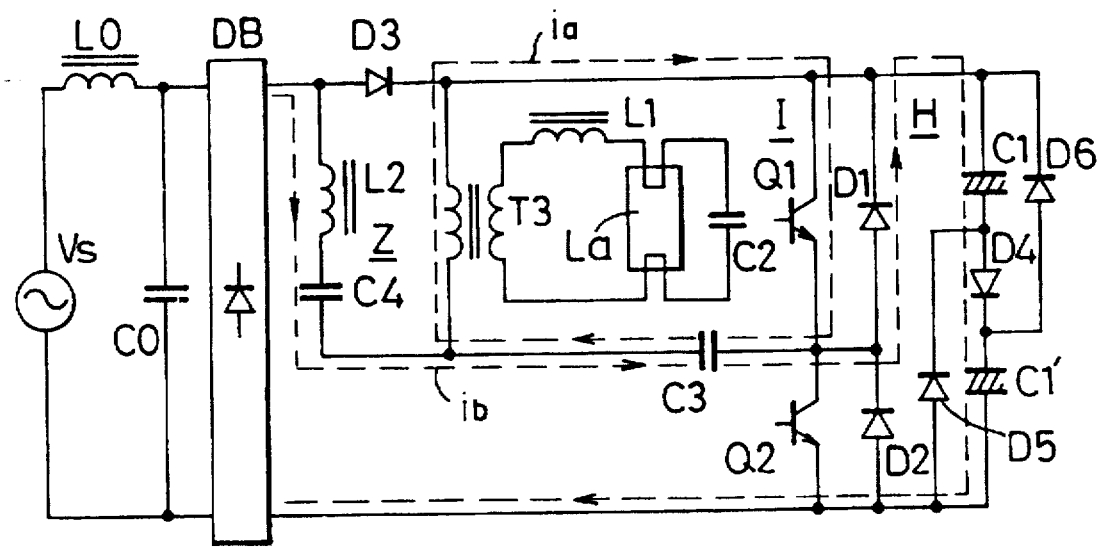
Figure 13B:
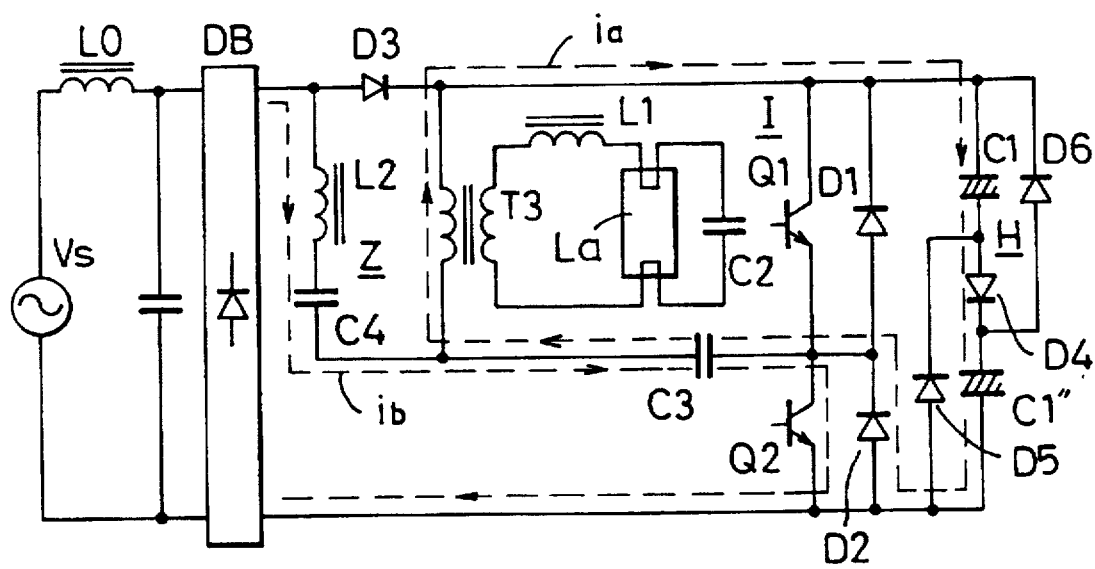

In such a mode 4 as shown in FIG. 13B, the transistor Q1 is in the OFF state and the transistor Q2 is in the ON state so that the current ia flows through a path of the primary winding of the transformer T3, smoothing capacitor C1, diode D4, capacitor C1', diode D2 and capacitor C3 and again to the primary winding of the transformer T3 in the inverter circuit I. The current ib also flows through a path of the full-wave rectifier DB, inductor L2, capacitor C4, capacitor C3 and transistor Q2 and again to the full-wave rectifier DB.

Figure 14A:
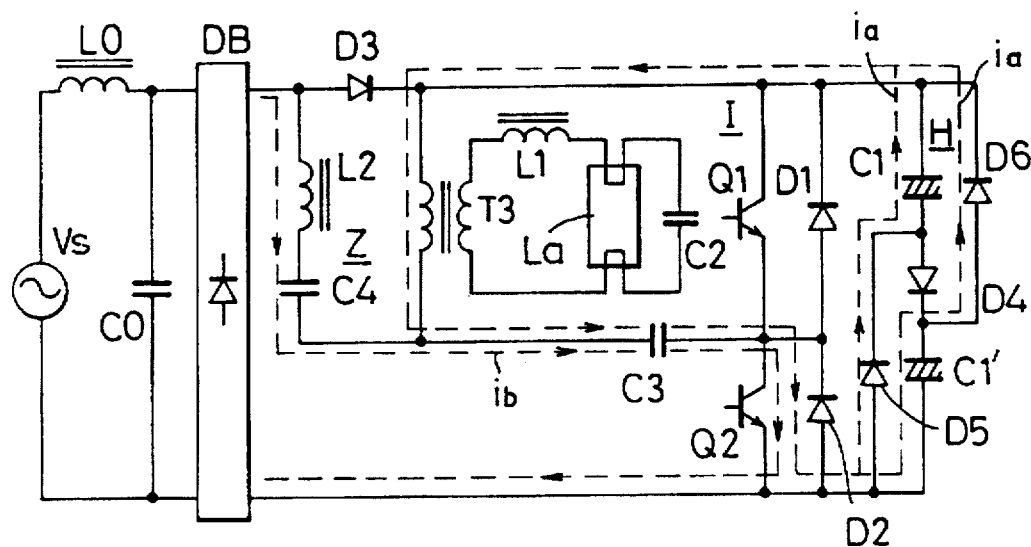

In such a mode 5 as shown in FIG. 14A, as in the mode 4 of FIG. 13B, the transistor Q1 is in the OFF state and the transistor Q2 is in the ON state, so that the currents ia and ia' flow through a path of the capacitor C1, primary winding of the transformer T3, capacitor C3, transistor Q2 and diode D5 and again to the capacitor C1 and also through a path of the capacitor C1', diode D6, primary winding of the transformer T3, capacitor C3 and transistor Q2 and again to the capacitor C1', respectively.

The current ib also flows through a path of the full-wave rectifier DB, inductor L2, capacitor C4, capacitor C3 and transistor Q2 and again to the full-wave rectifier DB.

Figure 14B:
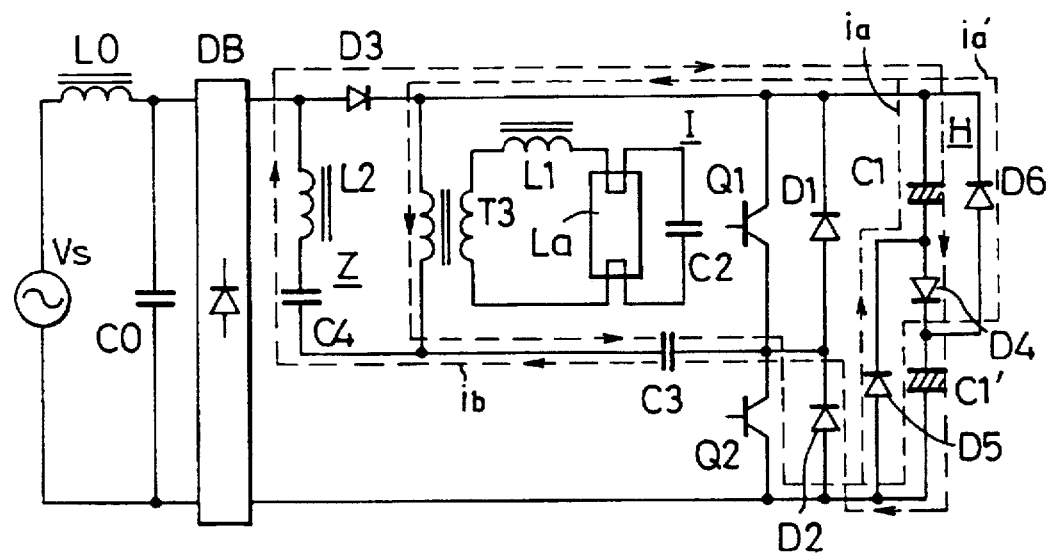

In such a mode 6 as shown in FIG. 14B, the transistor Q1 is in the OFF state and the transistor Q2 is in the ON state as in the mode of FIG. 14A, so that, as in FIG. 14A, the currents ia and ia' flow through a path of the capacitor C1, primary winding of the transformer T3, capacitor C3, transistor Q2 and diode D5 and again to the capacitor C1 and also through a path of the capacitor C1', diode D6, primary winding of the transformer T3, capacitor C3 and transistor Q2 and again to the capacitor C1', respectively. The current ib also flows through a path of the capacitor C4, inductor L2, diode D3, capacitor C1, diode D4, capacitor C1', diode D2 and capacitor C3 and again to the capacitor C4.

In this way, in such modes 4 to 6 as shown in FIGS. 13B, 14A and 14B, the transistor Q2 is in its ON period and the capacitors C1 and C1' acts as power supplies. In the modes 3 to 5 of FIGS. 13A, 13B and 14A, since a current is flowing directly from the A.C power source Vs through the full-wave rectifier DB, the input current can be continuously supplied even in the vicinity of a 0 V in the voltage of the A.C. power source Vs and thus its input distortion can be improved.

In the vicinity of a peak in the voltage of the A.C. power source Vs, in the mode 2 shown in FIG. 12B, a current also flows through a path of the full-wave rectifier DB, diode D3, capacitor C1, diode D4 and capacitor C1' and again to the full-wave rectifier DB. Further, since the primary side voltage of the transformer T3 has a rectangular waveform determined by the smoothing circuit H for ½ valley filling, the inverter circuit I has a feature that it does not depend on the state of the discharge lamp La as a load and becomes hard to boot. When the inductor L1 is replaced by the leakage magnetic flux of the transformer T3, the inductor L1 can be omitted, which leads to the fact that the inverter device can be made small in size. The switching elements of the inverter circuit I comprise bipolar transistors in the present embodiment, but the present invention is not limited to the specific bipolar transistors and the switching elements may comprise, for example, MOS-FETs. In this case, since the parasitic diodes of the MOS-FETs play a role of the diodes D1 and D2, the diodes D1 and D2 can be omitted and the inverter device can be miniaturized.

Further, when a single high-speed diode added to the output ends of the full-wave rectifier DB, the full-wave rectifier DB can be of a low-speed type and thus costs can be made low. In this connection, the number of such discharge lamps La is not limited to one but may be 2 or more. When two or more discharge lamps are employed, the lamps may be connected in series or in parallel.

(Embodiment 8)

Figure 15:
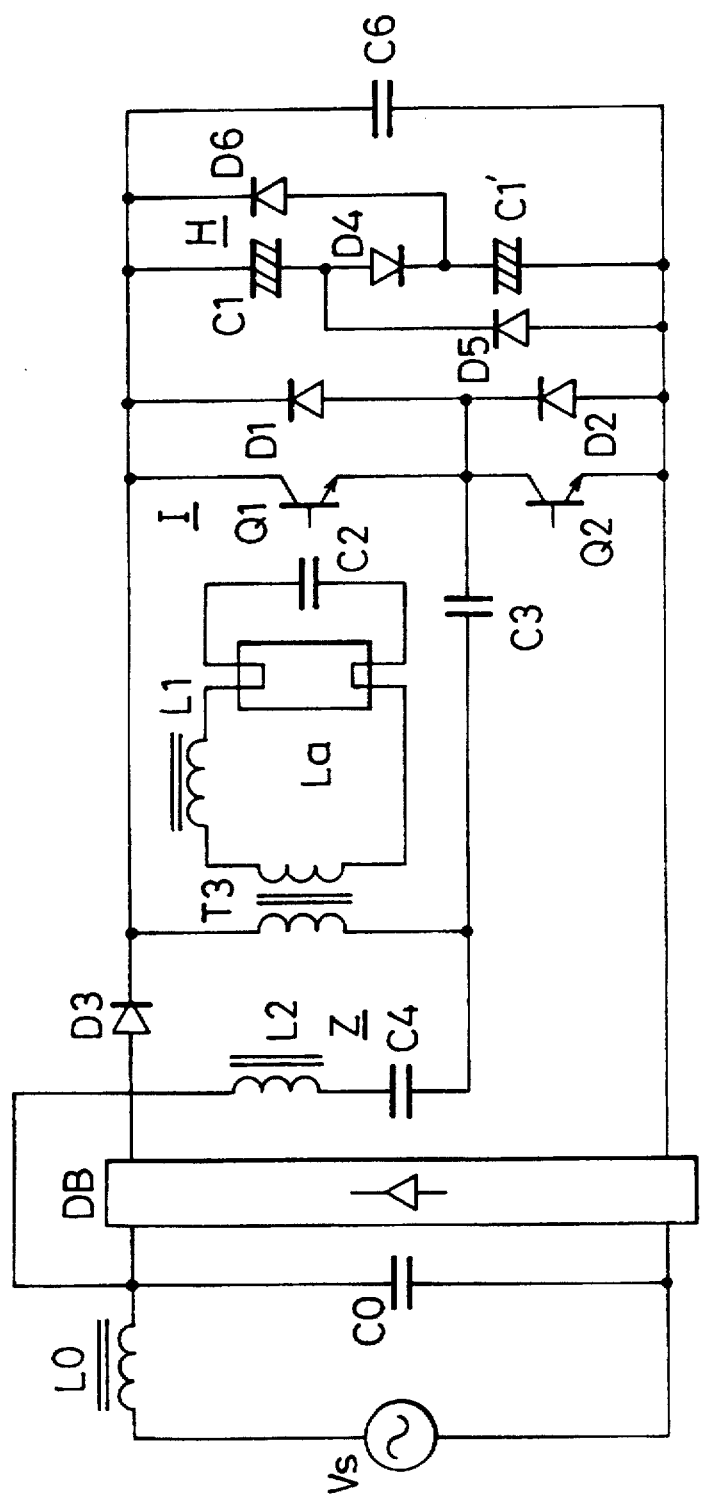
FIG. 15 is a circuit diagram in accordance with an embodiment 8 of the present invention.

Briefly speaking, the present embodiment is different from the embodiment 7 in that the impedance element Z is connected between a junction point of the oscillating circuit Z0 and capacitor C3 of the inverter circuit I and one of the input side ends of the full-wave rectifier DB, which specific circuit is shown in FIG. 15. The operation of the present embodiment will then be explained in connection with the operational modes 1 to 6 as in the embodiment 7. In this case, since the operation of the inverter circuit I is the same as that in the embodiment 7 even in the respective modes 1 to 6, explanation will be made only as to the operation of the impedance element Z.

First, in the modes 1 and 2 in which the transistor Q1 is in the ON state and the transistor Q2 is in the OFF state, a current flows through a path of the capacitor C4, inductor L2, full-wave rectifier DB, diode D3, transistor Q1 and capacitor C3 and again to the capacitor C4. In the mode 3, a current flows through a path of the A.C. power source Vs, inductor L0, inductor L2, capacitor C4, capacitor C3, diode D1, capacitor C1, diode D4, capacitor C1' and full-wave rectifier DB and again to the A.C. power source Vs. In the modes 4 and 5 in which the transistor Q1 is in the OFF state and the transistor Q2 is in the ON state, next, a current flows through a path of the A.C. power source Vs, inductor L0, inductor L2, capacitor C4, capacitor C3, transistor Q2 and full-wave rectifier DB and again to the A.C. power source Vs.

Further, in the mode 6, a current flows through a path of the capacitor C4, inductor L2, full-wave rectifier DB, diode D3, capacitor C1, diode D4, capacitor C1', diode D2 and capacitor C3 and again to the capacitor C4. When a high frequency voltage is superimposed through the impedance element Z in this way, a path of a current flowing during the charging operation of the smoothing circuit H includes the full-wave rectifier DB in the modes 1, 2 and 6. In the modes 3, 4 and 5, in contrast to the above modes, only the path including the full-wave rectifier DB is omitted and the current is supplied directly from the A.C. power source Vs.

The operation and effect of the present embodiment are substantially the same as those of the embodiment 7 of FIG. 11.

(Embodiment 9)

The present embodiment is different from the embodiment 7 in that, as shown in FIG. 16, a capacitor C7 is connected in parallel with the diode D3. The present embodiment is featured in that such an input current Iin shown in FIG. 17, (b) that rises or falls in the vicinity of a 0 V in the voltage of the A.C. power source Vs shown in FIG. 17, (a), can be improved in its input distortion.

Figure 18A:
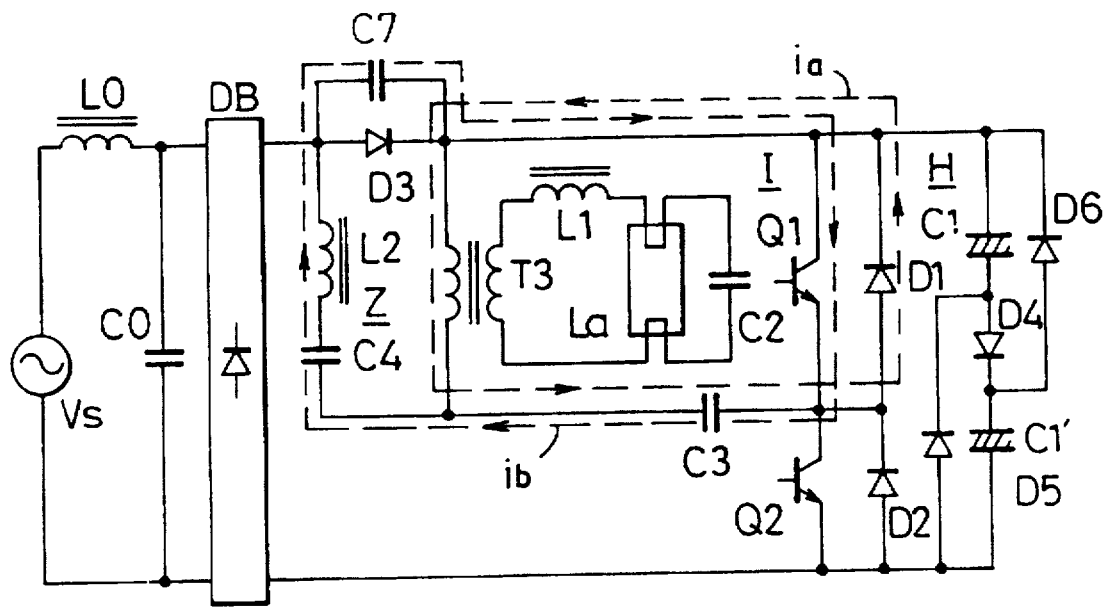
FIGS. 18A, 18B, 19A, 19B, 20A and 20B show circuit diagrams for explaining the operations of the embodiment 9 of FIG. 16.
Figure 18B:
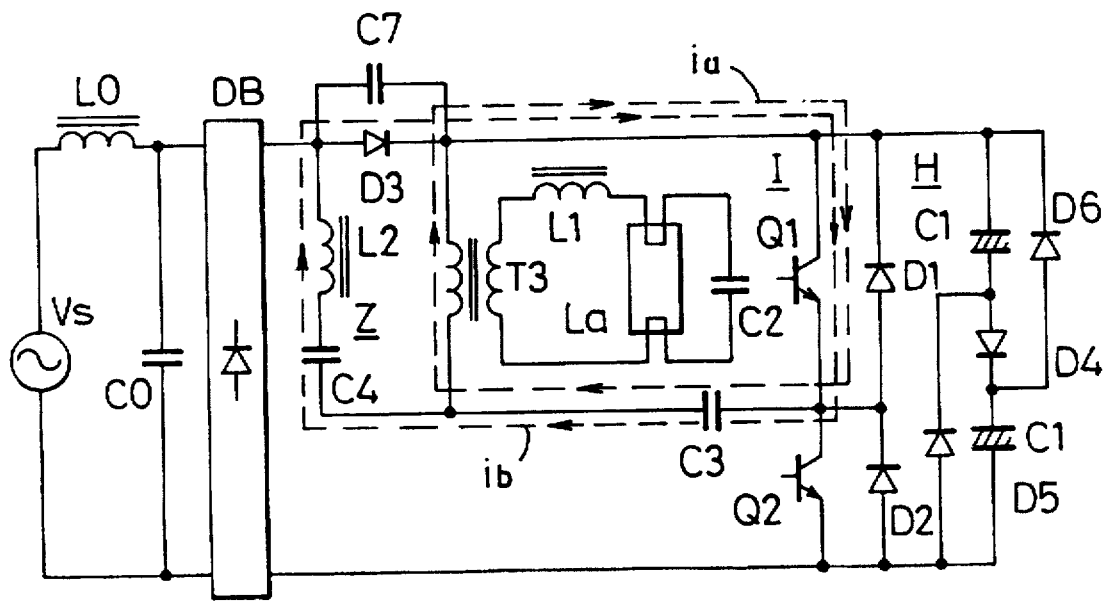
Figure 19A:
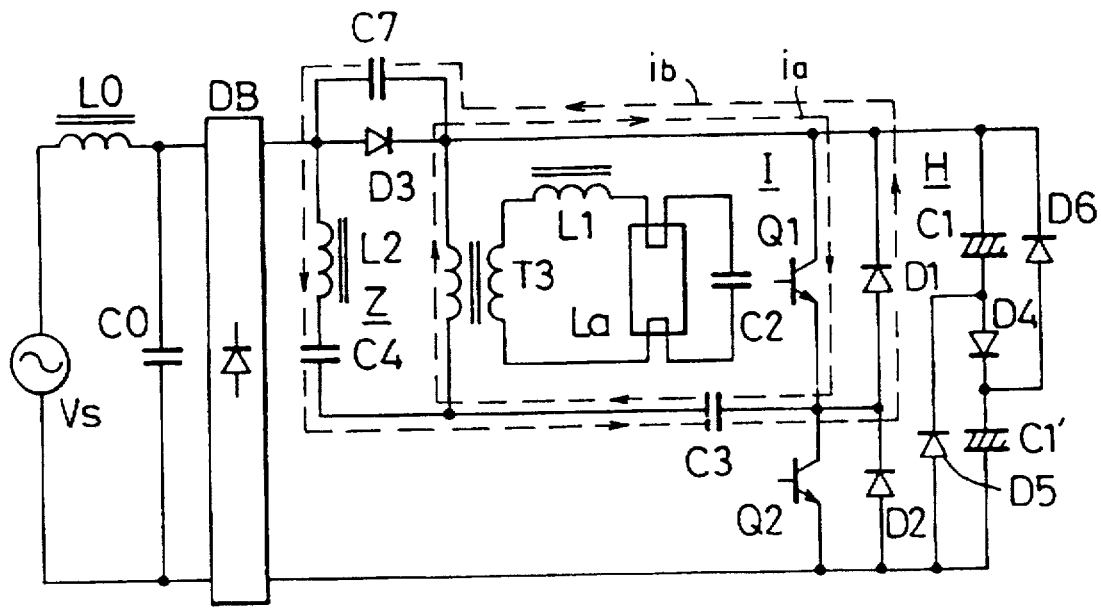
Figure 19B:
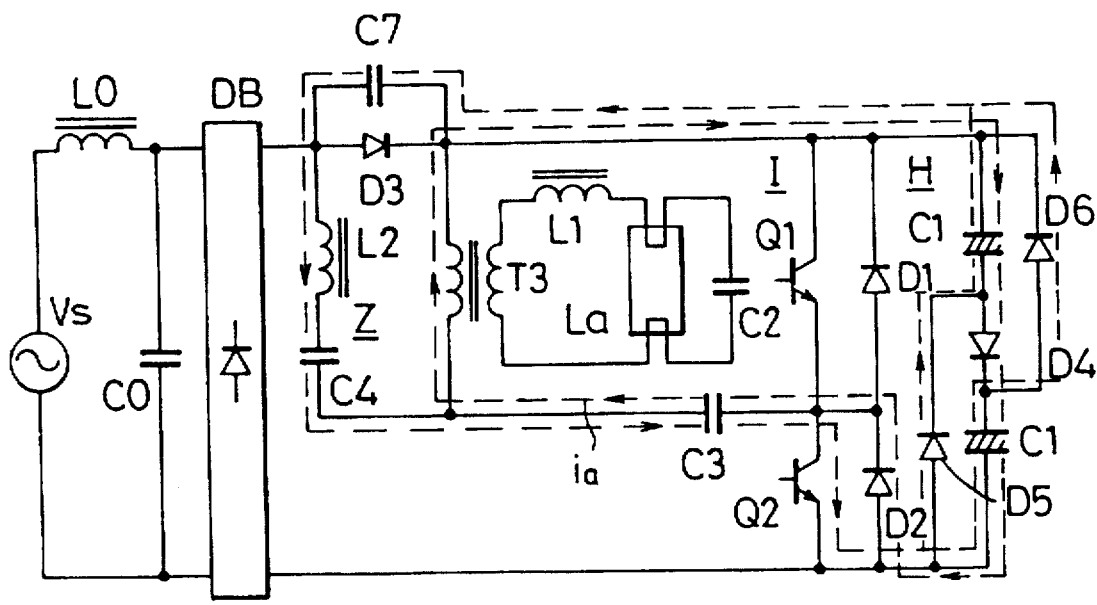

Explanation will then be made as to the operation of the inverter circuit I for improving the input distortion in the vicinity of a 0 V in the voltage of the A.C. power source Vs in the present embodiment in connection with the aforementioned modes 1 to 6 with reference to FIGS. 18A, 18B, 19A, 19B, 20A and 20B. In such a mode 1 as shown in FIG. 18A, first of all, the current ia flows as a regenerative current through a path of the primary winding of the transformer T3, capacitor C3 and diode D1 and again to the primary winding of the transformer T3 in the inverter circuit I. The current ib also flows through a path of the capacitor C4, inductor L2, capacitor C7, transistor Q1 and capacitor C3 and again to the capacitor C4. In such a mode 2 as shown in FIG. 18B, the current ia flows through a path of the capacitor C3, primary winding of the transformer T3 and transistor Q1 and again to the capacitor C3, while the current ib flows through a path of the capacitor C4, inductor L2, diode D3, transistor Q1 and capacitor C3 and again to the capacitor C4 in the inverter circuit L In such a mode 3 as shown in FIG. 19A, as in the mode 2 of FIG. 18B, the current ia flows through a path of the capacitor C3, primary winding of the transformer T3 and transistor Q1 and again to the capacitor C3 in the inverter circuit I. The current ib flows through a path of the capacitor C4, capacitor C3, diode D1, capacitor C7 and inductor L2 and again to the capacitor C4. In such a mode 4 as shown in FIG. 19B, further, the regenerative current ia flows through a path of the primary winding of the transformer T3, capacitor C1, diode D4, capacitor C1', diode D2 and capacitor C3 and again to the primary winding of the transformer T3 in the inverter circuit I.

Figure 20A:
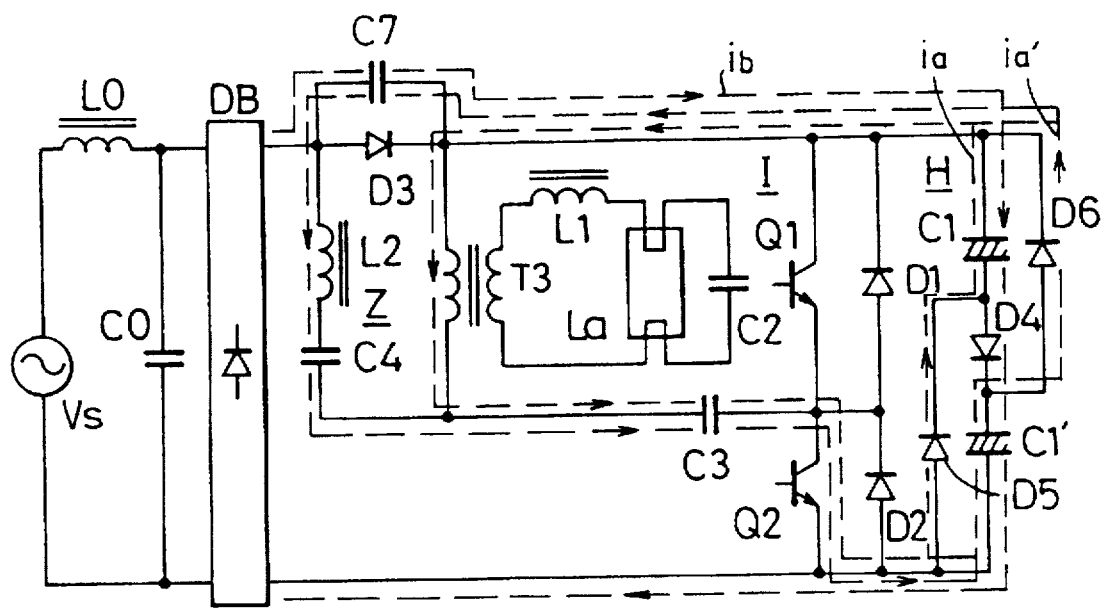
Figure 20B:
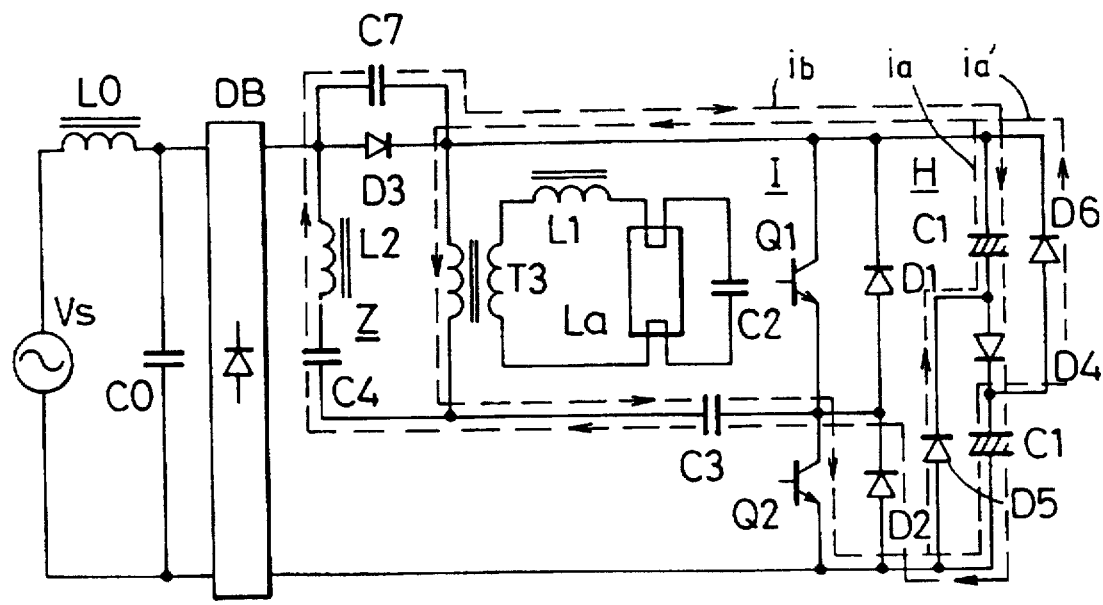

In such a mode 5 as shown in FIG. 20A, the current ia flows respectively through a path of the capacitor C1, primary winding of the transformer T3, capacitor C3, transistor Q2 and diode D5 and again to the capacitor C1 and also through a path of the capacitor C1', diode D6, primary winding of the transformer T3, capacitor C3 and transistor Q2 and again to the capacitor C1' in the inverter circuit I. The current ib also flows through a path of the full-wave rectifier DB, capacitor C7, capacitor C1, diode D4 and capacitor C1' and again to the full-wave rectifier DB. In such a mode 6 as shown in FIG. 20B, the currents ia and ia' flow respectively through a path of the capacitor C1, primary winding of the transformer T3, capacitor C3, transistor Q2, diode D5 and capacitor C1 and through a path of the capacitor C1', diode D6, primary winding of the transformer T3, capacitor C3, transistor Q2 and capacitor C1' respectively in the inverter circuit I. A current also flows through a path of the capacitor C4, inductor L2, capacitor C7, capacitor C1, diode D4, capacitor C1', diode D2, capacitor C3 and capacitor C4.

In this way, in the present embodiment, when the high frequency voltage is superimposed through the impedance element Z to charge the capacitors C1 and C1' of the smoothing circuit H, the current flows from the A.C. power source Vs directly to the smoothing circuit H only in the mode 5. This is because the current flowing through the capacitor C7 causes the anode side voltage of the diode D3 to become high. For this reason, in the vicinity of a 0 V in the voltage of the A.C. power source Vs, the input current Iin also approaches zero. Accordingly, to make such a waveform as shown in FIG. 17, (b) approach a sinusoidal waveform, the capacitor C7 effectively works. Other operation and effect of the present embodiment are substantially the same as those of the embodiment 7.

(Embodiment 10)

Figure 21:
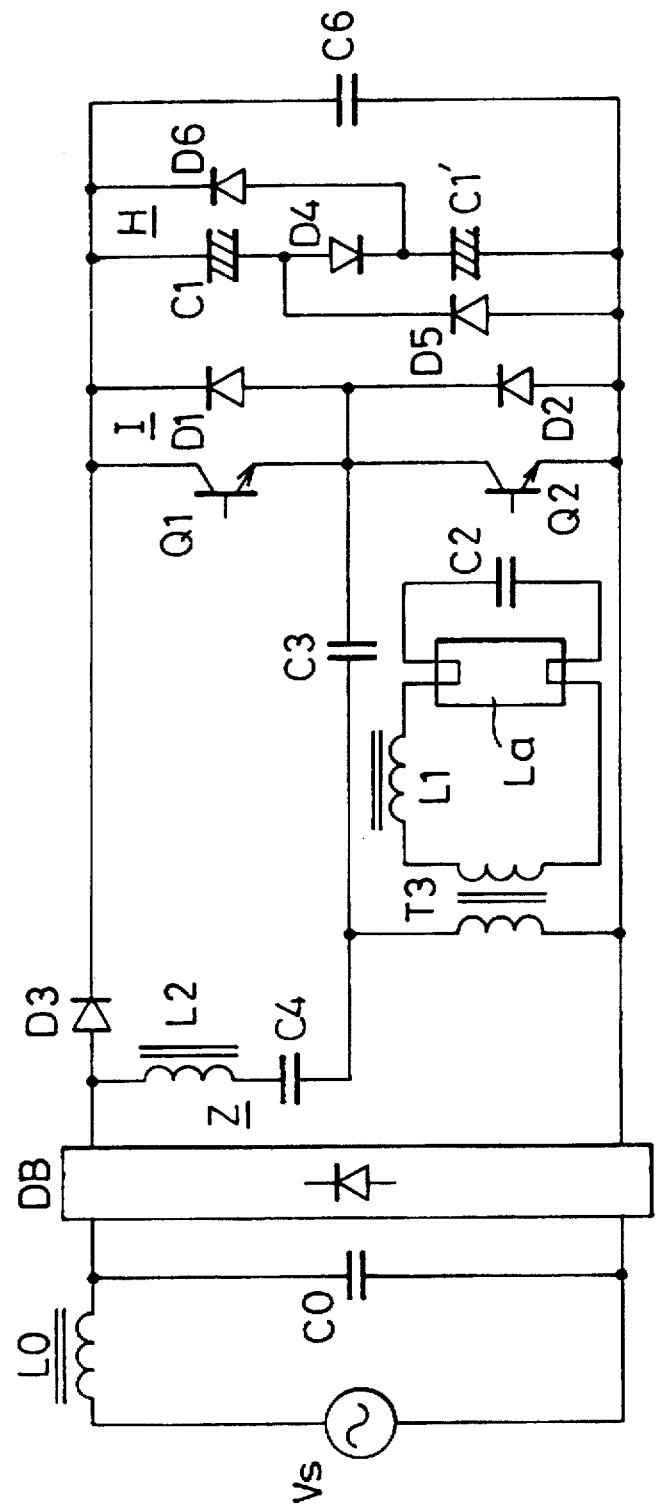
FIGS. 21 to 26 show circuit diagrams in accordance with embodiments 10 to 15 of the present invention.

The present embodiment is different from the embodiment 7 in that, as shown in FIG. 21, one of the both ends of the oscillating circuit Z0 of the inverter circuit I which is not connected to the DC-components blocking capacitor C3 is connected not to the cathode of the diode D3 but to the grounding side (minus one of the D.C. output ends of the full-wave rectifier DB) of the inverter device.

The operation of the present embodiment circuit is divided into 6 modes as in the embodiment 7 and the charging operation of the capacitors C1 and C1' of the smoothing circuit H through the impedance element Z is substantially the same as that in the embodiment 7, and thus explanation thereof is omitted and explanation will be made as to only the operation of the inverter circuit I in the vicinity of a 0 V in the voltage of the A.C. power source Vs.

In the aforementioned mode 1, a regenerative current flows through a path of the primary winding of the transformer T3, capacitor C3, diode D1, capacitor C1, diode D4 and capacitor C1' and again to the primary winding of the transformer T3 in the inverter circuit I.

In the modes 2 and 3, further, currents flow respectively through a path of the capacitor C1, transistor Q1, capacitor C3, primary winding of the transformer T3 and diode D5 and again to the capacitor C1 and through a path of the capacitor C1', diode D6, transistor Q1, capacitor C3 and primary winding of the transformer T3 and again to the capacitor C1' in the inverter circuit I.

In the mode 4, further, a regenerative current flows through a path of the primary winding of the transformer T3, diode D2 and capacitor C3 and again to the primary winding of the transformer T3 in the inverter circuit I. In the modes 5 and 6, a current flows through a path of the capacitor C3, transistor Q2 and primary winding of the transformer T3 and again to the capacitor C3. Therefore, the inverter circuit I is different from that in the embodiment 7 in that the capacitors C1 and C1' act as power supplies during the On period of the transistor Q1 while the DC-components blocking capacitor C3 acts as a power supply during the ON period (modes 4 to 6) of the transistor Q2. In the vicinity of a peak in the voltage of the A.C. power source Vs, a current flows through another path of the full-wave rectifier DB, diode D3, capacitor C1, diode D4 and capacitor C1' and again to the full-wave rectifier DB in the mode 2.

Other operation and effect of the present embodiment are substantially the same as those of the embodiment 7.

(Embodiment 11)

Figure 22:
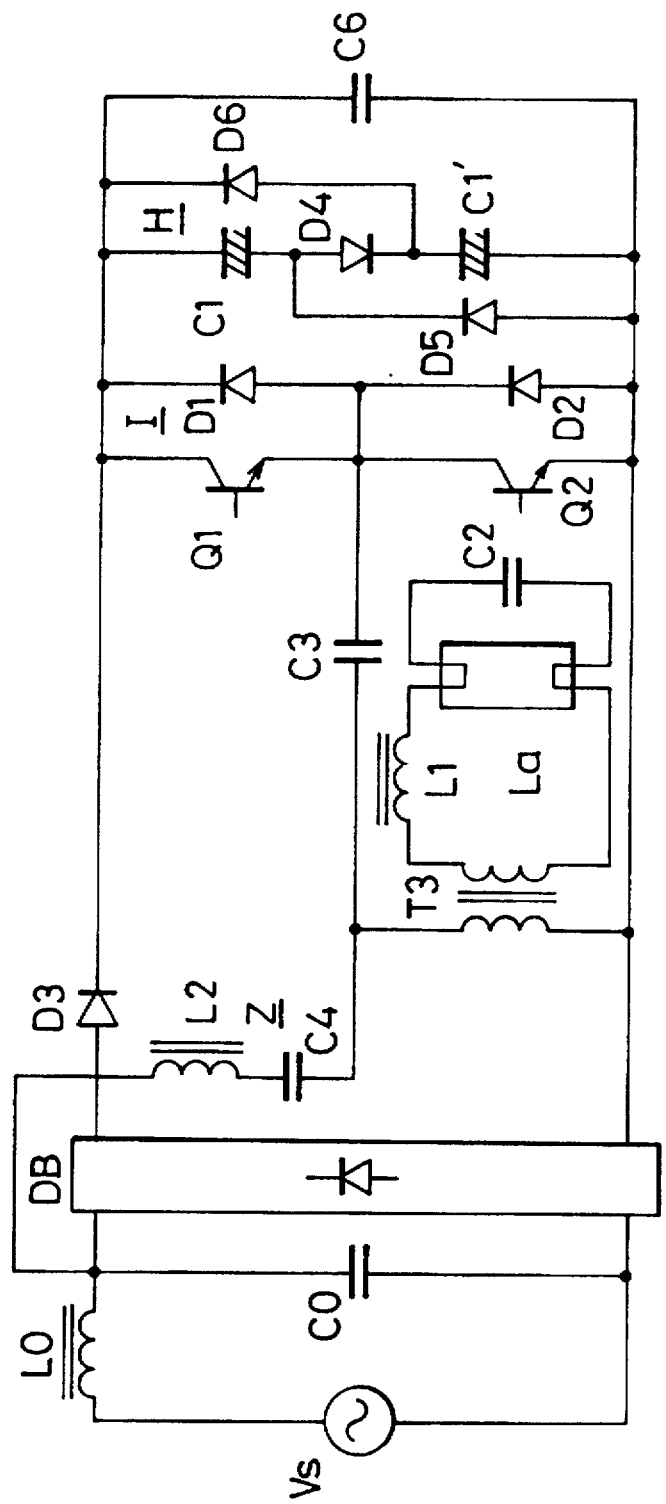

The present embodiment is different from the embodiment 8 in that, as shown in FIG. 22, one of the both ends of the oscillating circuit Z0 of the inverter circuit I not connected to the DC-components blocking capacitor C3 is connected not to the cathode side of the diode D3 but to the grounding side (minus one of the D.C. output ends of the full-wave rectifier DB) of the inverter device.

The circuit operation is divided into 6 modes as in the embodiment 8, but the operation of the inverter circuit I is exactly the same as that of the embodiment 10 and thus explanation thereof is omitted. The charging operation of the capacitors C1 and C1' of the smoothing circuit H through the impedance element Z is substantially the same as that of the embodiment 8 and the operation and effect of the present embodiment are substantially the same as those of the embodiment 7.

(Embodiment 12)

Figure 23:
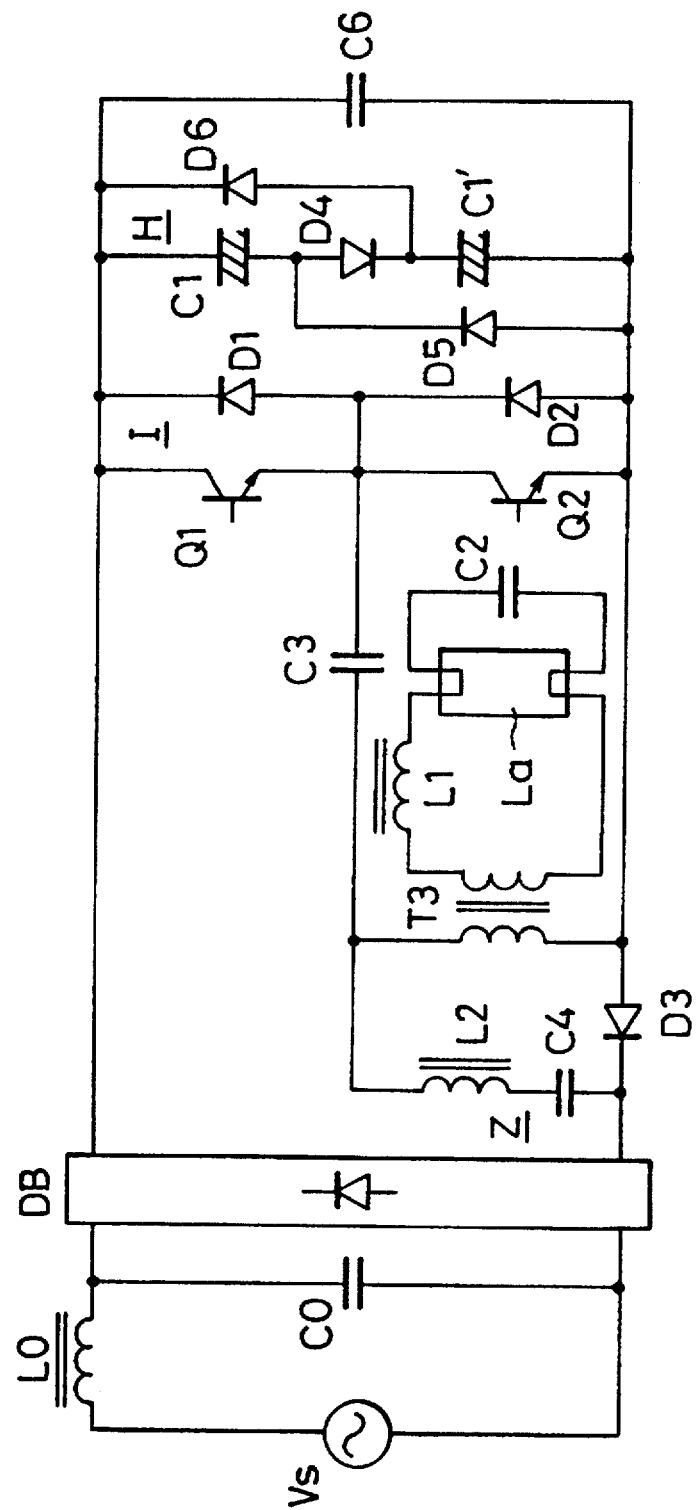

In the present embodiment, as shown in FIG. 23, one of the both ends of the oscillating circuit Z0 of the inverter circuit I not connected to the capacitor C3 is connected to grounding side (one of the output ends of the full-wave rectifier DB) of the inverter device, the junction point of the impedance element Z is connected closer to the full-wave rectifier DB than the aforementioned junction point of the oscillating circuit Z0, and the diode D3 is connected in its forward direction from the junction point of the oscillating circuit Z0 to the junction point of the impedance element.

The circuit operation of the present embodiment is divided into 6 modes as in the embodiment 7, among which the operation of the inverter circuit I is substantially the same as the embodiment 10 and thus explanation thereof is omitted and explanation will be made as to only the charging operation based on the superimposition of the high frequency voltage through the impedance element Z in the vicinity of a 0 V in the voltage of the A.C. power source Vs.

First, in the modes 1 and 2, a current flows through a path of the full-wave rectifier DB, transistor Q1, capacitor C3, inductor L2 and capacitor C4 and again to the full-wave rectifier DB. In the mode 3, a current flows through a path of the capacitor C4, inductor L2, capacitor C3, diode D1, capacitor C1, diode D4, capacitor C1' and diode D3 and again to the capacitor C4. In the modes 4 and 5, further, a current flows through a path of the capacitor C4, inductor L2, capacitor C3, transistor Q2 and diode D3 and again to the capacitor C4.

In the mode 6, a current flows through a path of the full-wave rectifier DB, capacitor C1, diode D4, capacitor C1', diode D2, capacitor C3, inductor L2 and capacitor C4 and again to the full-wave rectifier DB. In the vicinity of a peak in the voltage of the A.C. power source Vs, a current flows through an additional path of the full-wave rectifier DB, capacitor C1, diode D4, capacitor C1' and diode D3 and again to the full-wave rectifier DB in the mode 5.

Accordingly, in the inverter circuit I, the capacitors C1 and C1' act as power supplies during ON period (modes 1 to 3) of the transistor Q1, the DC-components blocking capacitor C3 acts as a power supply during the ON period (modes 4 to 6) of the transistor Q2, the charging operation of the capacitors C1 and C1' of the smoothing circuit H based on the superimposition of the high frequency voltage through the impedance element Z is carried out with a current flowing from the A.C. power source Vs through the full-wave rectifier DB in the modes 1, 2 and 6, so that, even in the vicinity of a 0 V in the voltage of the A.C. power source Vs, the input current can be continuously supplied and the input distortion can be improved.

The operation and effect of the present embodiment arranged in such a manner as mentioned above are substantially the same as those of the embodiment 7.

(Embodiment 13)

Figure 24:
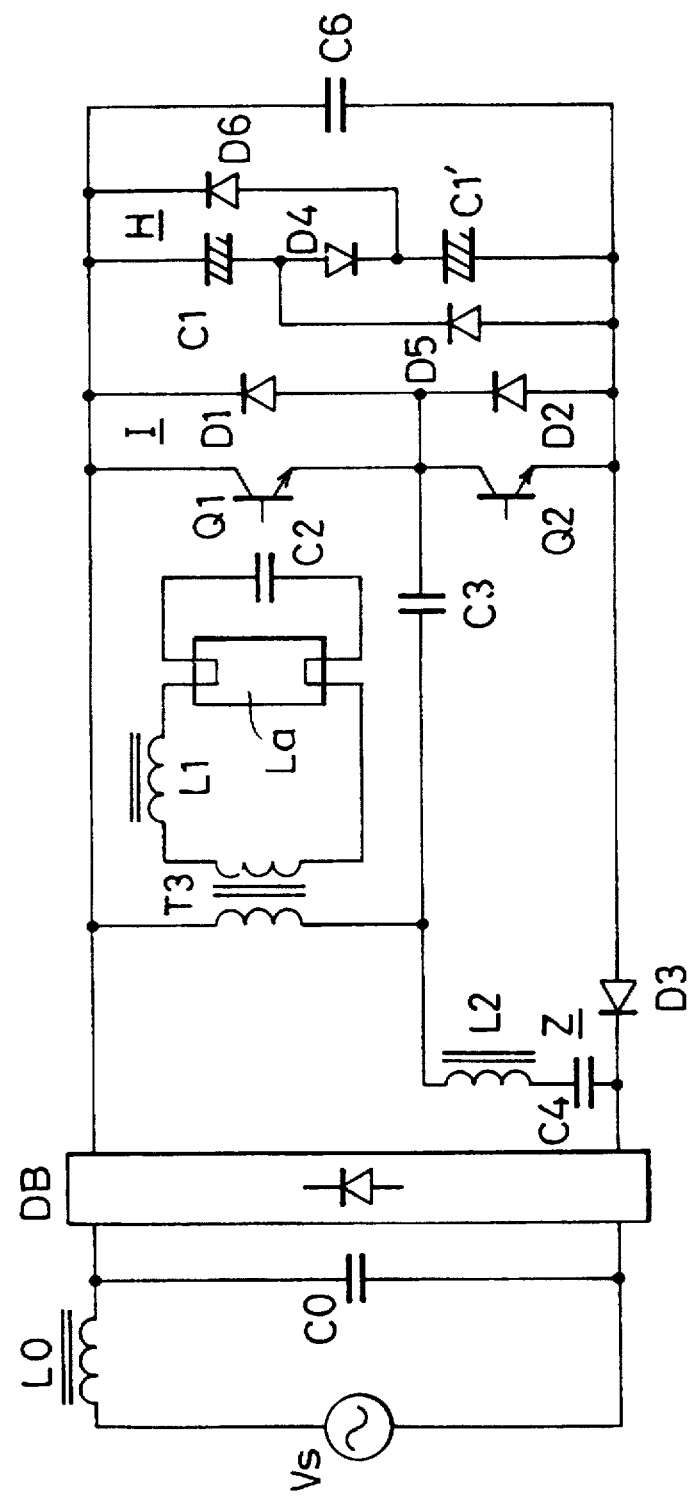

The present embodiment is different from the embodiment 12 in that, as shown in FIG. 24, the oscillating circuit Z0 of the inverter circuit I is connected between a junction point of the impedance element Z and capacitor C3 and plus one of the D.C. output ends of the full-wave rectifier DB.

The circuit operation of the present embodiment in the vicinity of a 0 V in the voltage of the A.C. power source Vs is divided into 6 modes as in the embodiment 12, among which the operation of the inverter circuit I is exactly the same as that of the embodiment 7 and the superimposition of the high frequency voltage through the impedance element Z and the charging operation of the capacitors C1 and C1' of the smoothing circuit H are same as those of the embodiment 12. Thus, explanations thereof are omitted.

The operation and effect of the present embodiment are substantially the same as those of the embodiment 7.

(Embodiment 14)

Figure 25:
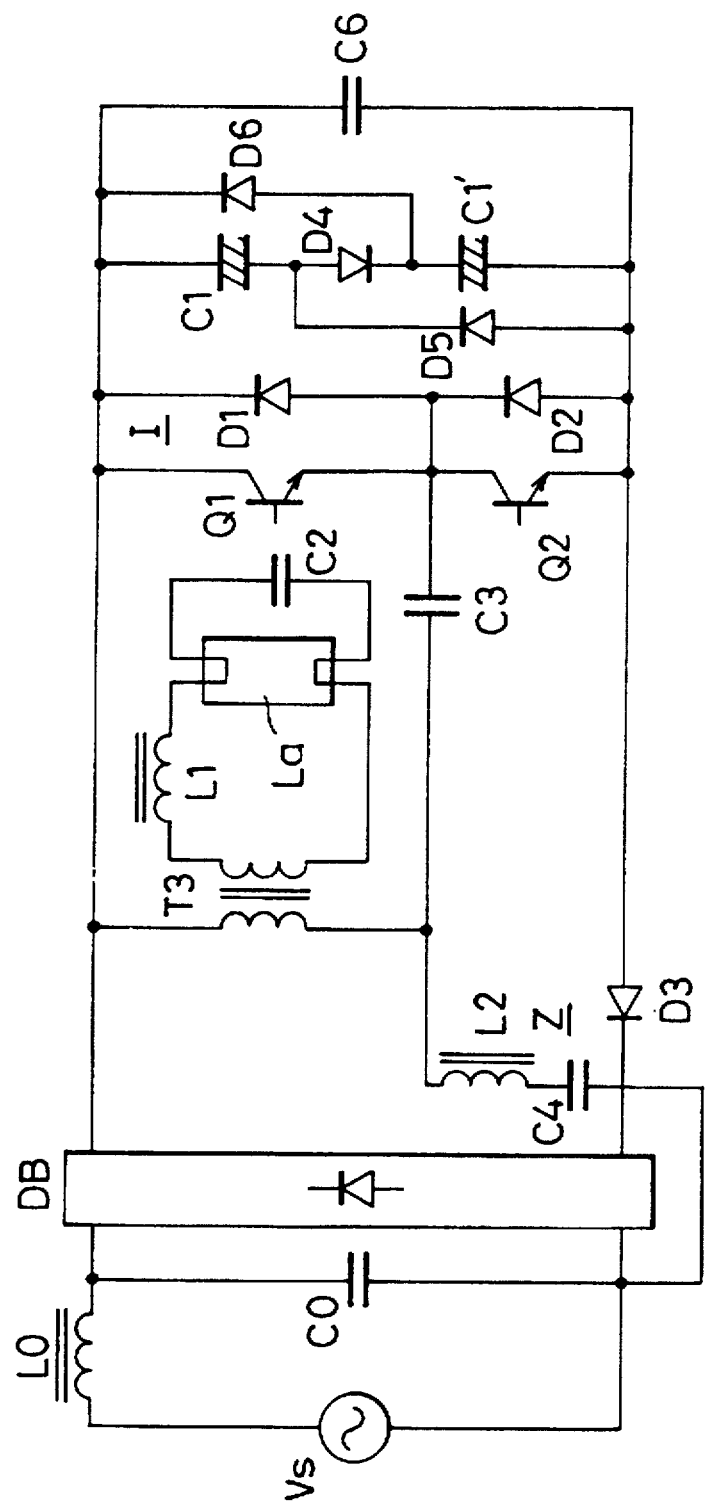

The present embodiment is different from the embodiment 13 in that, as shown in FIG. 25, the impedance element Z is connected between a junction point of the oscillating circuit Z0 of the inverter circuit I and capacitor C3 and one of the input ends of the full-wave rectifier DB.

The circuit operation of the present embodiment in the vicinity of a 0 V in the voltage of the A.C. power source Vs is divided into 6 modes as in the embodiment 13, among which the operation of the inverter circuit I is exactly the same as that of the embodiment 13 and the superimposition of the high frequency voltage through the impedance element Z and the charging operation of the capacitors C1 and C1' of the smoothing circuit H are same as those of the embodiment 8. Thus, explanations thereof are omitted.

The operation and effect of the present embodiment are substantially the same as those of the embodiment 7.

(Embodiment 15)

Figure 26:
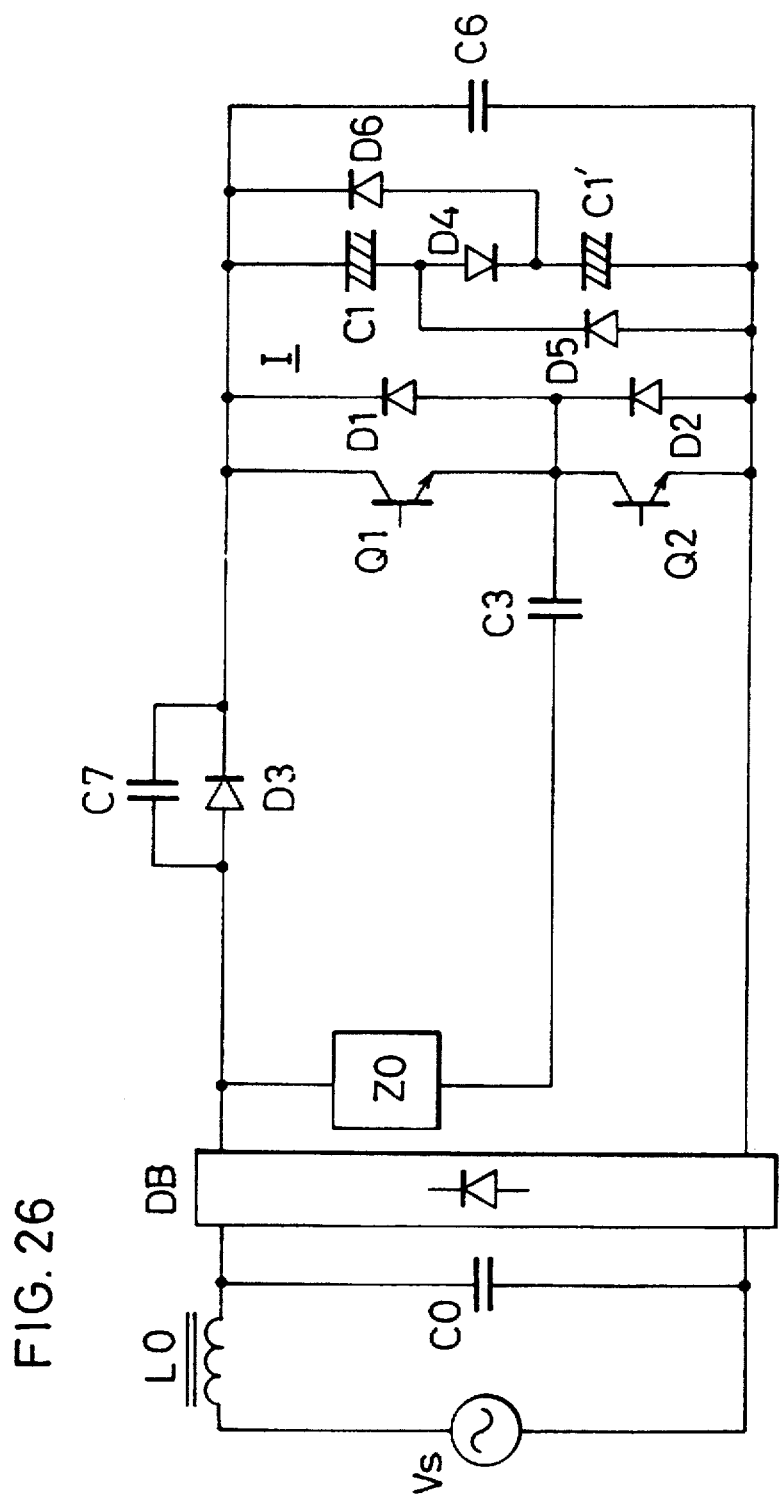
Figure 27:
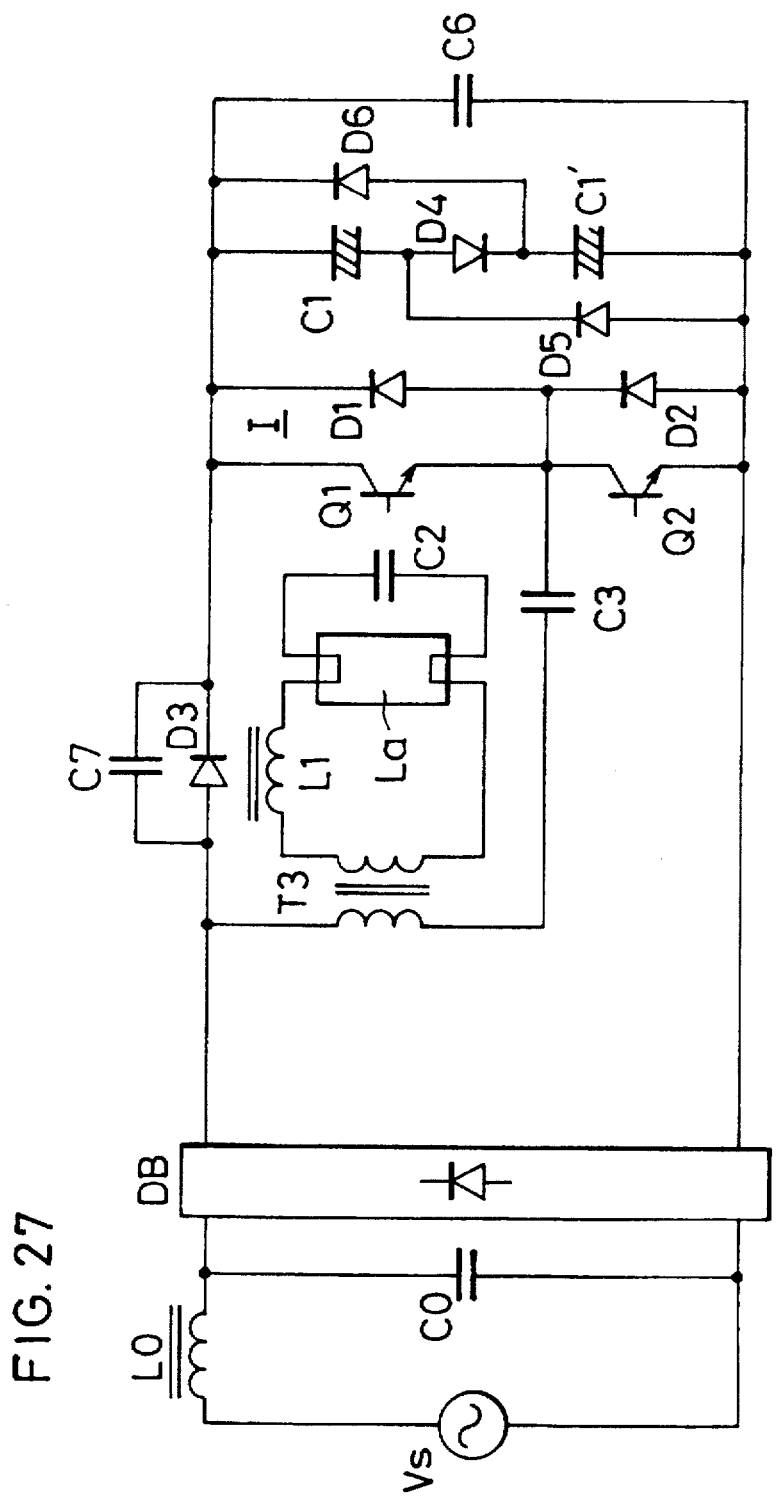
FIG. 27 is another specific circuit diagram of the embodiment of FIG. 26.

The present embodiment is arranged so that, as shown in FIG. 26, the impedance element Z and the oscillating circuit Z0 of the inverter circuit I in the embodiment 9 are made in the form of a single circuit, the oscillating circuit Z0 of the inverter circuit I is used also as the impedance element Z, and the oscillating circuit Z0 is connected to the connection position of the impedance element Z in the embodiment 9. FIG. 27 shows a specific circuit diagram of the present embodiment.

The operation of the present embodiment in the vicinity of a 0 V in the voltage of the A.C. power source Vs will be explained in connection with FIGS. 28A, 28B, 29A and 29B.

Figure 28A:
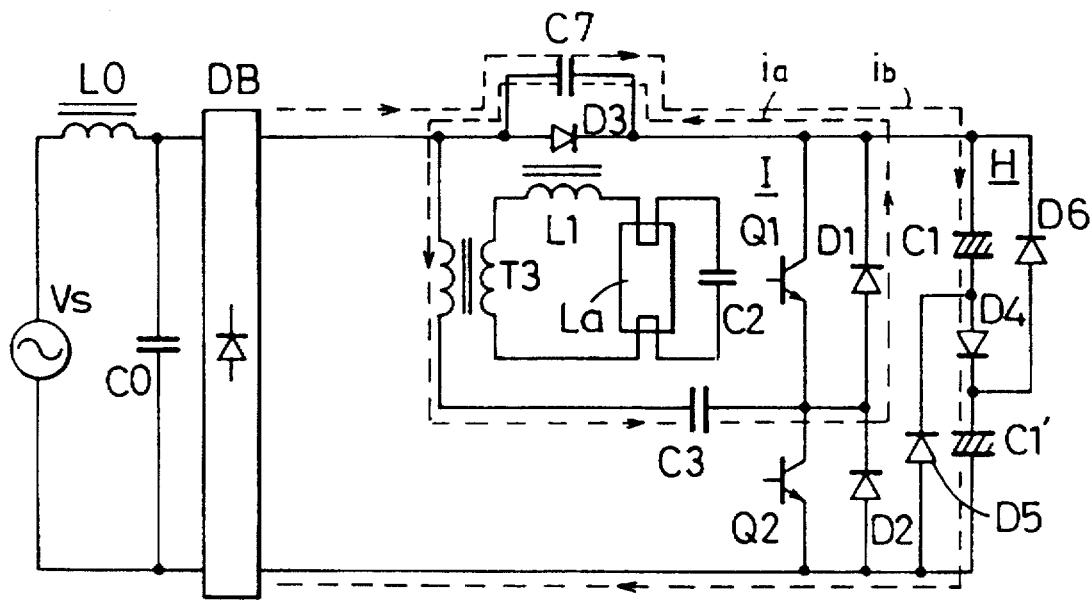
FIGS. 28A, 28B, 29A, 29B and 29C show circuit diagrams for explaining the operations of the embodiment 15 of FIG. 27.

The operation of the present embodiment is divided into 4 modes which follow according to the ON and OFF states of the transistors Q1 and Q2 of the inverter circuit I and the direction of a current through the oscillating circuit Z0. First, in such a mode 1 as shown in FIG. 28A, the transistor Q1 is in the ON state and the transistor Q2 is in the OFF state so that the regenerative current ia flows through a path of the primary winding of the transformer T3, capacitor C3, diode D1, capacitor C7 and primary winding of the transformer T3 in the inverter circuit I. The current ib also flows through a path of the full-wave rectifier DB, capacitor C7, capacitor C1, diode D4 and capacitor C1' and again to the full-wave rectifier DB.

Figure 28B:
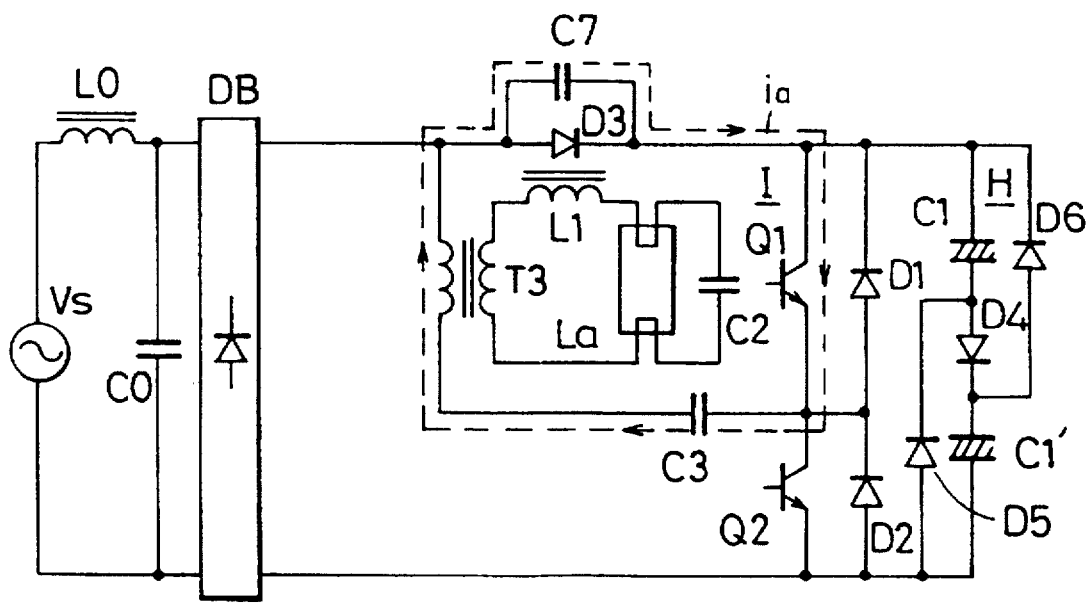

As shown in FIG. 28B, in such a mode 2 that the transistor Q1 is in the ON state and the transistor Q2 is in the OFF state, the current ia flows through a path of the primary winding of the transformer T3, capacitor C7, transistor Q1 and capacitor C3 and again to the primary winding of the transformer T3 in the inverter circuit I.

Figure 29A:
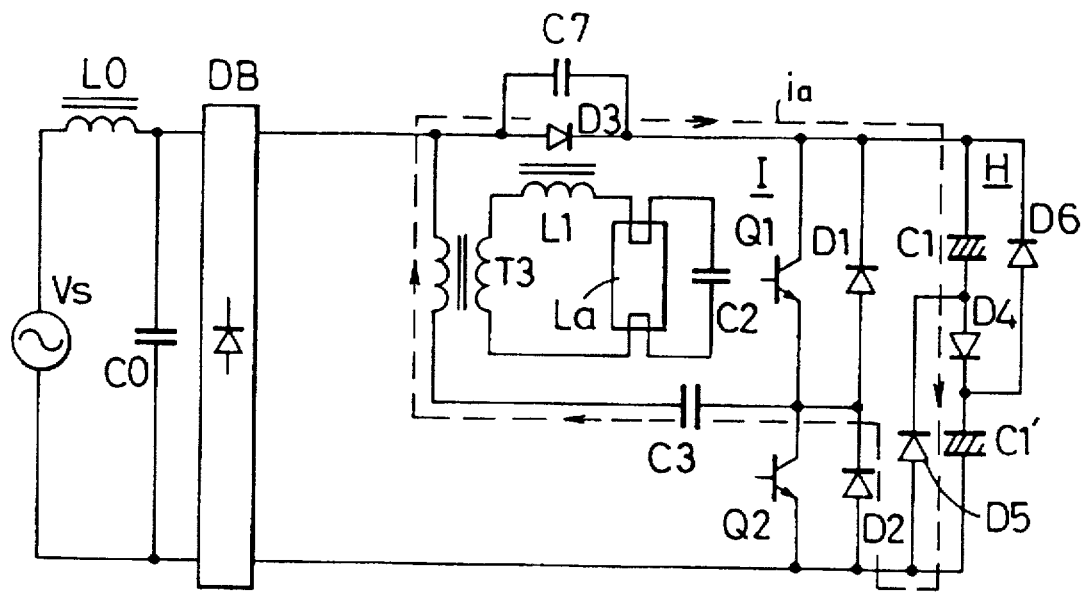

Further, in such a mode 3 that the transistor Q1 is in the OFF state and the transistor Q2 is in the ON state, as shown in FIG. 29A, the regenerative current ia flows through a path of the primary winding of the transformer T3, diode D3, capacitor C1, diode D4, capacitor C1', diode D2 and capacitor C3 and again to the primary winding of the transformer T3 in the inverter circuit I.

Figure 29B:
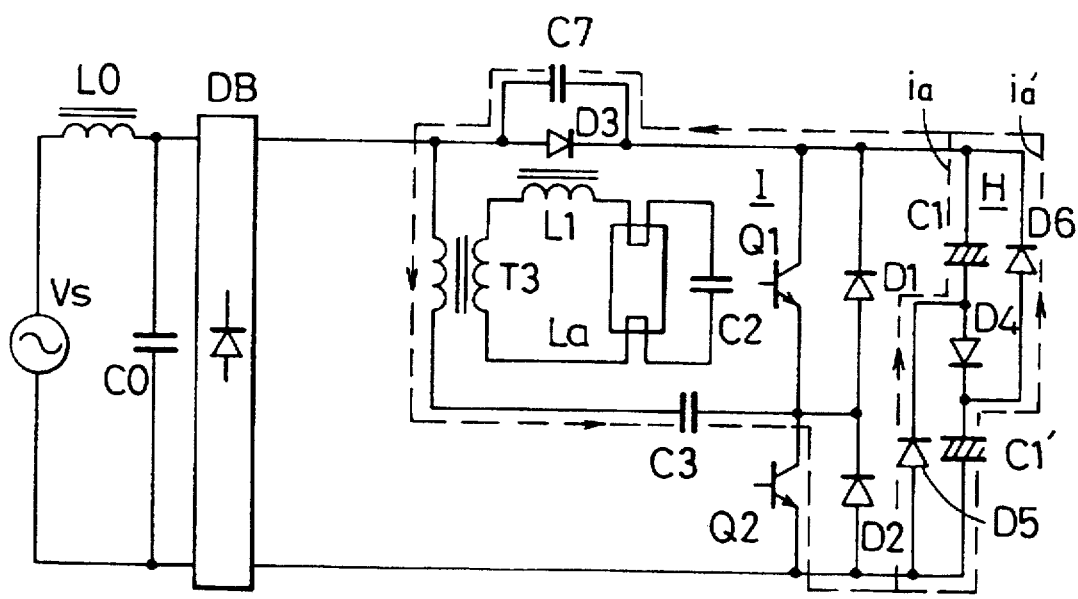

As shown in FIG. 29B, in such a mode 4 that the transistor Q1 is in the OFF state and the transistor Q2 is in the ON state, the currents ia and ia' flow through a path of the capacitor C1, capacitor C7, primary winding of the transformer T3, capacitor C3, transistor Q2 and diode D5 and again to the capacitor C1 and through a path of the capacitor C1', diode D6, capacitor C7, primary winding of the transformer T3, capacitor C3 and transistor Q2 and again to the capacitor C1' respectively in the inverter circuit I.

As mentioned above, in the mode 1, since the current flows directly from the A.C. power source Vs through the full-wave rectifier DB, the input current Iin can be continuously supplied and thus the input distortion can be improved even in the vicinity of a 0 V in the voltage of the A.C. power source Vs.

Figure 29C:
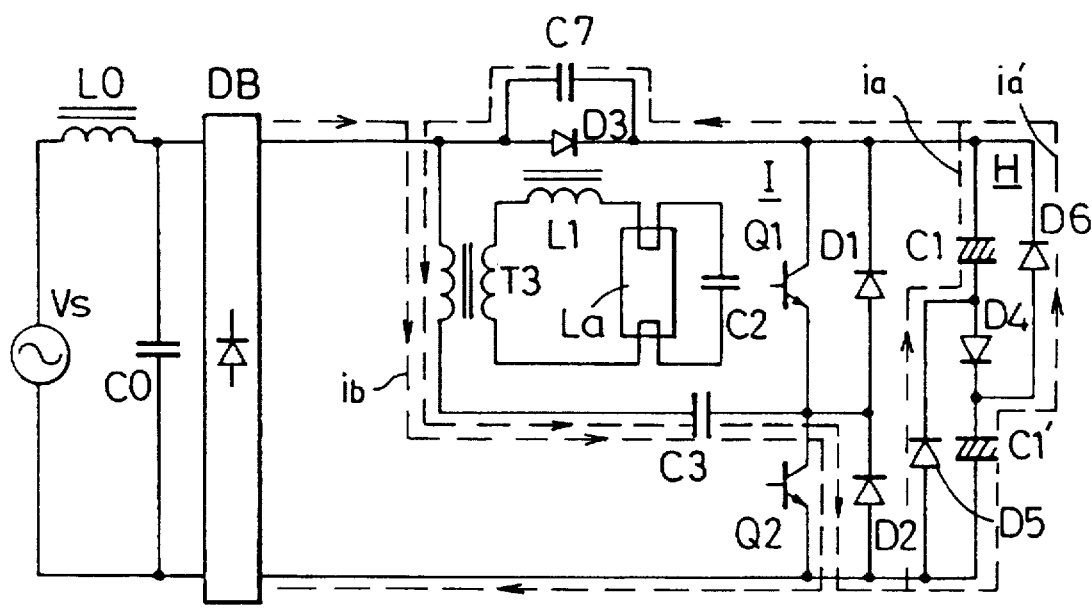

Furthermore, in the vicinity of a peak in the voltage of the A.C. power source Vs, such a mode 5 as to be shown below appears in place of the mode 4. In the mode 5, more in detail, currents ia, ia' flow through a path of the capacitor C1, capacitor C7, primary winding of the transformer T3, capacitor C3, transistor Q2 and diode D5 and again to the capacitor C1 and through a path of the capacitor C1', diode D6, capacitor C7, primary winding of the transformer T3, capacitor C3 and transistor Q2 and again to the capacitor C1' respectively in the inverter circuit I, as shown in FIG. 29C. In addition to the above currents, the current ib flows through a path of the full-wave rectifier DB, primary winding of the transformer T3, capacitor C3 and transistor Q2 and again to the full-wave rectifier DB.

In this way, the present embodiment is the same as the embodiment 7 in that the high frequency power is supplied to the discharge lamp La as a load according to the ON and OFF states of the transistors Q1 and Q2, but different therefrom in that the smoothing circuit H for ½ valley filling is used as the power supply of the inverter circuit I through the full period of the A.C. power source Vs in the embodiment 7, whereas, power is supplied to the inverter circuit I through the full-wave rectifier DB mainly from the smoothing circuit H in the vicinity of a 0 V in the voltage of the A.C. power source Vs and mainly from the A.C. power source Vs in the vicinity of a peak in the voltage of the A.C. power source Vs in the present embodiment.

Thus, since the present embodiment can omit the impedance element Z unlike the embodiment 9, the inverter device can be made much smaller in size. Other operation and effect of the present embodiment are substantially the same as those of the embodiment 7.

(Embodiment 16)

Figure 30:
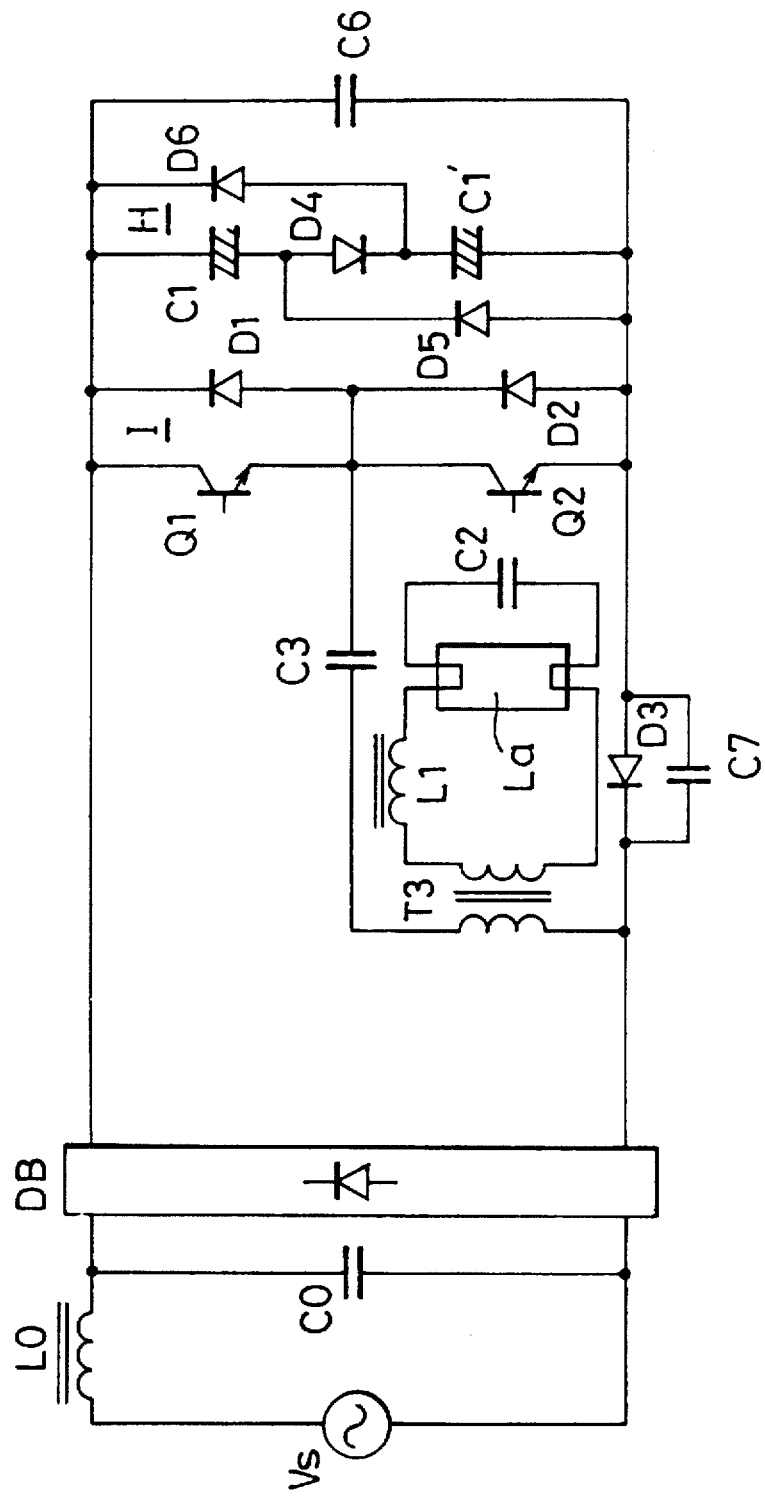
FIG. 30 is a circuit diagram in accordance with an embodiment 16 of the present invention.

The present embodiment is different from the embodiment 15 in that, as shown in FIG. 30, the oscillating circuit Z0 of the inverter circuit I is connected between the capacitor C3 and the grounding side (minus one of the D.C. output ends of the full-wave rectifier DB) of the inverter device, and a parallel circuit of the diode D3 and capacitor C7 is connected to the grounding side so that the diode D3 is directed forwardly from the transistor Q2 to the oscillating circuit Z0.

The operation of the present embodiment in the vicinity of a 0 V in the voltage of the A.C. power source Vs is divided into 4 modes as in the embodiment 15. More specifically, in such a mode 1 that the transistor Q1 is in the ON state and the transistor Q2 is in the OFF state, a regenerative current flows through a path of the primary winding of the transformer T3, capacitor C3, diode D1, capacitor C1, diode D4, capacitor C1' and diode D3 and again to the primary winding of the transformer T3 in the inverter circuit I.

In the mode 2 wherein the transistor Q1 is in the ON state and the transistor Q2 is in the OFF state, currents flow through a path of the capacitor C1, transistor Q1, capacitor C3, primary winding of the transformer T3, capacitor C7 and diode D5 and again to the capacitor C1 and through a path of the capacitor C1', diode D6, transistor Q1, capacitor C3, primary winding of the transformer T3 and capacitor C7 and again to the capacitor C1' respectively in the inverter circuit I.

In such a mode 3 that the transistor Q1 is in the OFF state and the transistor Q2 is in the ON state, a regenerative current flows through a path of the primary winding of the transformer T3, capacitor C7, diode D2 and capacitor C3 and again to the primary winding of the transformer T3, and also a current superimposed with the high frequency voltage flows through a path of the full-wave rectifier DB, capacitor C1, diode D4, capacitor C1' and capacitor C7 and again to the full-wave rectifier DB in the inverter circuit I.

In such a mode 4 that the transistor Q1 is in the OFF state and the transistor Q2 is in the ON state, further, a current flows through a path of the capacitor C3, transistor Q2, capacitor C7 and primary winding of the transformer T3 and again to the capacitor C3 in the inverter circuit I. Furthermore, in the vicinity of a peak in the voltage of the A.C. power source Vs, the following mode 5 appears in place of the above mode 2.

In the mode 5, more in detail, currents flow through a path of the capacitor C1, transistor Q1, capacitor C3, primary winding of the transformer T3, capacitor C7 and diode D5 and again to the capacitor C1 and through a path of the capacitor C1', diode D6, transistor Q1, capacitor C3, primary winding of the transformer T3 and capacitor C7 and again to the capacitor C1' respectively in the inverter circuit I. In addition to the above currents, another current flows through a path of the full-wave rectifier DB, transistor Q1, capacitor C3 and primary winding of the transformer T3 and again to the full-wave rectifier DB.

The operation and effect of the present embodiment are substantially the same as those of the embodiment 15.

(Embodiment 17)

Figure 31:
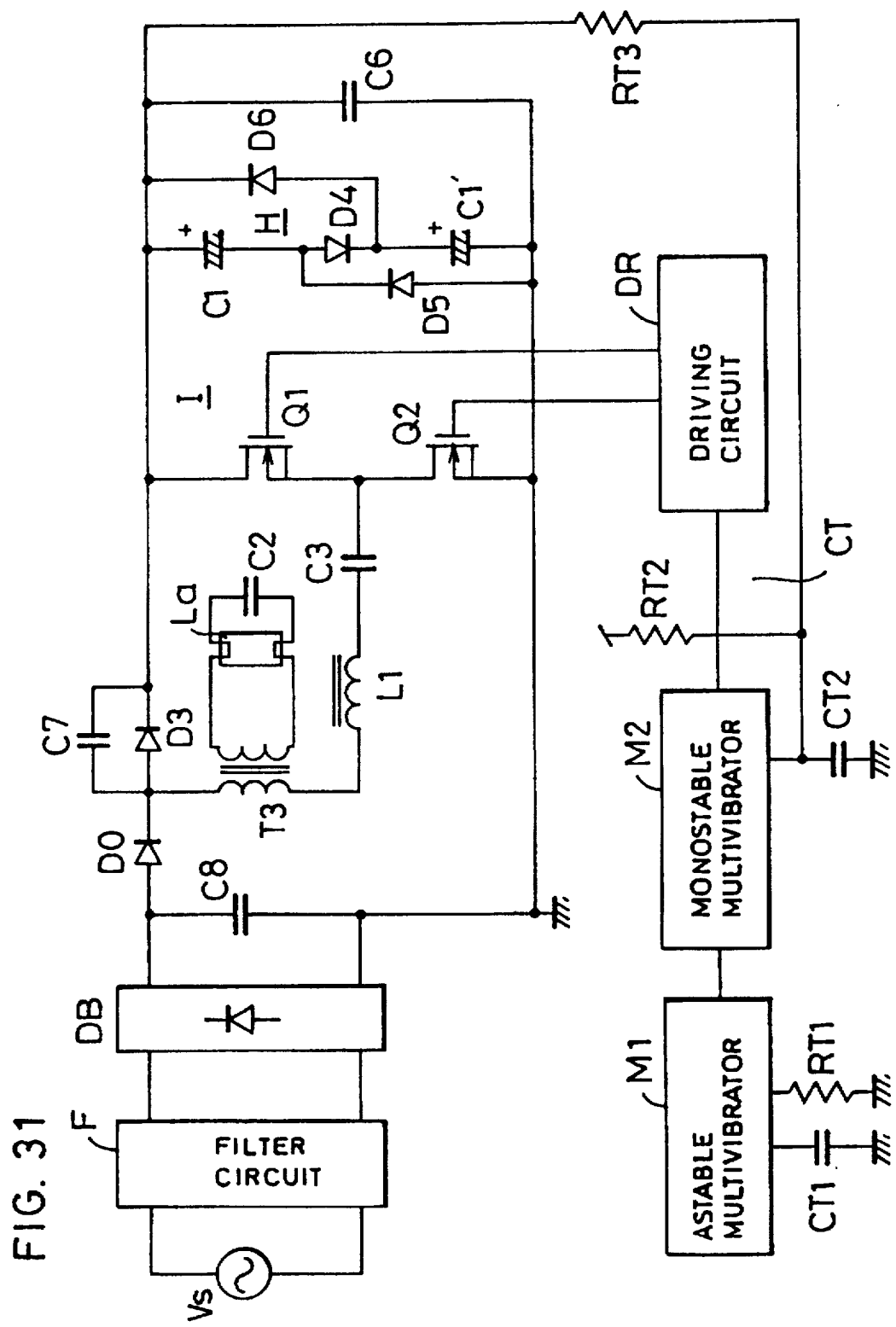
FIG. 31 is a circuit diagram in accordance with an embodiment 17 of the present invention.

In the foregoing respective embodiments, reference has not been made, in particular, to the control circuit CT. However, in the present embodiment 17, as shown in FIG. 31, the control circuit is made up of an astable multivibrator M1, a monostable multivibrator M2 and a drive circuit DR. Further, based on the circuit of the embodiment 15, the switching elements of the inverter circuit I comprise transistors Q1 and Q2 of an MOS FET type, parasitic diodes of the transistors Q1 and Q2 are used in place of the diodes D1 and D2, the inductor L1 of the oscillating circuit is inserted between the primary winding of the transformer T3 and the capacitor C3, the diode D0 is inserted between the diode D3 and the output ends of the full-wave rectifier DB, and the capacitor C8 is inserted between the output ends of the full-wave rectifier DB, unlike the embodiment 9. The low pass filter F can be included in the present embodiment.

Explanation will next be made as to the operation of the present embodiment, in particular, mainly the control circuit CT. More specifically, the oscillation period of the astable multivibrator M1 is determined by a time constant of a capacitor CT1 and a resistor RT1 and an oscillation output of the astable multivibrator M1 is provided to the monostable multivibrator M2 as its trigger signal. The output pulse width of the monostable multivibrator M2 is determined by a time constant of a capacitor CT2 and a resistor RT2 and an output pulse of the monostable multivibrator M2 is provided to the transistors Q1 and Q2 through the drive circuit DR as an ON/OFF signal for the gates of the transistors Q1 and Q2.

In the illustrated example, a voltage across the capacitor C6 connected in parallel to the smoothing circuit H is connected through a resistor RT3 to a junction point between the capacitor CT2 and resistor RT2. In other words, the charging operation of the capacitor CT2 is carried out quickly to shorten the output pulse width of the monostable multivibrator M2 when the power voltage of the inverter circuit I is high, while the charging operation of the capacitor CT2 is carried out slowly to prolong the output pulse width of the monostable multivibrator M2 when the power voltage of the inverter circuit I is low.

The drive circuit DR is arranged to output such a drive signal that turns OFF the transistor Q1 and turns ON the transistor Q2 when the monostable multivibrator M2 has an output of H level and that turns ON the transistor Q1 and turns OFF the transistor Q2 when the monostable multivibrator M2 has an output of L level.

With such an arrangement as mentioned above, when the voltage across the capacitor C6 is high, a duration of one period of the operation of the inverter circuit I, during which a current flows through a path of the diode D0, primary winding of the transformer T3, inductor L1, capacitor C3 and transistor Q2, can be made short; while a duration of one period of the operation of the inverter circuit I, during which a current flows through a path of the diode D0, parallel circuit of the diode D3 and capacitor C7, capacitor C1, diode D4 and capacitor C1', can be made long. When the voltage across the capacitor C6 is low, on the contrary, the control is carried out in such a manner as opposite to the above.

When the intervals during which the currents flow through the respective paths are controlled according to the power voltage of the inverter circuit I in this way, harmonics components contained in the input current waveform can be made less and thus the ripple rate or crest factor of the lamp current can be improved.

More specifically, the pulse width of the transistors Q1 and Q2 is controlled according to the voltage across the capacitor C6 to suppress the instantaneous value of the lamp current when the voltage of the capacitor C6 is high while to heighten the instantaneous value of the lamp current when the voltage of the capacitor C6 is low, with the result of an improved crest factor of the lamp current.

In FIG. 32A, (a) shows a waveform of the voltage across the capacitor C6, (b) shows a waveform of the lamp current and (c) shows a waveform of the input current Iin when the resistor RT3 for detecting the voltage of the capacitor C6 is not provided. In FIG. 32B, (a') shows a waveform of the voltage across the capacitor C6, (b') shows a waveform of the lamp current and (c') shows a waveform of the input current Iin when the resistor RT3 for detecting the voltage of the capacitor C6 is provided.

In the waveform of the lamp current shown in FIG. 32A, there is present a second peak value in the vicinity of zero-cross points in the input current, which results from the load characteristic of the inverter circuit I. A voltage across the capacitor C7 has such a waveform as shown in FIG. 33, (b) and the A.C. power source Vs has such a waveform as shown in FIG. 33, (a). The voltage across the capacitors C1 and C1' and across the capacitor C6 is much higher than the voltage of the A.C. power source Vs in the vicinity of zero-cross points in the voltage of the A.C. power source Vs shown in FIG. 33,(a), so that a time interval taken until a potential (equal to a potential of the capacitor C6) at the cathode side of the diode D3 becomes lower than a potential at the anode side thereof, is made long and thus the diode D3 is put substantially in its OFF state.

Accordingly, when the diode D3 is viewed as a load of the inverter circuit I, a time interval, during which the capacitor C7 is connected in series with the inductor L1 as an element for limiting of the lamp current, is made long in one operational period of the inverter circuit I, which acts to substantially reduce the lamp-current limiting impedance and to increase the lamp current in the vicinity of zero-cross points in the voltage of the A.C. power source Vs as mentioned above.

Although the output pulse width of the monostable multivibrator M2 has been controlled in the present embodiment, the oscillation period of the astable multivibrator M1 may be controlled instead. It goes without saying that both of the oscillation period and pulse width can also be controlled if necessary.

(Embodiment 18)

Figure 34:
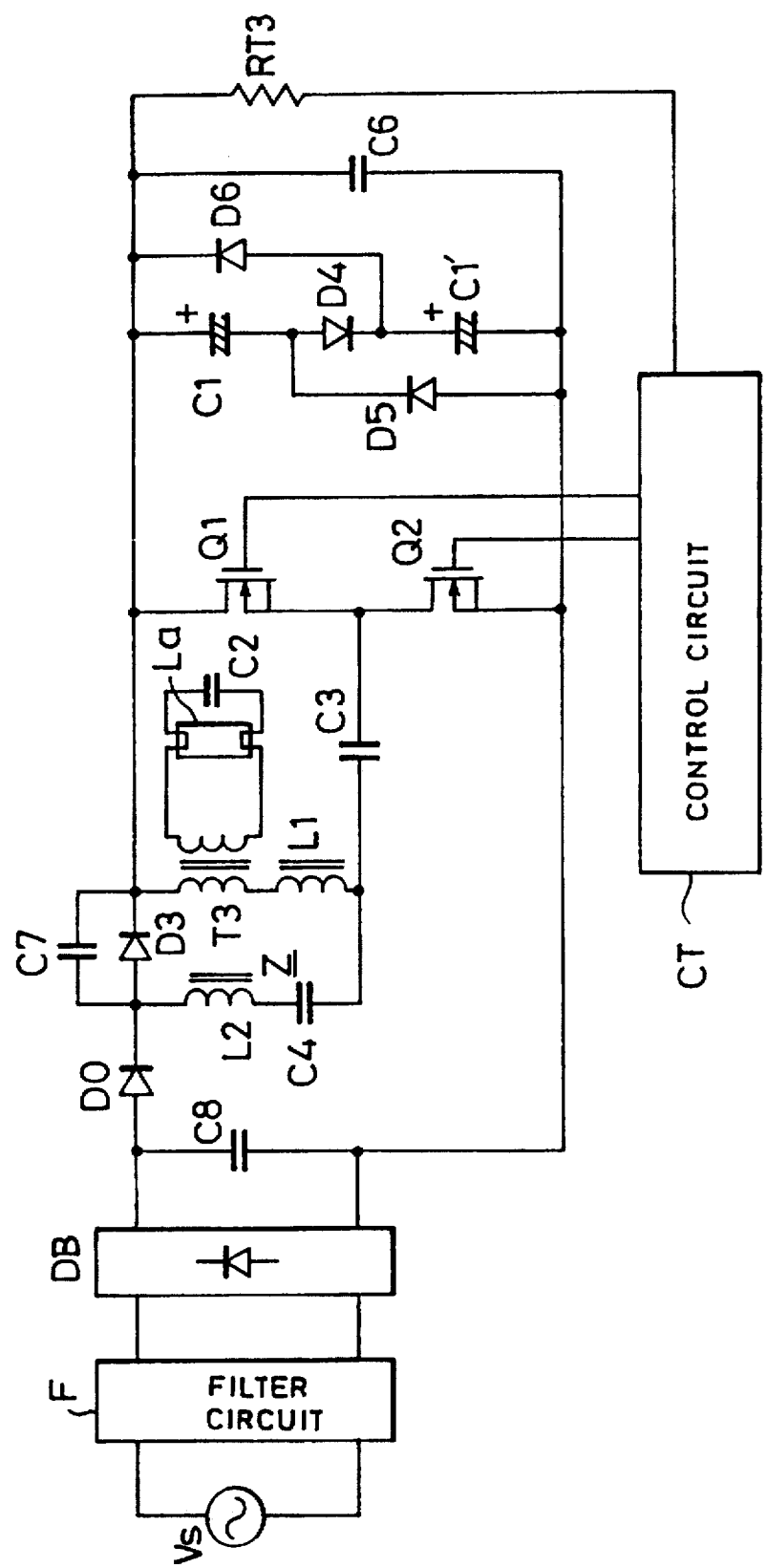
FIG. 34 is a circuit diagram in accordance with an embodiment 18 of the present invention.

The present embodiment, which is based on the embodiment 9 and uses the control circuit CT of the embodiment 17, is different in circuit arrangement from the embodiment 9 in that, as shown in FIG. 34, the transistors Q1 and Q2 of a MOS FET type are used as the switching elements of the present invention, parasitic diodes of the transistors Q1 and Q2 are utilized in place of the diodes D1 and D2, the inductor L1 of the oscillating circuit is inserted between the primary winding of the transformer T3 and the capacitor C3, and the diode D0 is inserted between the diode D3 and the full-wave rectifier DB. And the present embodiment is provided therein with the low pass filter F.

Even in the present embodiment, since the frequency or pulse width of the output pulses for driving the transistors Q1 and Q2 is changed according to the voltage of the capacitor C6, i.e., to the power voltage of the inverter circuit I through the resistor RT3, the waveform distortion of the input current Iin can be improved while the crest factor of the lamp current can be improved as in the embodiment 17.

(Embodiment 19)

Figure 35:
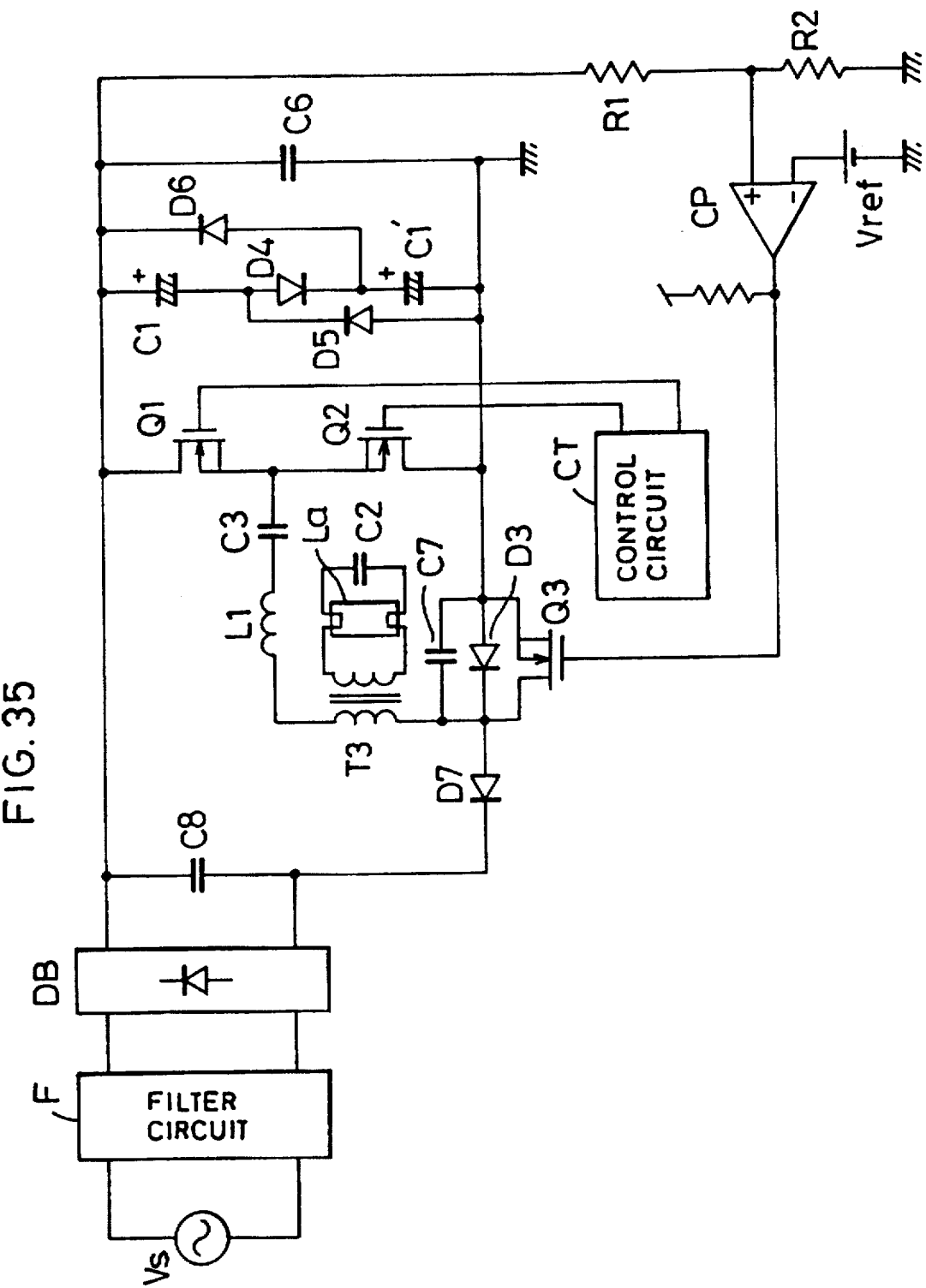
FIG. 35 is a circuit diagram in accordance with an embodiment 19 of the present invention.

In the present embodiment, as shown in FIG. 35, the diodes D7 and D3 are inserted in the grounding side of the inverter device and one of the both ends of the oscillating circuit of the inverter circuit I not connected to the DC-components blocking capacitor C3 is connected to a junction point between the diodes D7 and D3. The operation of the inverter circuit I is substantially the same as that of the embodiment 17, but a transistor Q3 comprising an MOS FET is wired across a parallel circuit of the diode D3 and capacitor C7 and the transistor Q3 is controlled by an output of a comparator CP to thereby improve the waveform distortion of the input current Iin. The control circuit CT, which does not use any resistor as in the embodiments 17 and 18, is arranged to drive the transistors Q1 and Q2 with an output thereof having a predetermined frequency and a constant pulse width. The comparator CP compares with such a reference voltage Vref as shown in FIG. 36, (b) a voltage obtained by dividing such a voltage across the capacitor C6 as shown in FIG. 36,(a), i.e., a voltage across the capacitors C1 and C1' of the smoothing circuit H with use of resistors R1 and R2. When the divided voltage is larger than the reference voltage Vref, the comparator CP generates such an output of H level as shown in FIG. 36, (c) to turn ON the transistor Q3.

When the voltage of the A.C. power source Vs becomes lower than the voltage across the capacitor C6, this causes the transistor Q3 to be turned OFF so that a current flows through a path of the transistor Q1, capacitor C3, inductor L1, primary winding of the transformer T3 and diode D7 in the inverter circuit I. When the voltage of the A.C. power source Vs is higher than the voltage across the capacitor C6, a charging current flows from the full-wave rectifier DB through the capacitors C1 and C1' of the smoothing circuit H according to the power voltage. That is, a charging current flows from the A.C. power source Vs through the full-wave rectifier DB to the smoothing circuit H according to the power voltage during the high period of the power voltage of the A.C. power source Vs; whereas, the input current flows through the inverter circuit I during the low period of the power voltage, so that the energy stored in the inverter circuit I causes the charging current to the smoothing circuit H to flow and the input current Iin to flow through full one period of the A.C. power source Vs, whereby the waveform distortion of the input current can be improved.

When the voltage of the A.C. power source Vs is high, since tuning ON of the transistor Q3 causes a voltage across the capacitor C1' to be prevented from being higher than a peak value in the voltage of the A.C. power source Vs, it can be suppressed that a voltage across the capacitor C6 becomes abnormally high regardless of the state of the load circuit.

In the present embodiment, the voltage across the capacitor C6 may be applied to the control circuit CT through the resistor RT3 to control the switching operation of the transistors Q1 and Q2 of the inverter circuit I according to the voltage.

(Embodiment 20)

Figure 37:
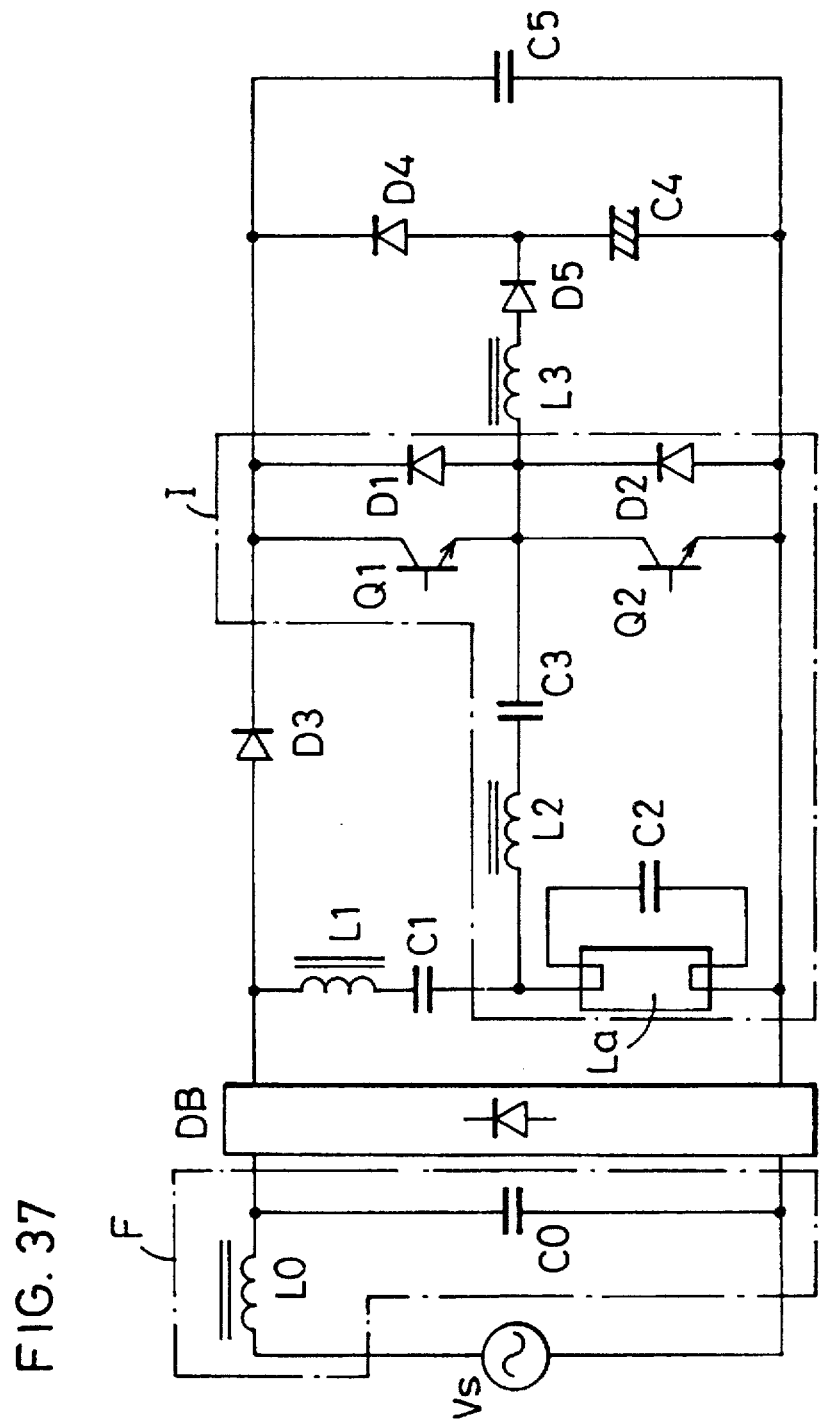
FIGS. 37 to 43 show circuit diagrams in accordance with embodiments 20 to 26 of the present invention.

In the present embodiment, as shown in FIG. 37, such an A.C. power source Vs as a commercial power source is connected to the rectifier DB comprising a diode bridge through the filter circuit F so that the rectifier DB full-wave rectifies the voltage of the A.C. power source Vs. The filter circuit F, which is made in the form of a low pass filter comprising an choke coil L0 connected between the A.C. power source Vs and rectifier DB and a capacitor C0 connected between the AC input ends of the rectifier DB, acts to block high frequencies corresponding nearly to the switching frequency (several tens to several hundreds of kHz) of an inverter circuit I (to be described later) and to pass low frequencies corresponding nearly to the frequency (several tens of Hz) of the A.C. power source Vs therethrough.

Connected between the D.C. output ends of the rectifier DB is a series circuit of the forwardly-directed diode D3 and capacitor C5. Connected in parallel with the capacitor C5 is the aforementioned inverter circuit I which may have the same structure as the inverter circuit I used in the foregoing embodiments. The inverter circuit I includes a series circuit of a pair of transistors Q1 and Q2 connected in parallel with the capacitor C5. Connected to one of the switching elements connected to negative one of the output ends of the rectifier DB is a series circuit of the load circuit, capacitor C3 and inductor L2. The switching elements comprise the transistors Q1 and Q2 and the diodes D1 and D2 connected between their collector and emitter of the transistors Q1 and Q2 in inverse parallel relationships thereto respectively. The switching elements are alternately turned ON and OFF at a high switching frequency (several tens to several hundreds of kHz) but so as to avoid the simultaneous turned ON of the transistors Q1 and Q2 under the control of such a control circuit as used in the embodiments of FIGS. 31 and 34. Further, the load circuit comprises the discharge lamp La having both filaments and the capacitor C2 connected between non-power-supply side ends of the both filaments of the discharge lamp La. In this case, the inductor L2, capacitors C2 and C3 and discharge lamp La collectively form a resonance circuit.

Prior to lighting of the discharge lamp La, a current flows through the capacitor C2 to preheat the filaments of the lamp. Accordingly, the resonance frequency of the aforementioned resonance circuit prior to the lighting of the discharge lamp La is caused to be different from that after the lighting of the discharge lamp La. For this reason, the resonance frequency is set to be close to the ON and OFF switching frequency of the transistors Q1 and Q2 during the preheating to start period of the lamp to supply much energy to the discharge lamp La to increase its startability; whereas, the resonance frequency is shifted from the switching frequency after the lighting of the discharge lamp La to supply less energy to the discharge lamp La and to lighten the stress imposed on the constituent elements. Further inserted between one of the D.C. output ends of the rectifier DB and the load circuit is an impedance element which comprises a series circuit of the inductor L1 and capacitor C1.

A feature of the present embodiment is that a series circuit of the capacitor C4 and diode D4 is wired in parallel with the capacitor C5 and a series circuit of the inductor L3 and diode D5 is connected between a junction point of the switching elements and a junction point of the capacitor C4 and diode D4. More specifically, one (transistor Q1 and 1 diode D1) of the switching elements connected to positive one of the both ends of the rectifier DB, inductor L3, diodes D5 and D4 and capacitor C4 collectively form a voltage step-down chopper circuit. The voltage step-down chopper circuit commonly uses one switching element which also forms the inverter circuit I.

Since the operation of the inverter circuit I is substantially the same as that in the foregoing embodiments, explanation will be made as to the operation as the voltage step-down chopper circuit. During the ON period of the transistor Q1, a current flows from the rectifier DB through a path of the diode D3, transistor Q1, inductor L3, diode D5 and capacitor C4 to charge the capacitor C4. When the transistor Q1 is turned OFF, the energy stored in the inductor L3 is discharged through a path of the diode D5, capacitor C4 and diode D2 to charge the capacitor C4 regardless of the ON and OFF states of the transistor Q2. Accordingly, the capacitor C4 is charged so that a voltage across the capacitor C4 corresponds to a level corresponding to the ON/OFF ratio (duty ratio) of the transistor Q1, that is, the voltage has a level corresponding to the peak of the output voltage of the rectifier DB multiplied by a nearly constant ratio. In this case, the capacitor C5 has a function of removing a high frequency voltage applied to the power supply side of the inverter circuit I through the switching operation of the transistors Q1 and Q2.

When forward voltage drops across the diodes D3 and D4 are ignored, during a period of the output voltage of the rectifier DB higher than the voltage across the capacitor C4, the inverter circuit I is operated on the output of the rectifier DB as its power supply, during which the capacitor C4 is charged. When the output voltage of the rectifier DB becomes lower than the voltage across the capacitor C4, the capacitor C4 is discharged through the capacitor C4 so that the inverter circuit I is operated on the capacitor C4 as its power supply. Since adjustment of the duty ratio of the transistors Q1 and Q2 enables the voltage across the capacitor C4 to be set at a desired level, the time interval, during which the capacitor C4 is used as the power supply of the inverter circuit I, can be arbitrarily set.

Thus, as mentioned above, a high frequency AC voltage is applied to the discharge lamp La through the inverter circuit I and the impedance element as a series circuit of the inductor L1 and capacitor C1 is also operated as the resonance circuit, so that an oscillating voltage corresponding to a combination between the voltage across the discharge lamp La and the voltage across the impedance element is applied between the output ends of the rectifier DB. Assuming now that a peak value (resonance) in the oscillating voltage is denoted by reference symbol VOP, a peak in the output voltage of the rectifier DB is denoted by VDP, and a voltage across the capacitor C4 is denoted by VC5, then circuit parameters are selected to meet the following relationship.

$$VC5 \leq VOP \leq VDP$$

In other words, the circuit parameters are set so that a peak value in the resonance voltage applied between the output ends of the rectifier DB becomes smaller than a peak in the output voltage of the rectifier DB and higher than the voltage across the capacitor C4 connected to the output of the aforementioned voltage step-down chopper circuit.

(Embodiment 21)

Figure 38:
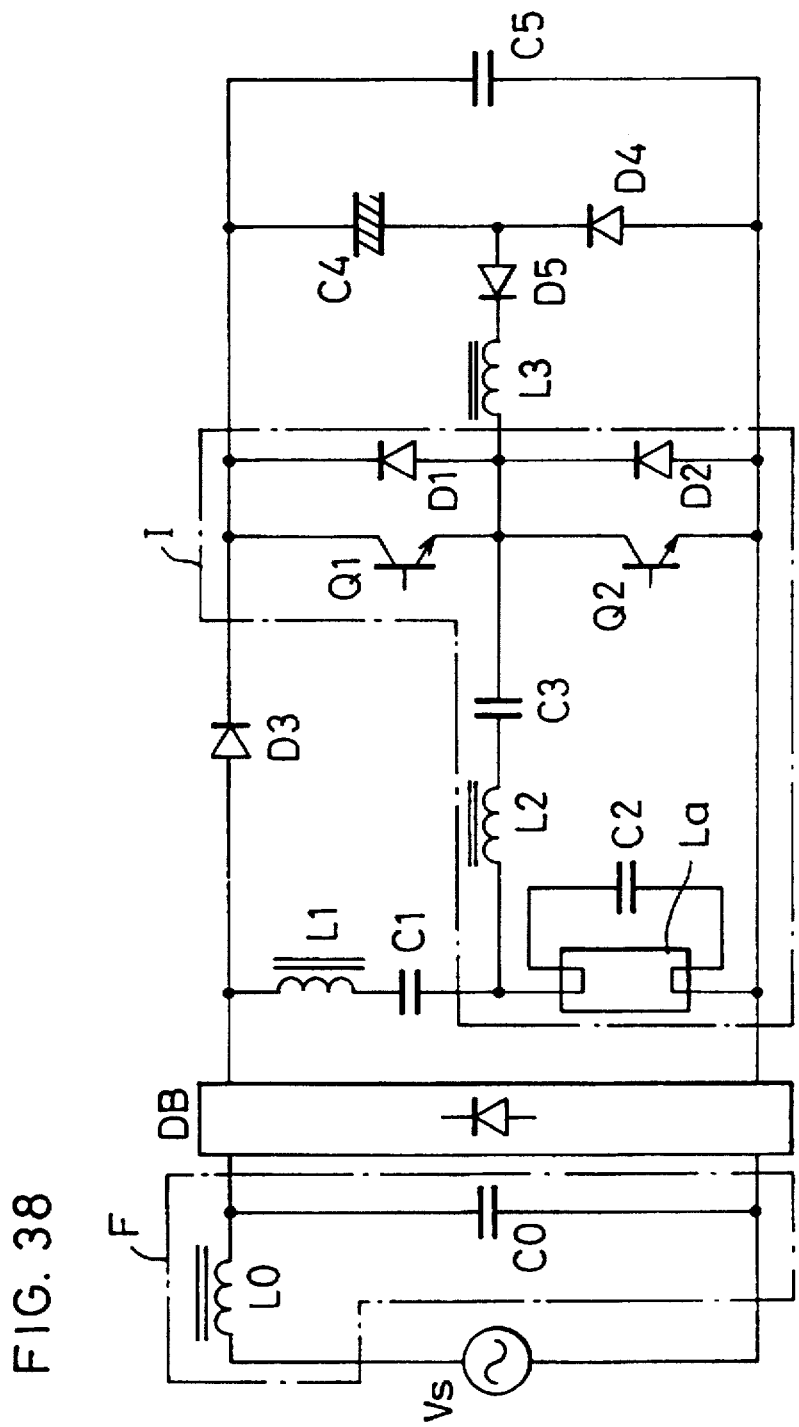

In the present embodiment, as shown in FIG. 38, the capacitor C4 is exchanged with the diode D4 in their position and the polarity of the diode D5 is reversed, unlike the arrangement of the embodiment 20 of FIG. 37. Other arrangement is substantially the same as that of the embodiment 20.

Although the transistor Q1 has been used the switching element of the voltage step-down chopper circuit in the arrangement of the embodiment 20, the transistor Q2 functions as the switching element of the voltage step-down chopper circuit in the arrangement of the present embodiment. That is, during the ON period of the transistor Q2, a current flows from the rectifier DB through a path of the diode D3, capacitor C4, diode D5, inductor L3 and transistor Q2 to charge the capacitor C4. When the transistor Q2 is turned OFF, the energy stored in the inductor L3 causes a current to flow through a path of the diode D1, capacitor C4 and diode D5 to thereby charge the capacitor C4.

Other arrangement and operation are substantially the same as those of the embodiment 20.

(Embodiment 22)

Figure 39:
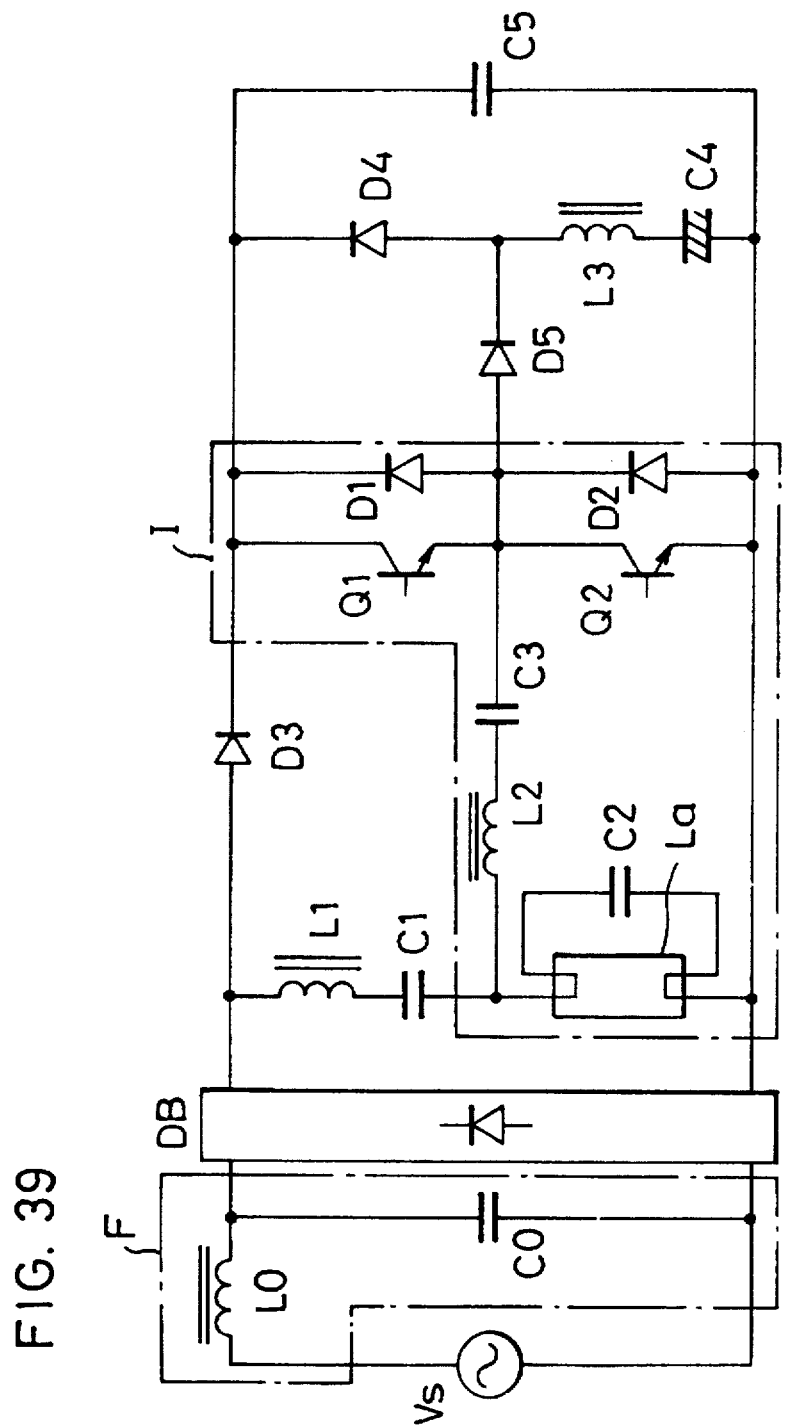

In contrast with the arrangement of the embodiment 20 of FIG. 36, the present embodiment is arranged so that, as shown in FIG. 39, the inductor L3 is inserted between the capacitor C4 and the diode D4, and the diode D5 is inserted between a junction point of the inductor L3 and diode D4 and a junction point of the both transistors Q1 and Q2. In short, the present embodiment is different from the embodiment 20 only in that the position of the inductor L3 is modified. With this arrangement, during the ON period of the transistor Q1, a current flows from the rectifier DB through a path of the diode D3, transistor Q1, diode D5, inductor L3 and capacitor C4 to charge the capacitor C4. When the transistor Q1 is turned OFF, the energy stored in the inductor L3 causes a current to flow through a path of the capacitor C4, diode D2 and diode D5 to charge the capacitor C4. Other operation and effect of the present embodiment are substantially the same as those of the embodiment 20.

(Embodiment 23)

Figure 40:
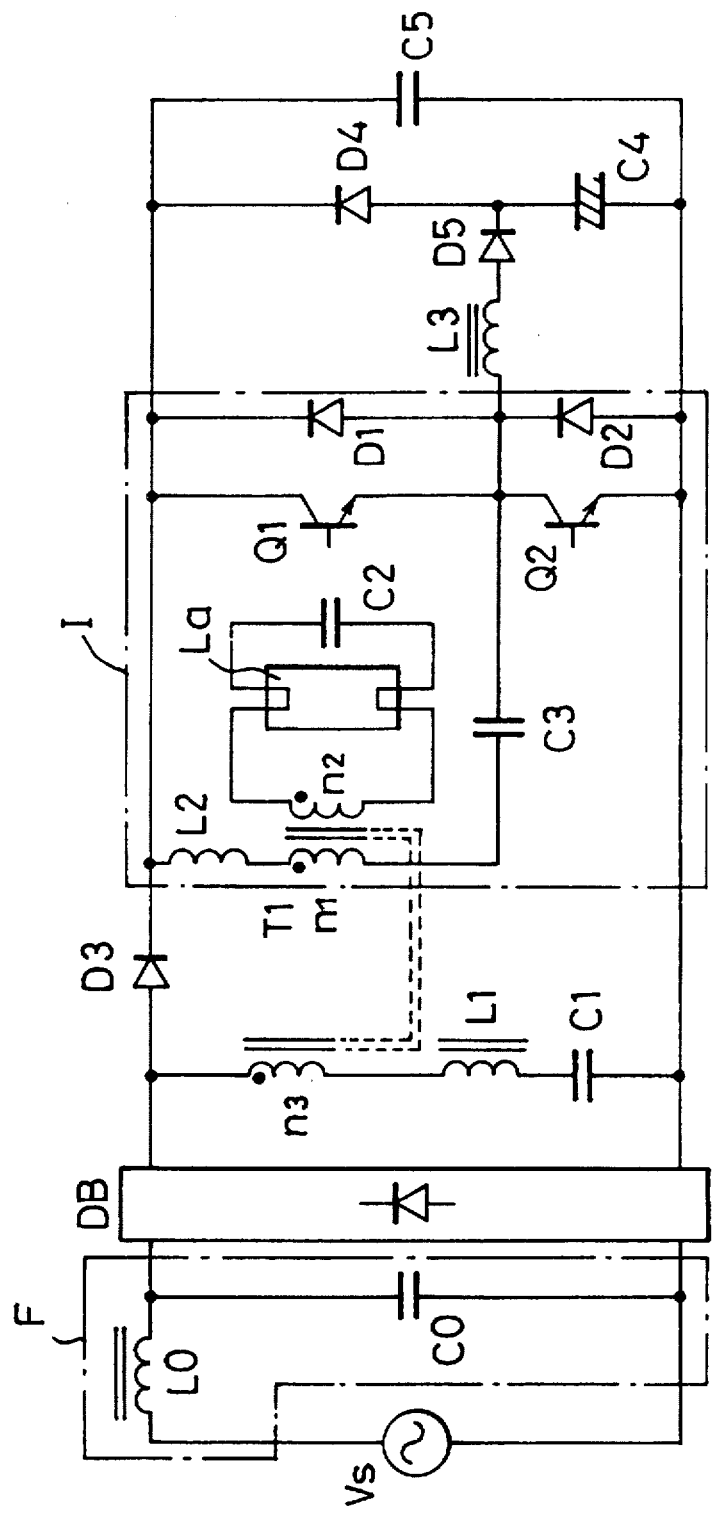

The present embodiment is different from the embodiment 20 of FIG. 37 in the arrangement of the inverter circuit I as shown in FIG. 40. That is, in the inverter circuit I, a series circuit of the DC-components blocking capacitor C3, primary winding n1 of the output transformer T1 and inductor L2 is connected between a junction point of the both transistors Q1 and Q2 and the cathode of the diode D3. The load circuit including the discharge lamp La and capacitor C2 is connected to an secondary winding n2 of the output transformer T1. Further, the transformer T1 is provided therein with a feedback winding n3, the feedback winding n3 is connected in series with the impedance element comprising a series circuit of the inductor L1 and capacitor C1, and the series circuit is connected between the output ends of the rectifier DB. In the illustrated example, the polarities of the primary and feedback windings n1 and n3 are set so that, when the transistor Q2 is turned ON and a current flows through the primary winding n1 from the inductor L2 toward the capacitor C3, a voltage directed from the impedance element toward the diode D3 is induced in the feedback winding n3.

In the inverter circuit I having the aforementioned arrangement, during ON period of the transistor Q2, a current flows from the rectifier DB through a path of the diode D3, inductor L2, primary winding n1 of the output transformer T1, capacitor C3 and transistor Q2. During the OFF period of the transistor Q2, the energy stored in the inductor L2 and transformer T1 is discharged through a path of the capacitor C3 and diode D1. When the transistor Q1 is turned ON, the charge accumulated in the capacitor C3 is discharged through a path of the primary winding n1 of the output transformer T1, inductor L2 and transistor Q1. When the transistor Q1 is turned OFF, the energy stored in the transformer T1 and inductor L2 is discharged through a path of the capacitor C5, diode D2 and capacitor C3.

Through the above operation, a high frequency current can be supplied to the primary winding n1 of the output transformer T1 to light the discharge lamp La. Also induced even in the feedback winding n3 is a high frequency voltage which causes an AC current to flow through the impedance element of a series circuit of the inductor L1 and capacitor C1. That is, while the output voltage of the rectifier DB is higher than a peak in the voltage across the series circuit of the feedback winding n3 and impedance element, substantially no current flows through the impedance element and the current is supplied mainly from the rectifier DB to the inverter circuit I. While the output voltage of the rectifier DB is lower than a peak in the voltage across the series circuit of the feedback winding n3 and impedance element, a high frequency current is supplied to the impedance element according to the polarity of a voltage induced in the feedback winding n3. That is, due to the flowing of the current from the rectifier DB into the impedance element, no pause period takes place in the input current to the rectifier DB. Removal of high frequency components through the filter circuit F enables the waveform of the input current from the A.C. power source Vs to approach a sinusoidal waveform, which results in that there can be provided an inverter device which can eventually remove harmonics components with a high power factor.

(Embodiment 24)

Figure 41:
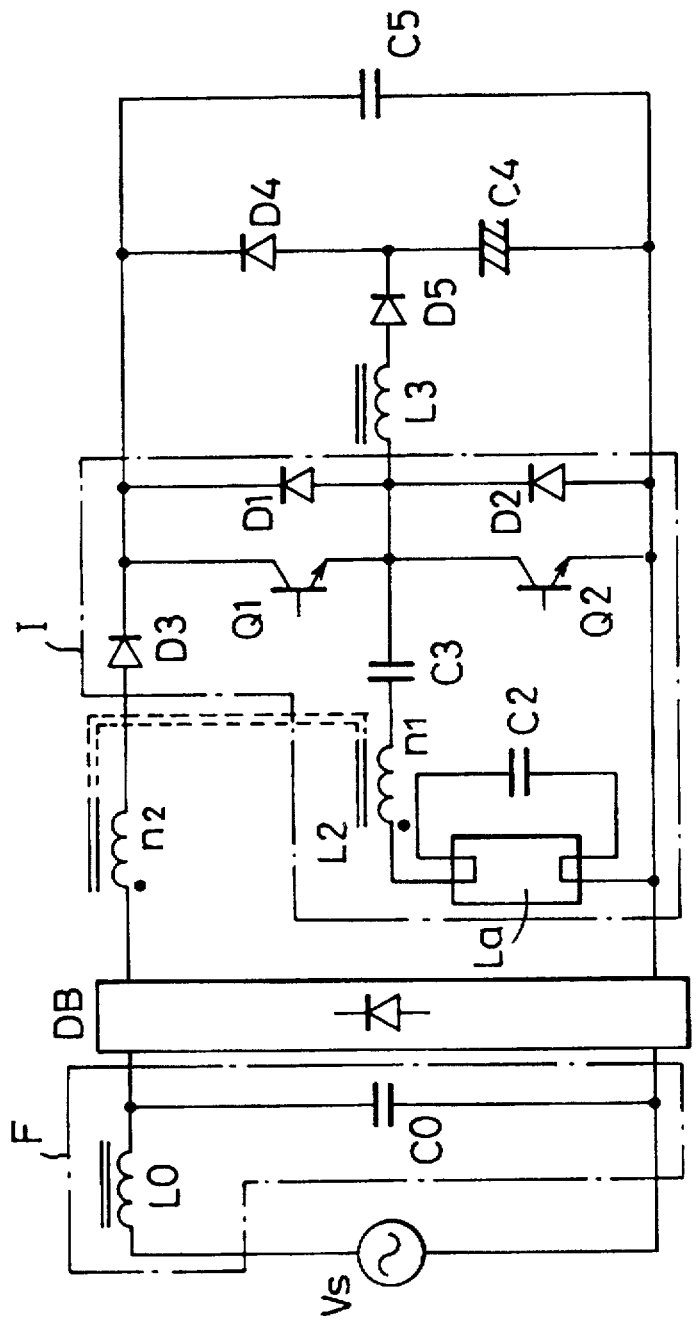

In the present embodiment, as shown in FIG. 41, the inductor L2 in the inverter circuit I of the embodiment 20 of FIG. 37 is made up of the primary and secondary windings n1 and n2 coupled in the form of a transformer and the secondary winding n2 is inserted between the rectifier DB and the diode D3. Further, the impedance element comprising the series circuit of the inductor L1 and capacitor C1 used in the embodiment 20 is omitted.

Other arrangement is substantially the same as that of the embodiment 20 and constituent elements having the same functions as those in the embodiment 20 are denoted by the same reference symbols.

The inverter circuit I in this arrangement and the voltage step-down chopper circuit commonly using transistor Q1 are operated in the same manner as those in the embodiment 20. When the transistor Q1 is turned ON, a current flows from the rectifier DB through a path of the secondary winding n2 of the inductor L2, diode D3, transistor Q1, inductor L3, diode D5 and capacitor C4 to thereby charge the capacitor C4. Further, a current flows from the rectifier DB through a path of the secondary winding n2 of the inductor L2, diode D3, transistor Q1, capacitor C3, primary winding n1 of the inductor L2 and load circuit (discharge lamp La and capacitor C2) to be supplied to the load circuit. Thereafter, when the transistor Q1 is turned OFF, the energy stored in the inductor L3 is discharged through a path of the diode D5, capacitor C4 and diode D2, while the energy stored in the inductor L2 is discharged through a path of the load circuit, diode D2 and capacitor C3 and also through a path of the diode D3, capacitor C5 and rectifier DB.

Meanwhile, when the transistor Q2 is turned ON, the charge accumulated in the capacitor C3 is discharged through the transistor Q2 and load circuit; whereas, when the transistor Q2 is turned OFF, the energy stored in the inductor L2 is discharged through a path of the capacitor C3, diode D1, capacitor C5 and load circuit.

Through the above operation, a high frequency AC voltage can be applied to the load circuit including the discharge lamp La and a voltage across the capacitor C4 can be made substantially constant that is lower than a peak in the output voltage of the rectifier DB. The application of the high frequency AC voltage to the load circuit causes a high frequency voltage to be also induced in the secondary winding n2 of the inductor L2. Since the voltage induced in the secondary winding n2 alternates, the inductor L2 functions in the same manner as the impedance element in the foregoing respective embodiments, that is, acts to allow supply of the high frequency current at valley parts of the output voltage of the rectifier DB. In other words, the inductor L2 forming the resonance circuit of the load circuit is used also as the impedance element. Other arrangement and operation are substantially the same as those of the embodiment 20.

(Embodiment 25)

Figure 42:
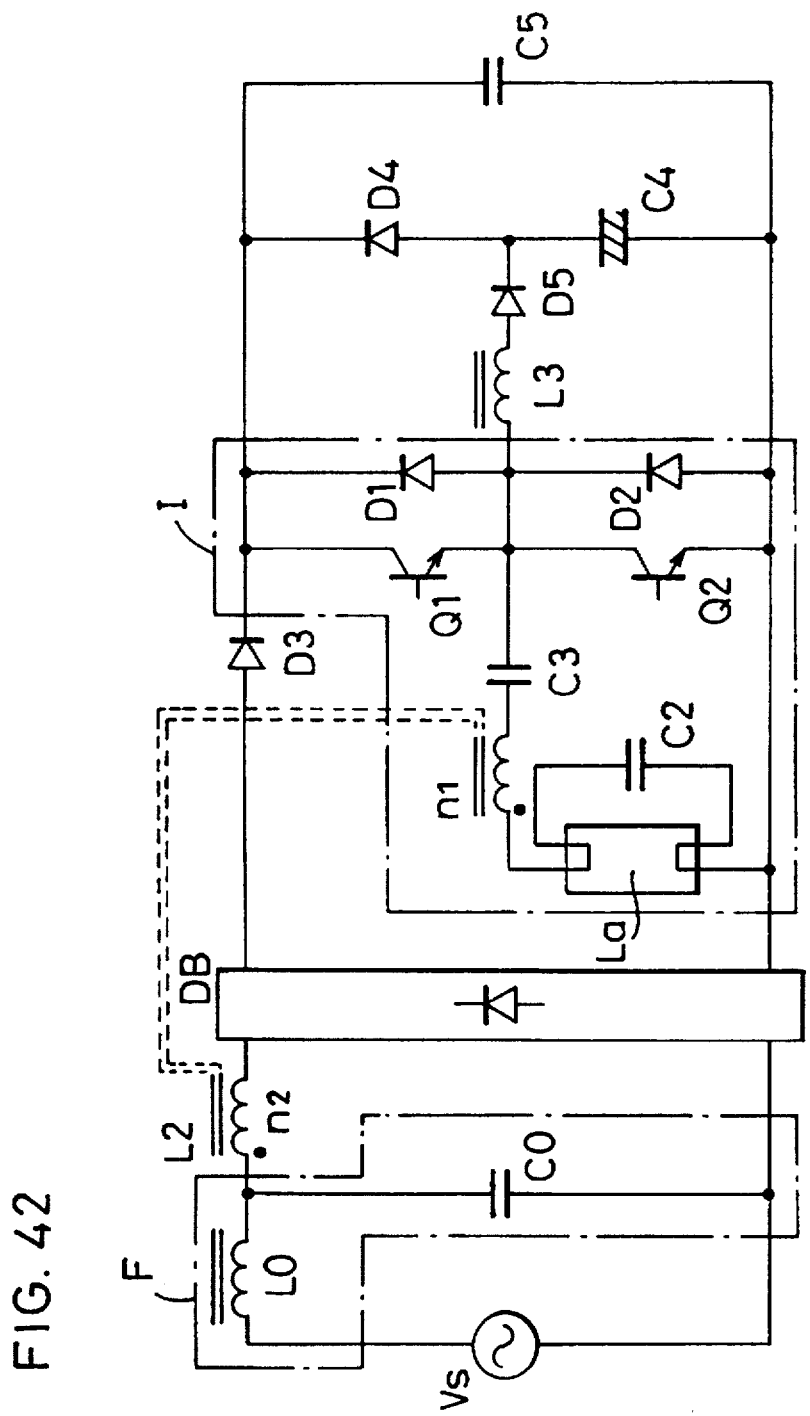

The present embodiment is different from the embodiment 24 of FIG. 41 in that, as shown in FIG. 42, the feedback winding n2 of the inductor L2 is provided on the input side of the rectifier DB. Other arrangement and operation are substantially the same as those of the embodiment 24.

(Embodiment 26)

Figure 43:
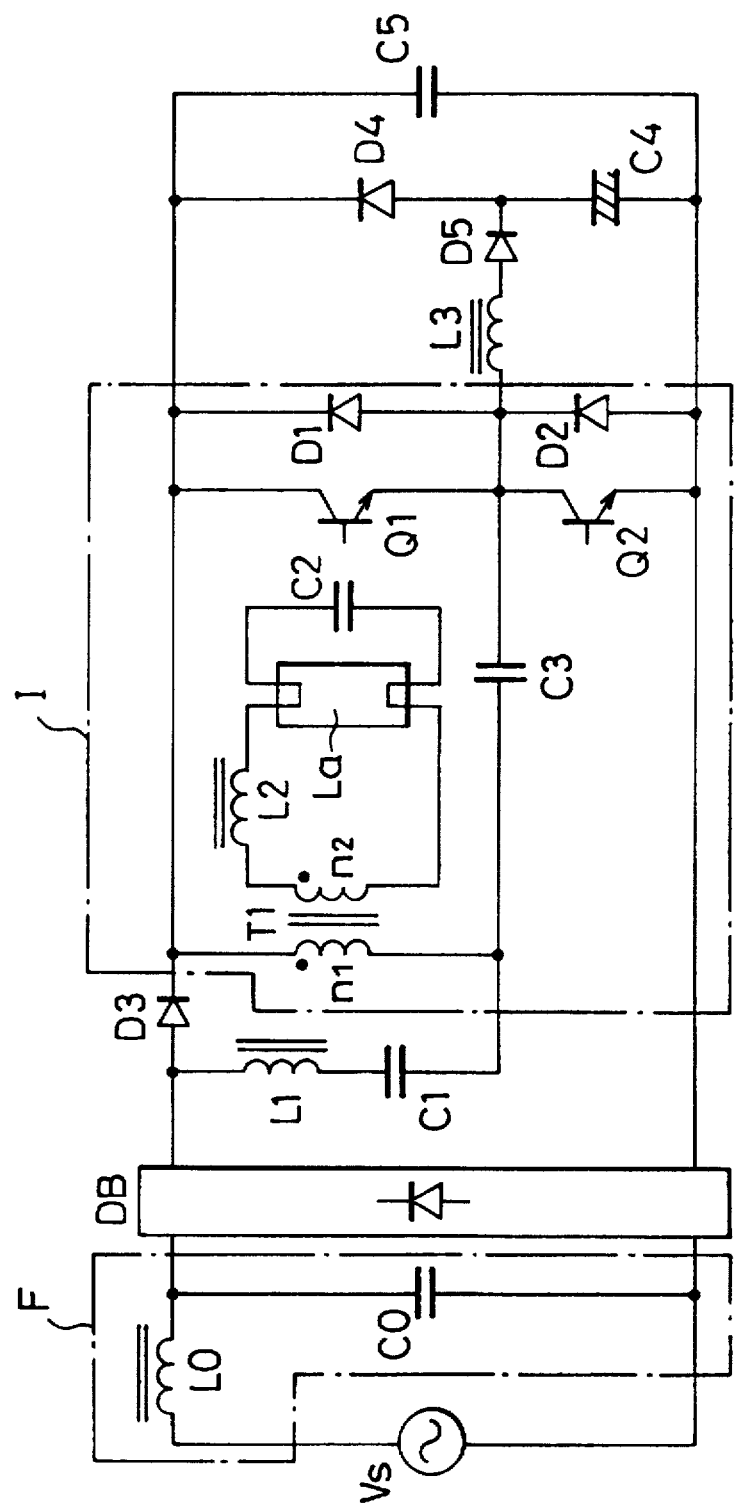

In the present embodiment, as shown in FIG. 43, such an A.C. power source Vs as a commercial power source is connected to the rectifier DB comprising a diode bridge through the filter circuit F so that the rectifier DB perform its full-wave rectifying operation over the voltage of the A.C. power source Vs. The filter circuit F, which comprises a choke coil L0 provided between the A.C. power source Vs and the rectifier DB and a capacitor C0 provided between the AC input ends of the rectifier DB, functions as a low pass filter for blocking high frequencies corresponding nearly to the switching frequency (several tens to several hundreds of kHz) of the inverter circuit I and also passing low frequencies corresponding nearly to the frequency (several tens of Hz) of the A.C. power source Vs.

Connected between the D.C. output ends of the rectifier DB is a series circuit of the forwardly-directed diode D3 and capacitor C5. Connected in parallel with the capacitor C5 is the inverter circuit I which includes a series circuit of the pair of transistors Q1 and Q2, in parallel with which the capacitor C5 is wired. A series circuit of the primary winding n1 of the output transformer T1 and DC-components blocking capacitor C3 is connected in parallel with one of the switching elements connected to positive one of the output ends of the rectifier DB. The secondary winding n2 of the output transformer T1 is connected at its one end with a load circuit through the inductor L2. The switching elements comprise the transistors Q1 and Q2 connected with the diodes D1 and D2 in inverse parallel relationships thereto between their collector and emitter respectively. These switching elements are alternately turned ON and OFF at a high switching frequency (several tens to several hundreds of kHz) to avoid simultaneous turned ON of the switching elements under the control of a control circuit (not illustrated). The load circuit is made up of the discharge lamp La having both filaments and the capacitor C2 connected between non-power-supply side ends of the both filaments. The inductor L2, capacitor C2, capacitor C3 and discharge lamp La collectively forms a resonance circuit. Connected in parallel with a series circuit of the diode D3 and primary winding of the transformer T1 is an impedance element comprising a series circuit of the inductor L1 and capacitor C1.

Explanation will next be made as to the operation of the power supply device of the present embodiment shown in FIG. 43. The operation of the present embodiment is divided into several operational modes according to combinations of the output voltage (i.e., in the vicinity of 0 volts (valley parts) or a peak (mountain parts) in the input current) of the rectifier DB, the ON and OFF states of the transistors Q1 and Q2 and the direction of a current flowing through the impedance element. At mountain parts of the output voltage of the full-wave rectifier DB, the operation of the present embodiment is divided into such 6 operational modes as shown in FIGS. 44 to 49; whereas, at valley parts of the output voltage of the rectifier DB, the embodiment operation is divided into such 6 operational modes as shown in FIGS. 50 to 55. In FIGS. 44 to 55, currents are shown by broken lines.

Figure 44:
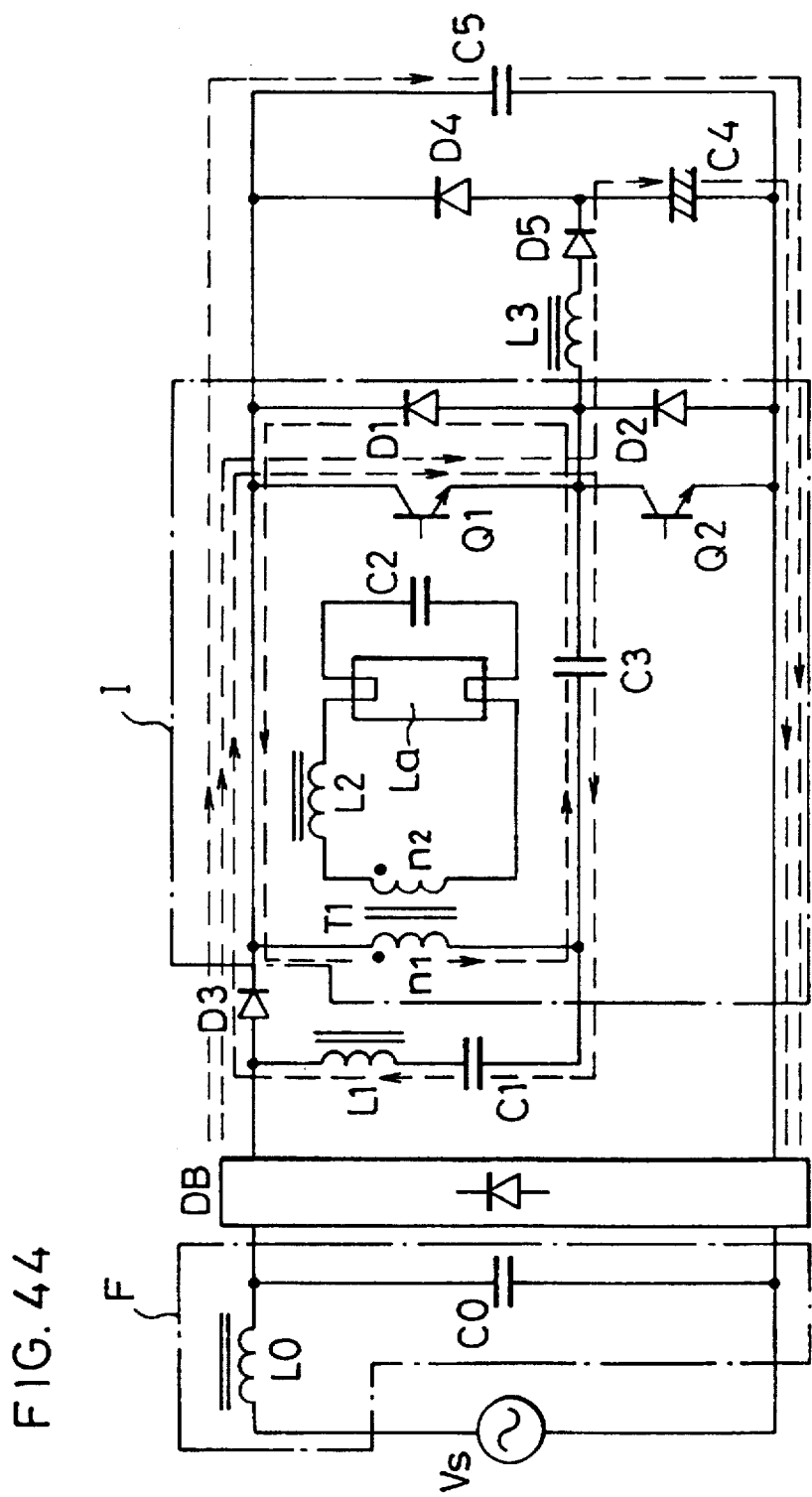
FIGS. 44 to 55 show circuit diagrams for explaining the operations of the embodiment 26 of FIG. 43.

Explanation will first be made as to the operational modes at mountain parts of the output voltage of the rectifier DB. When the power source is turned ON so that the transistor Q1 is turned ON and the transistor Q2 is turned OFF, as shown in FIG. 44, a current flows from the rectifier DB through a path of the diode D3, transistor Q1, inductor L3, diode D5 and capacitor C4 to charge the capacitor C4. Since the output voltage of the rectifier DB is considered during this charging operation to be higher than the voltage across the capacitor C5, a current flows from the rectifier DB through the diode D3 and capacitor C5 to thereby charge the capacitor C5. Currents flowing through other paths shown in FIG. 44 are oscillating currents flowing through impedance elements (oscillating circuits) comprising the transformer T1 and capacitor C3 and comprising the inductor L1 and capacitor C1. More specifically, the oscillating current flows through a path of the capacitor C3 and diode D1 to cause a downward (in FIG. 44) voltage to be applied to the primary winding n1 of the output transformer T1; whereas the oscillating current flows through a path of the transistor Q1, capacitor C3 and capacitor C1 to cause an upward (in FIG. 44) voltage to be applied to the inductor L1.

Figure 45:
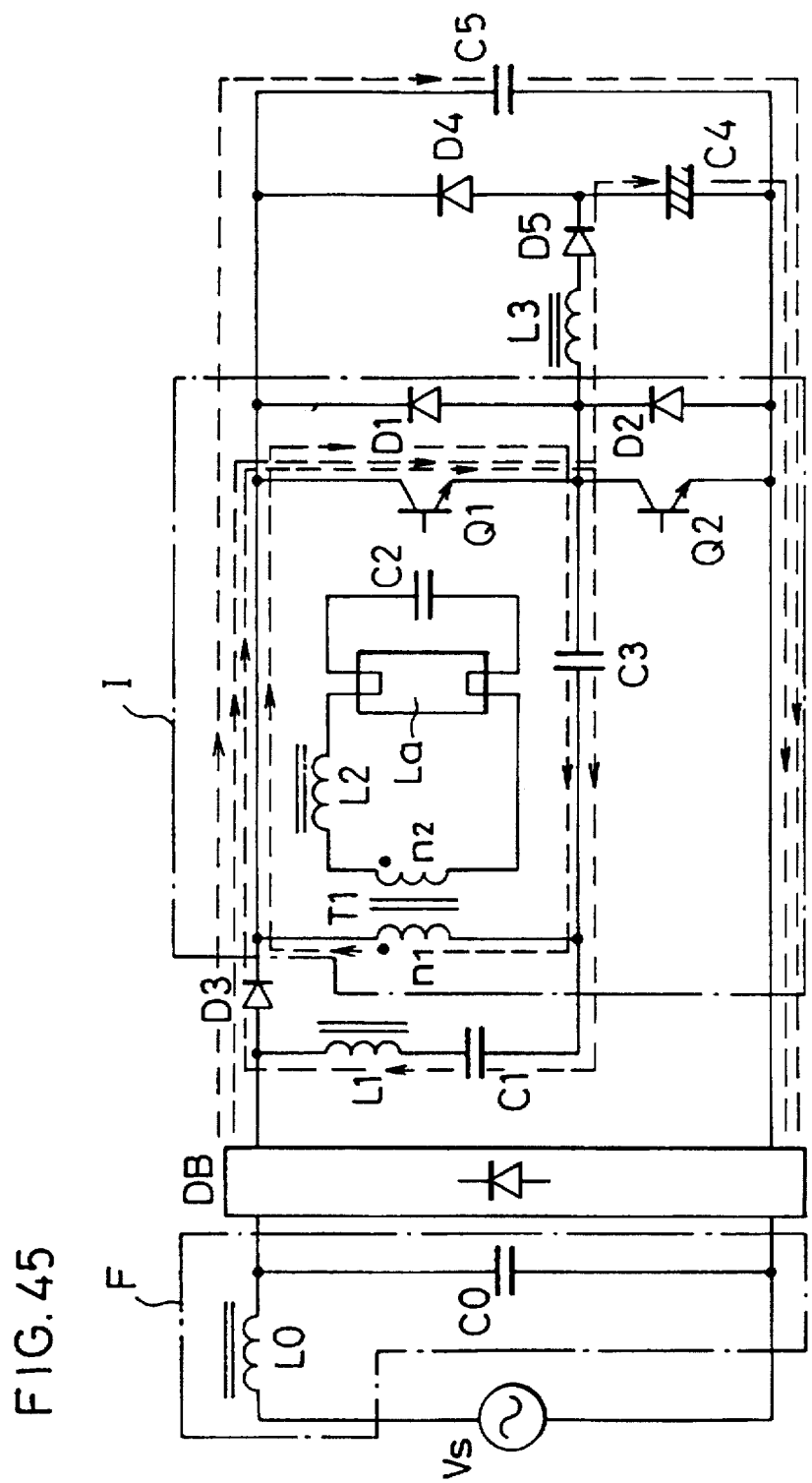

In this case, the current flowing through the primary winding n1 of the output transformer T1 is reversed in its flowing direction. In other words, in this operational mode, as shown in FIG. 45, the current flows from the capacitor C3 through a path of the primary winding n1 of the output transformer T1 and transistor Q1. Other currents are in the present embodiment are the same as those in the operational mode of FIG. 44, except that the current based on the charge accumulated in the capacitor C3 flows in place of the regenerative current of the transformer T1.

Figure 46:
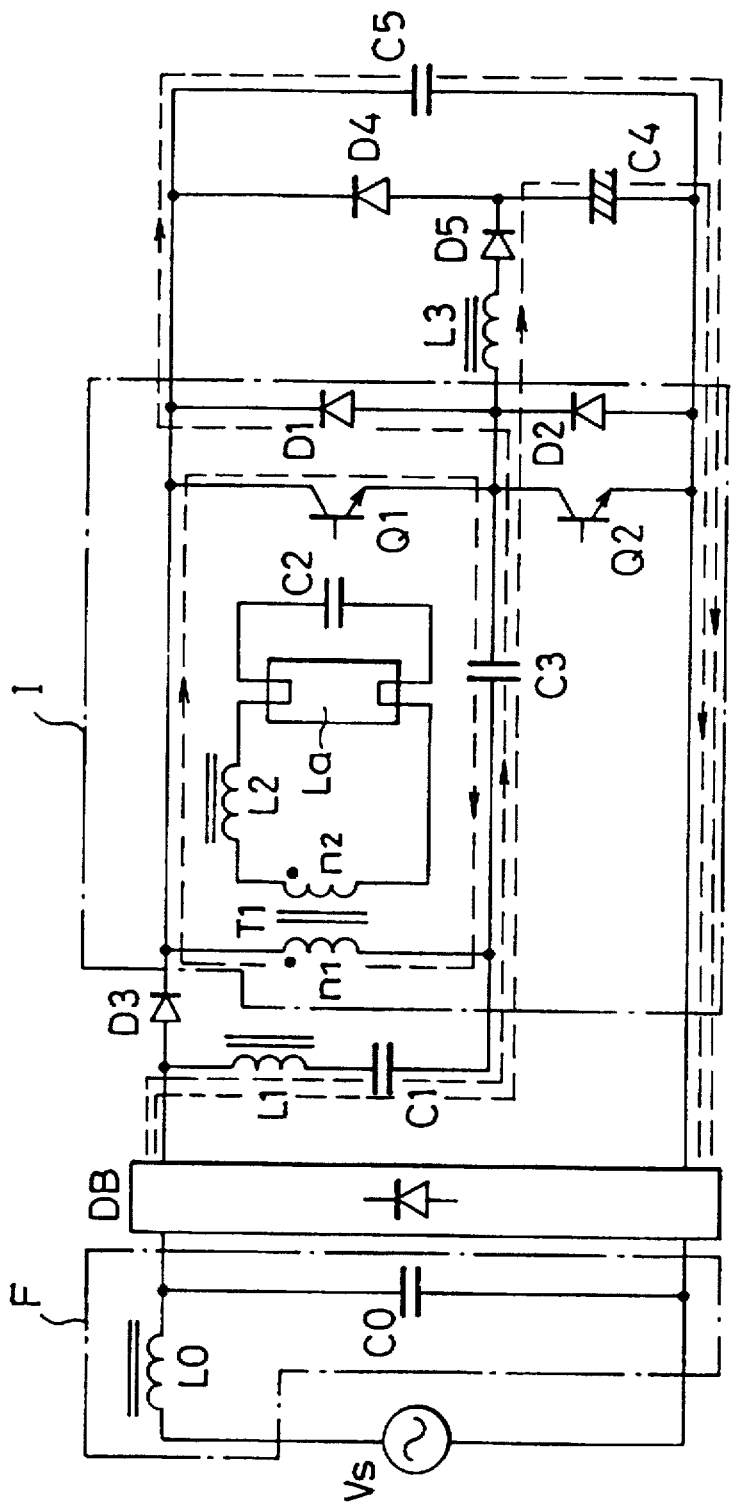

Accordingly, as shown in FIG. 46, before the ON and OFF states of the transistors Q1 and Q2 are not changed, the polarity of the voltage across the inductor L1 is inverted so that a potential at the anode of the diode D3 is pulled down with respect to a potential at the cathode thereof. That is, the diode D3 is put in its OFF state so that currents flow from the rectifier DB through a path of the inductor L1, capacitor C1, capacitor C3, inductor L3, diode D5 and capacitor C4 and also from the rectifier DB through a path of the inductor L1, capacitor C1, capacitor C3, diode D1 and capacitor C5 respectively. In this operational mode, of course, the oscillating current of the inductor L1 is stopped and the discharging operation of the capacitor C3 causes a current flowing through the transformer T1 and transistor Q1 to be continued.

Figure 47:
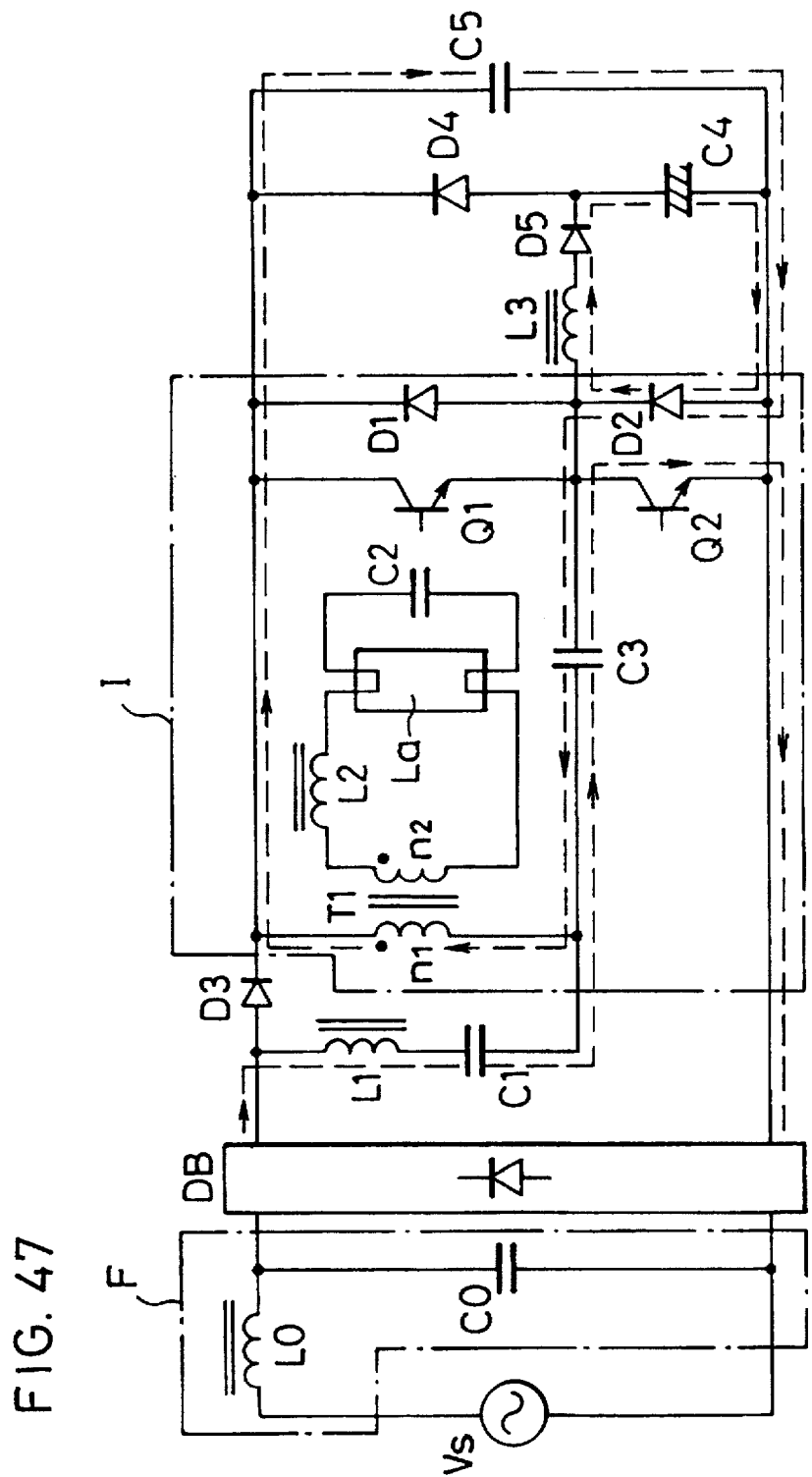

During the flowing of a current in such an operational mode as shown in FIG. 46, the ON and OFF states of the transistors Q1 and Q2 are reversed. In this connection, while the ON and OFF states of the both transistors Q1 and Q2 are exchanged, there will not exist any simultaneously turned ON state of the transistors. If present, it is assumed that such an ON state period is as short as negligible. Therefore, as shown in FIG. 47, the transistor Q1 is turned OFF and the transistor Q2 is turned ON. The discharging operation of the capacitor C3 is continued but when the transistor Q1 is turned OFF, the charge accumulated in the capacitor C3 is discharged through a path of the primary winding n1 of the output transformer T1, capacitor C5 and diode D2 to charge the capacitor C5. Further, an interruption of the current flowing through the inductor L3 causes the energy stored in the inductor L3 to be discharged through a path of the diode D5, capacitor C4 and diode D2 to thereby charge the capacitor C4. Further, a current flows from the rectifier DB through a path of the inductor L1, capacitor C1, capacitor C3 and transistor Q2.

Figure 48:
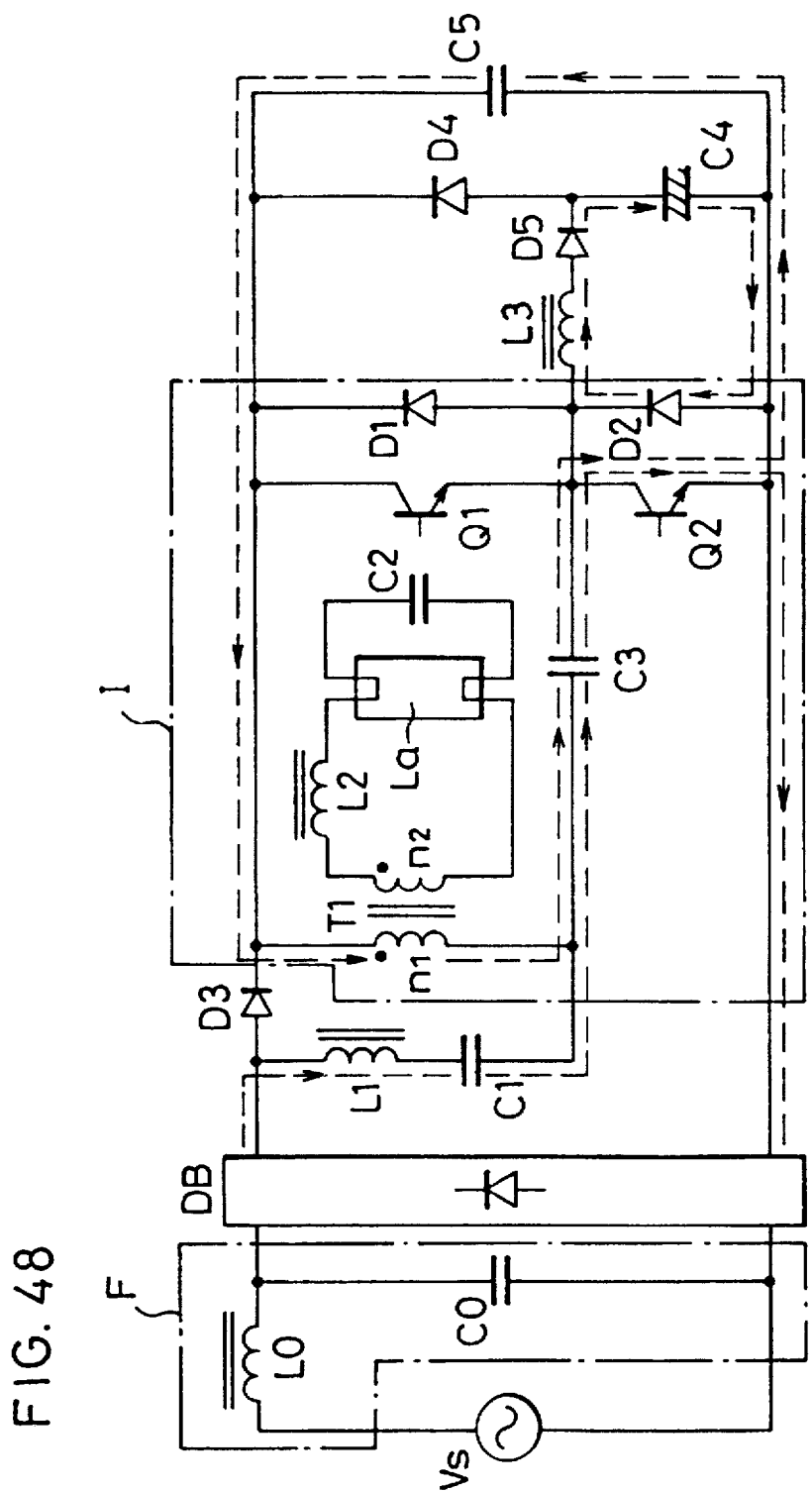

As has been explained in the foregoing, as shown in FIG. 48, a current flows to cause the charge accumulated in the capacitor C3 to be discharged through a path of the transistor Q3, capacitor C5 and primary winding n1 of the output transformer T1, during which other currents are not changed.

Figure 49:
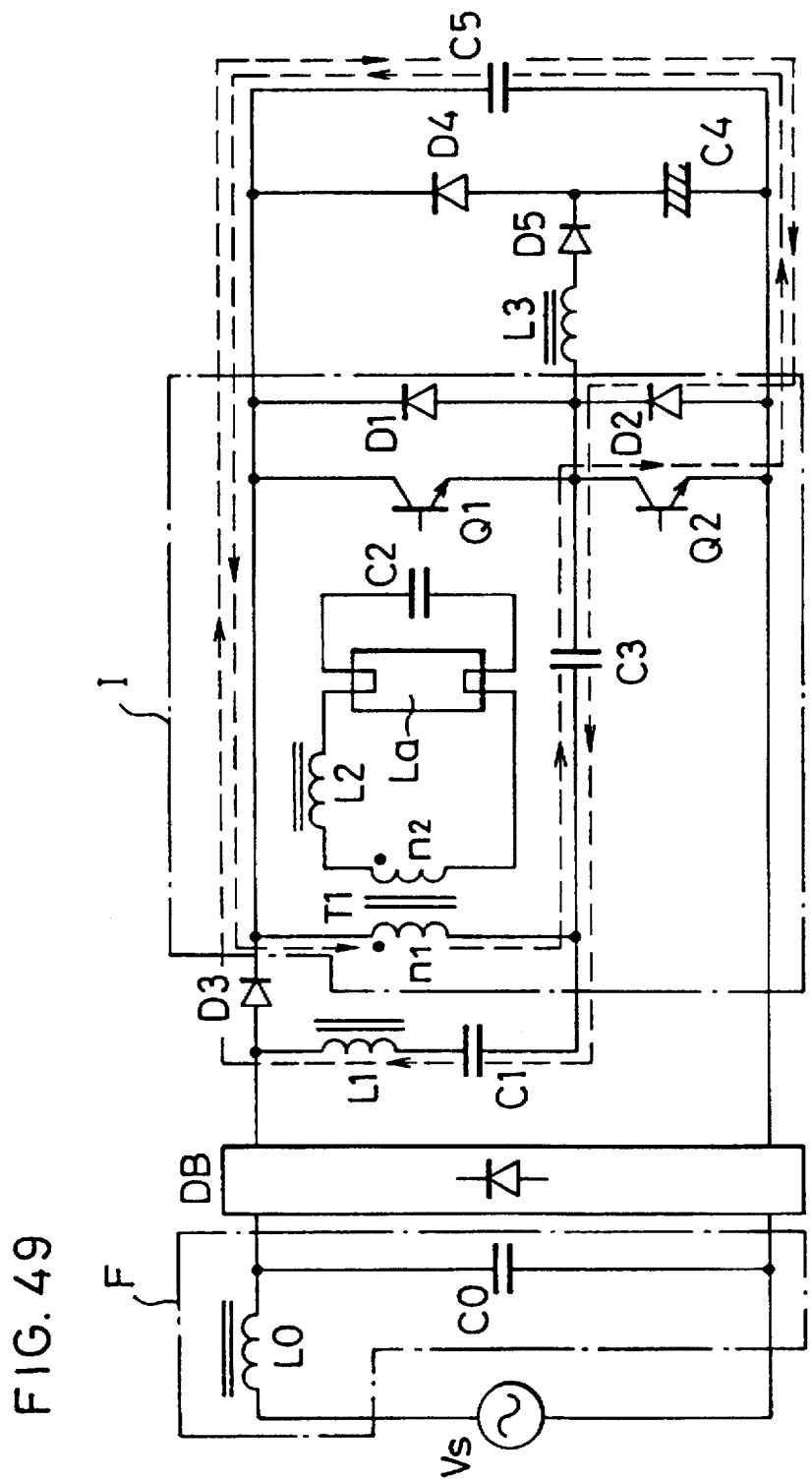

Thereafter, the charging operation of the capacitor C4 based on the regenerative current of the inductor L3 is completed, but the current based on the resonance circuit of the transformer T1 and capacitor C3 is not changed and the voltage across the impedance element (resonance circuit) based on the inductor L1 and capacitor C1 is inverted in its polarity. That is, as shown in FIG. 49, a current flows from the inductor L1 and capacitor C1 through a path of the capacitor C5 and diode D2. Under this condition, the ON and OFF states of the transistors Q1 and Q2 are reversed so that the current mode is shifted to such a mode as shown in FIG. 44. That is, the path including the transistor Q2 in FIG. 49 is interrupted so that the current flowing through the transformer T1 and capacitor C3 starts flowing through the path including the diode D1 and the capacitor C5 is charged with the current from the rectifier DB.

As explained above, the capacitor C4 is charged through the inductor L3 in the ON mode (such operational modes as shown in FIGS. 44 to 46) of the transistor Q1, the capacitor C4 is charged with the regenerative current of the inductor L3 in the OFF mode (such operational modes as shown in FIGS. 47 to 49) of the transistor Q1, and the transistor Q1 forms part of the inverter circuit I and is also used as the switching element of the voltage step-down chopper circuit.

Figure 50:
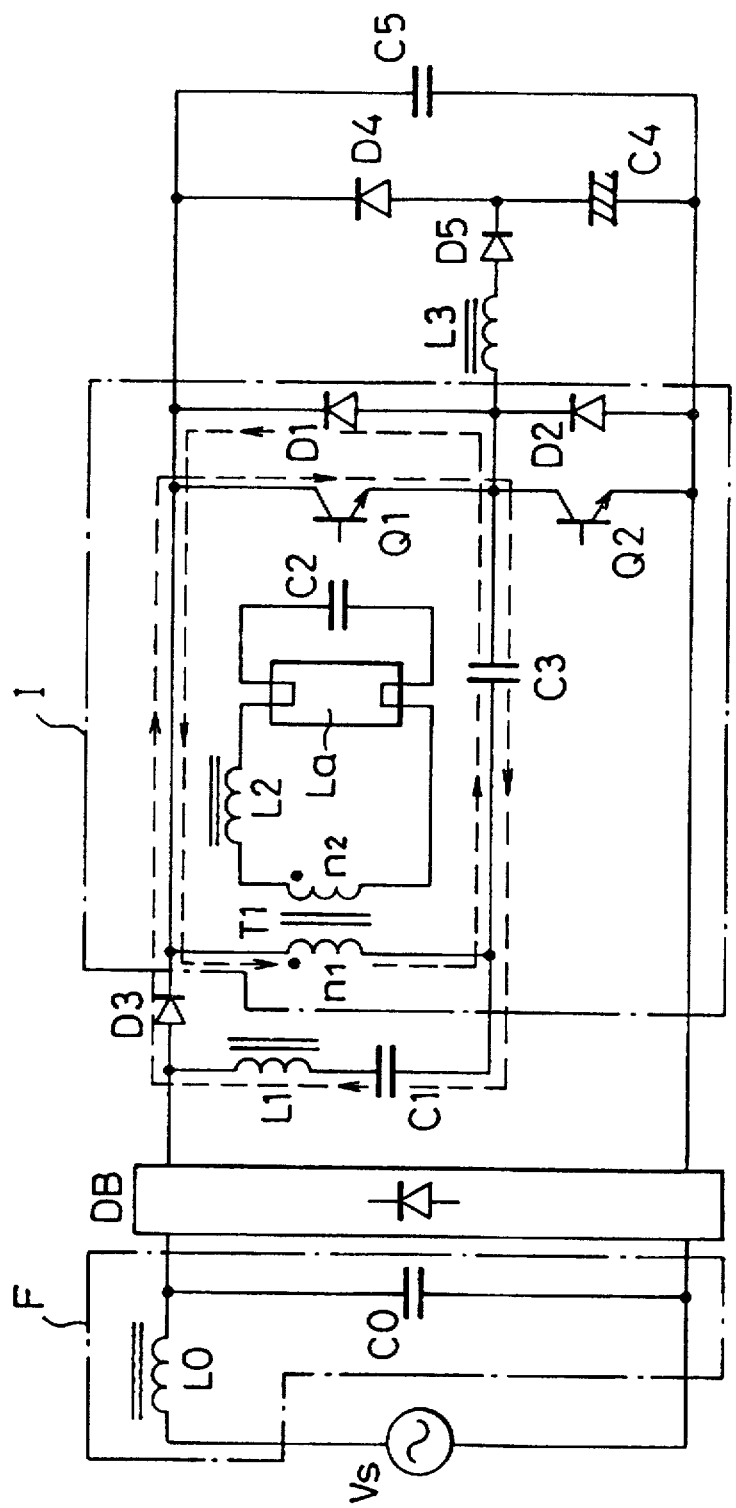
Figure 51:
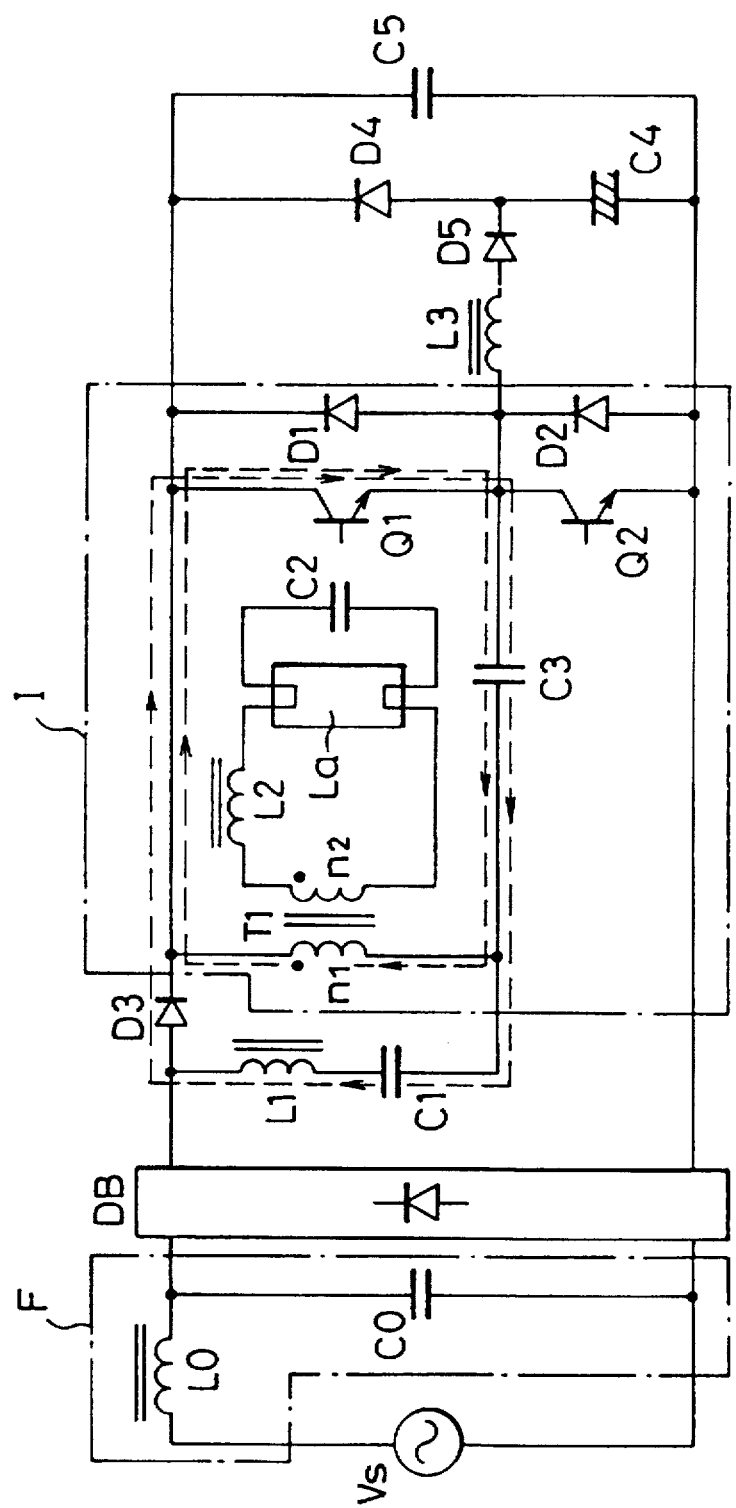

Explanation will then be made as to the operation of the present embodiment at valley parts of the output voltage of the rectifier DB. The explanation of the embodiment operation at valley parts of the output voltage of the rectifier DB, as the operation at mountain parts of the output voltage of the rectifier DB, will be started with a mode in which the transistor Q1 is in the ON state and the transistor Q2 is in the OFF state. More in detail, at valley parts of the output voltage of the rectifier DB, as shown in FIG. 50, there exist an operational mode wherein currents flow. Under this condition, the oscillating current for the resonance circuit comprising the transformer Ti and capacitor C3 flows downwardly (in FIG. 50) through the primary winding nil of the output transformer T1, while the oscillating current for the resonance circuit comprising the capacitor C1 and inductor L1 flows upwardly (in FIG. 50) through the inductor L1. More specifically, the currents flow through a path of the primary winding of the transformer T1, capacitor C3 and diode D1 and through a path of the capacitor C1, inductor L1, diode D3, transistor Q1 and capacitor C3 respectively. Thereafter, only the current flowing through the resonance circuit comprising the transformer T1 and capacitor C3 is reversed, so that, as shown in FIG. 51, a current flows through a path of the capacitor C3, primary winding of the transformer T1 and transistor Q1.

Figure 52:
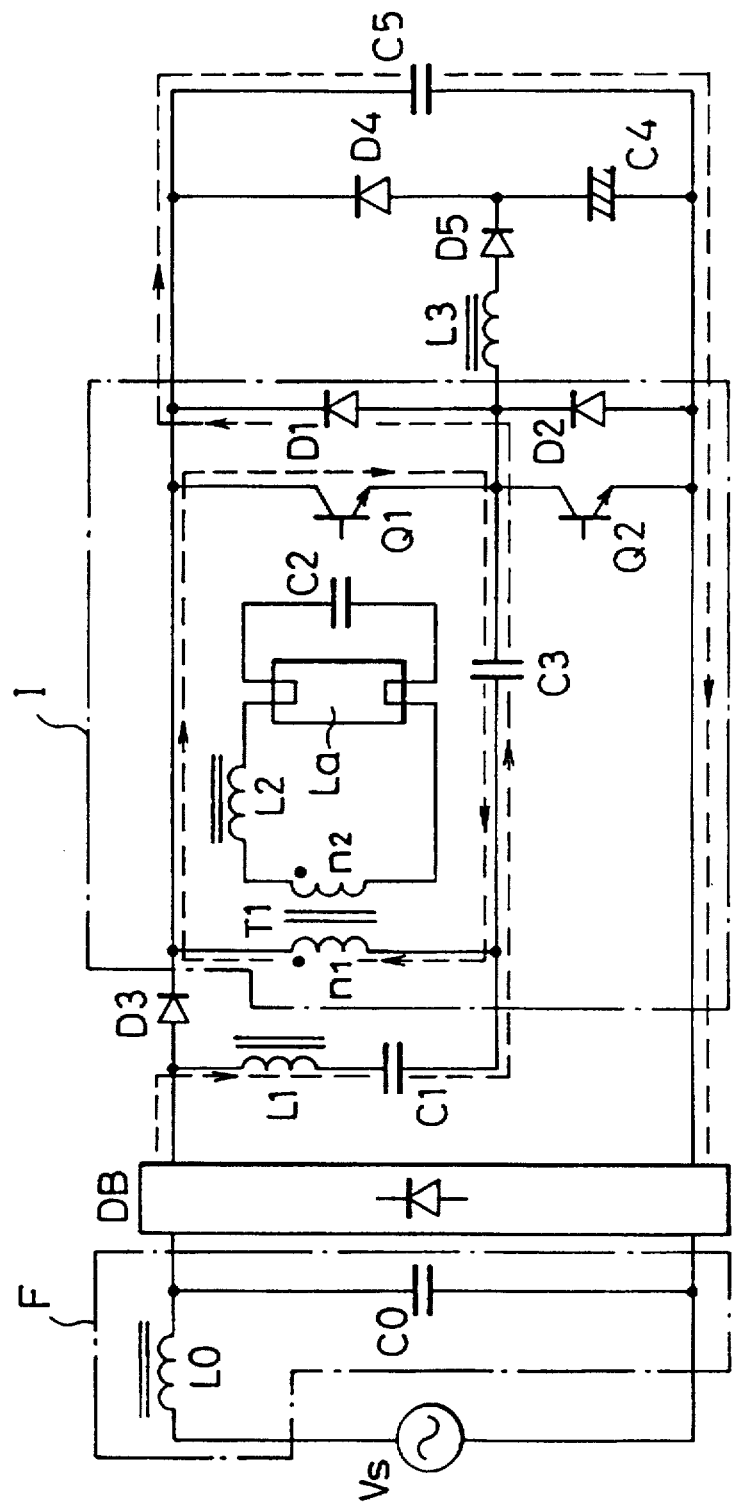

Next, when the oscillating current flowing through the resonance circuit of the inductor L1 and capacitor C1 is reversed in its flowing direction, a current flows from the rectifier DB through a path of the inductor L1, capacitor C1, capacitor C3, diode D1 and capacitor C5 to thereby charge the capacitor C5, as shown in FIG. 52. During this charging operation, the current flowing through a path of the capacitor C3, primary winding n1 of the output transformer T1 and transistor Q1 continues to flow.

Figure 53:
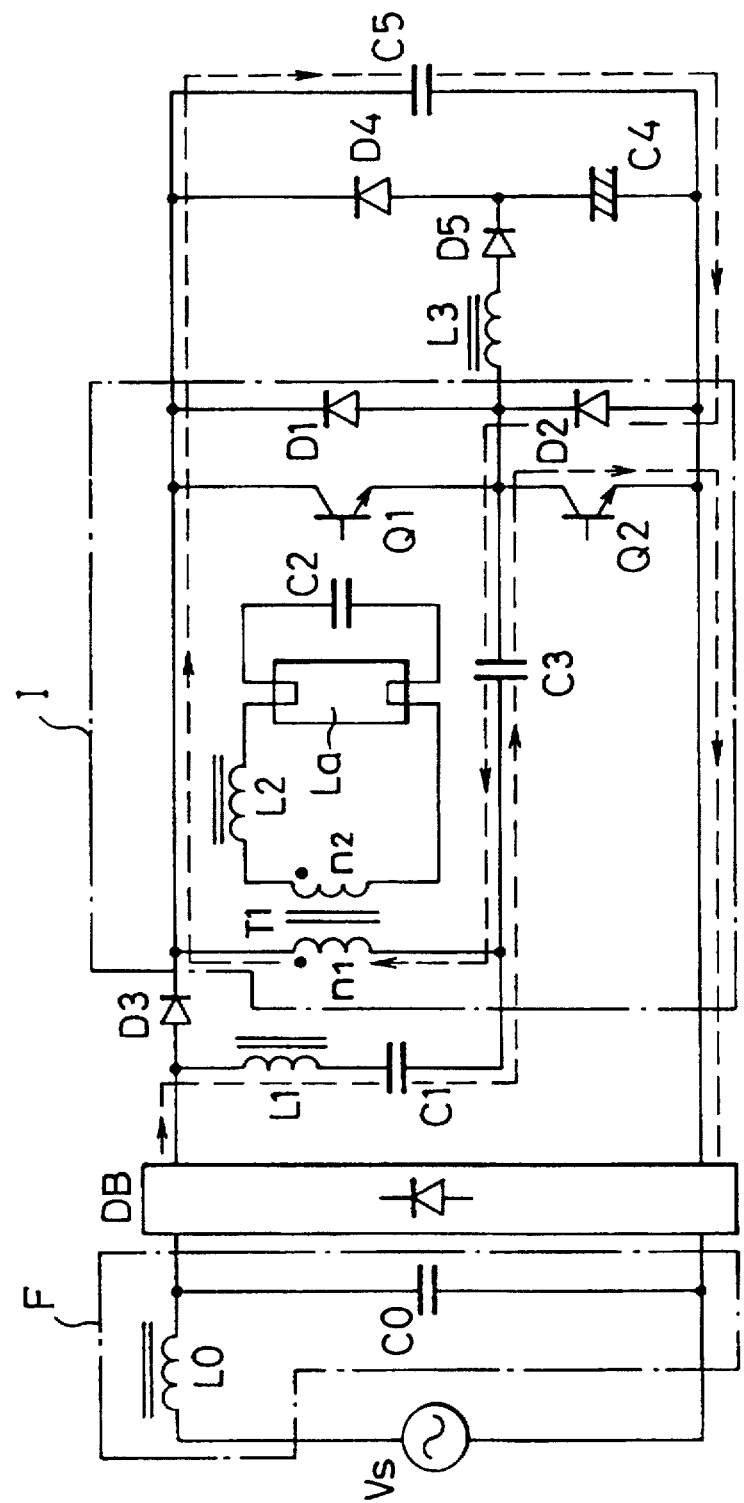
Figure 54:
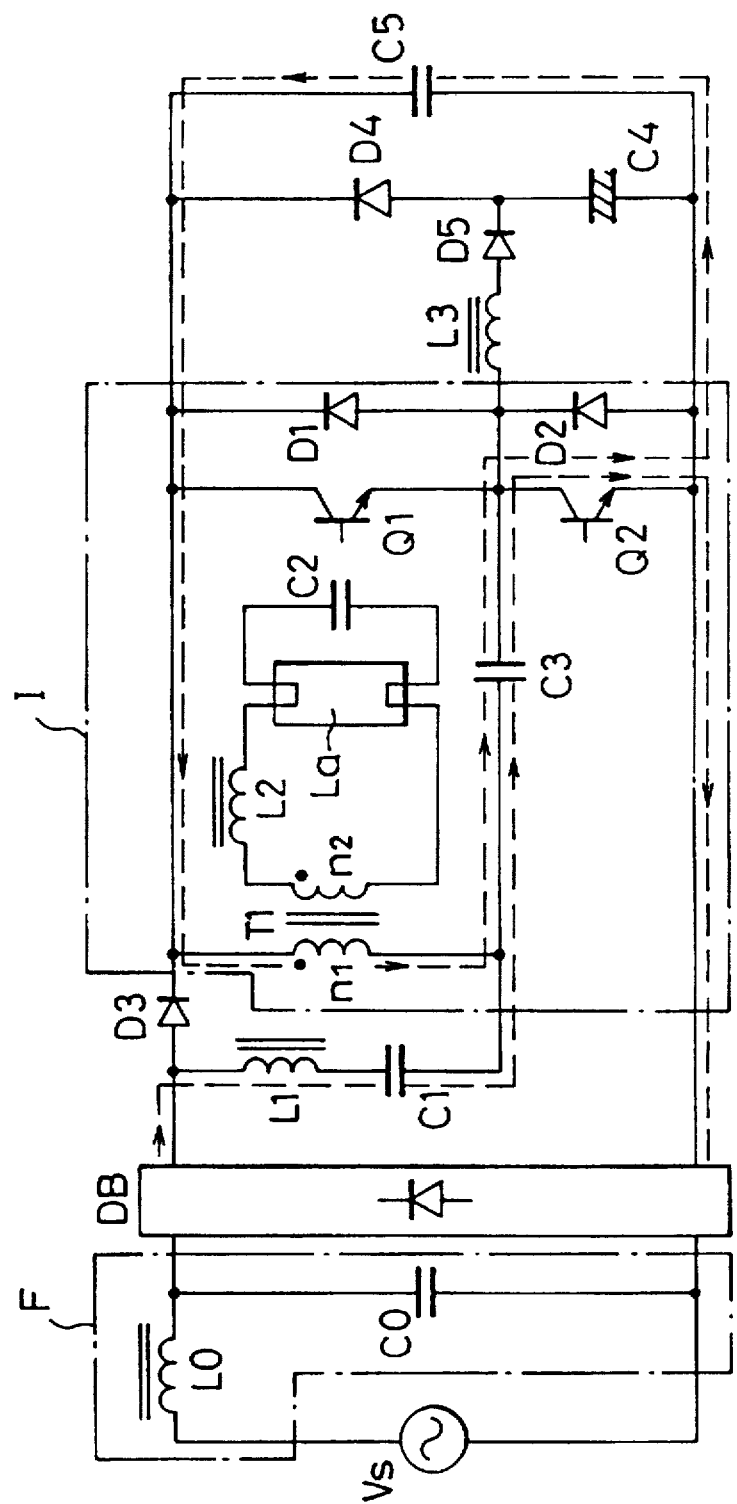
Figure 55:
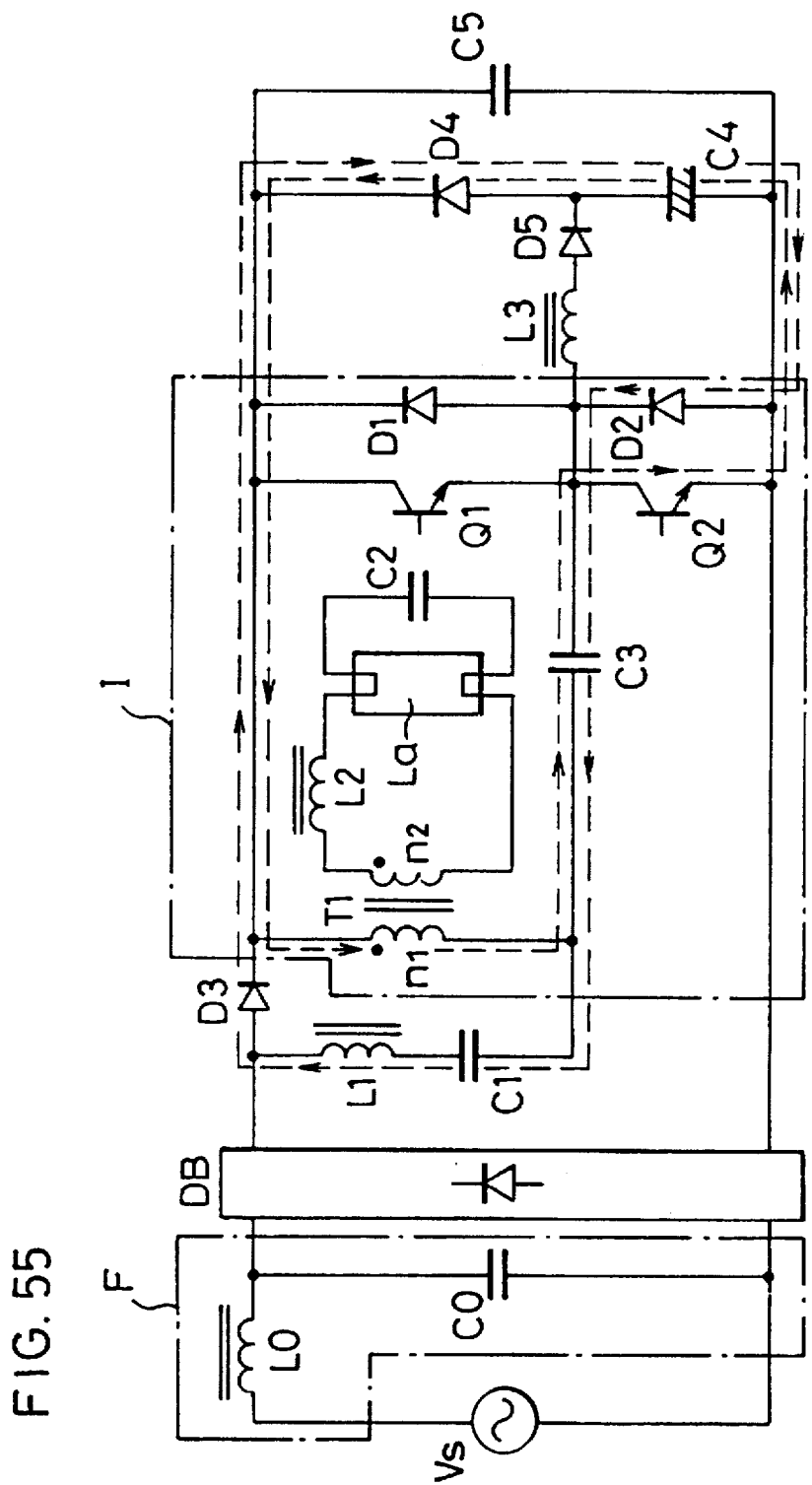

When the transistor Q1 is turned OFF and the transistor Q2 is turned ON, the current flowing through the transistor Q1 is interrupted so that the current from the rectifier DB starts flowing through a path of the inductor L1, capacitor C1, capacitor C3 and transistor Q2, as shown in FIG. 53. The oscillating current flowing through the resonance circuit of the capacitor C3 and transformer T1 starts flowing through a path of the capacitor C3, primary winding n1 of the output transformer T1, capacitor C5 and diode D2. The flowing direction of the oscillating current is immediately reversed so that, as shown in FIG. 54, a current starts flowing through a path of the capacitor C5, primary winding n1 of the output transformer T1, capacitor C3 and transistor Q2. Thereafter, as shown in FIG. 55, the oscillating current flowing through the resonance circuit of the inductor L1 and capacitor C1 is reversed in its flowing direction so that a current starts flowing through a path of the capacitor C1, inductor L1, diode D3, diode D4, capacitor C4, diode D2 and capacitor C3. In this case, explanation has been made in such a manner that the current flows reversely through the diode D4. However, since the current flowing from the capacitor C4 through the primary winding n1 of the output transformer T1 and capacitor C3 is always larger than the current flowing through the capacitor C1 and inductor L1, the total current flowing through the diode D4 will flow forwardly therethrough as a whole. Further, since the charge accumulated in the capacitor C4 is discharged, a current starts flowing through a path of the capacitor C4, diode D4, primary winding n1 of the output transformer Ti, capacitor C3 and transistor Q2.

When the transistor Q1 is turned ON and the transistor Q2 is turned OFF, the discharging operation from the capacitor C4 is stopped so that the current mode is shifted to such a mode as shown in FIG. 50.

It will be clear from the aforementioned operational mode that, at valley parts of the output voltage of the rectifier DB, a current is supplied from the rectifier DB in such operational modes (corresponding half of the 6 operational modes generated at valley parts of the output voltage of the rectifier DB) as shown in FIGS. 52, 53 and 54 so that a high frequency current flows into the rectifier DB. As a result, generation of any pause period in the input current can be prevented in the vicinity of zero-cross points in the A.C. power source Vs.

As has been explained above, the operation as the voltage step-down chopper circuit makes it difficult for the voltage applied to the primary winding n1 of the output transformer T1 to become high regardless of the state of the load circuit and also makes small the stress of constituent elements caused by application of excessive voltage at mountain parts of the output voltage of the rectifier DB; whereas, substantially no pause period takes place in the input current flowing through the rectifier DB at mountain parts of the output voltage of the rectifier DB. In addition, even at valley parts of the output voltage of the rectifier DB, the input current flows intermittently at a high frequency through the rectifier DB. As a result, the input current can continuously flow through a relatively long period of time without any continuous pause and generation of its input distortion can be suppressed. In particular, since the input current flows merely intermittently at a high frequency, only the use of the simple filter circuit F in the form of a low pass filter having a cut-off frequency corresponding nearly to the frequency of the power voltage of the A.C. power source Vs enables the prevention of leakage of high frequency components into the side of the A.C. power source Vs. Further, since the input current to the rectifier DB flows substantially continuously at mountain parts of the output voltage of the rectifier DB and flows intermittently at a high frequency at valley parts of the output voltage thereof, the input current become much at mountain parts of the output voltage of the rectifier DB and becomes less at valley parts of the output voltage thereof. As a result, an envelope of the input current to the rectifier DB can be made to have a substantially sinusoidal waveform, which means that high frequency components can be suppressed and the input power factor can be improved.

Although the inductor L2 is provided on the secondary side of the transformer T1 in the present embodiment, employment of a leakage type for the transformer T1 allows leakage magnetic flux to be used in place of the inductor L2, thus realizing miniaturization of the inverter device because of the possibility of omission of the inductor L2. Further, in the present embodiment, the switching elements are made up of the parallel circuits of the transistors Q1 and Q2 and diodes D1 and D2 respectively. When the switching elements are made to be of a MOS FET type, however, the diodes D1 and D2 can become unnecessary with realization of a further miniaturization of the inverter device. It goes without saying that the number of the discharge lamps La as a load circuit is not limited to one but may be 2 or more. In this case, the connection relationship between the discharge lamp La may be of a series, parallel or combination thereof.

(Embodiment 27)

Figure 56:
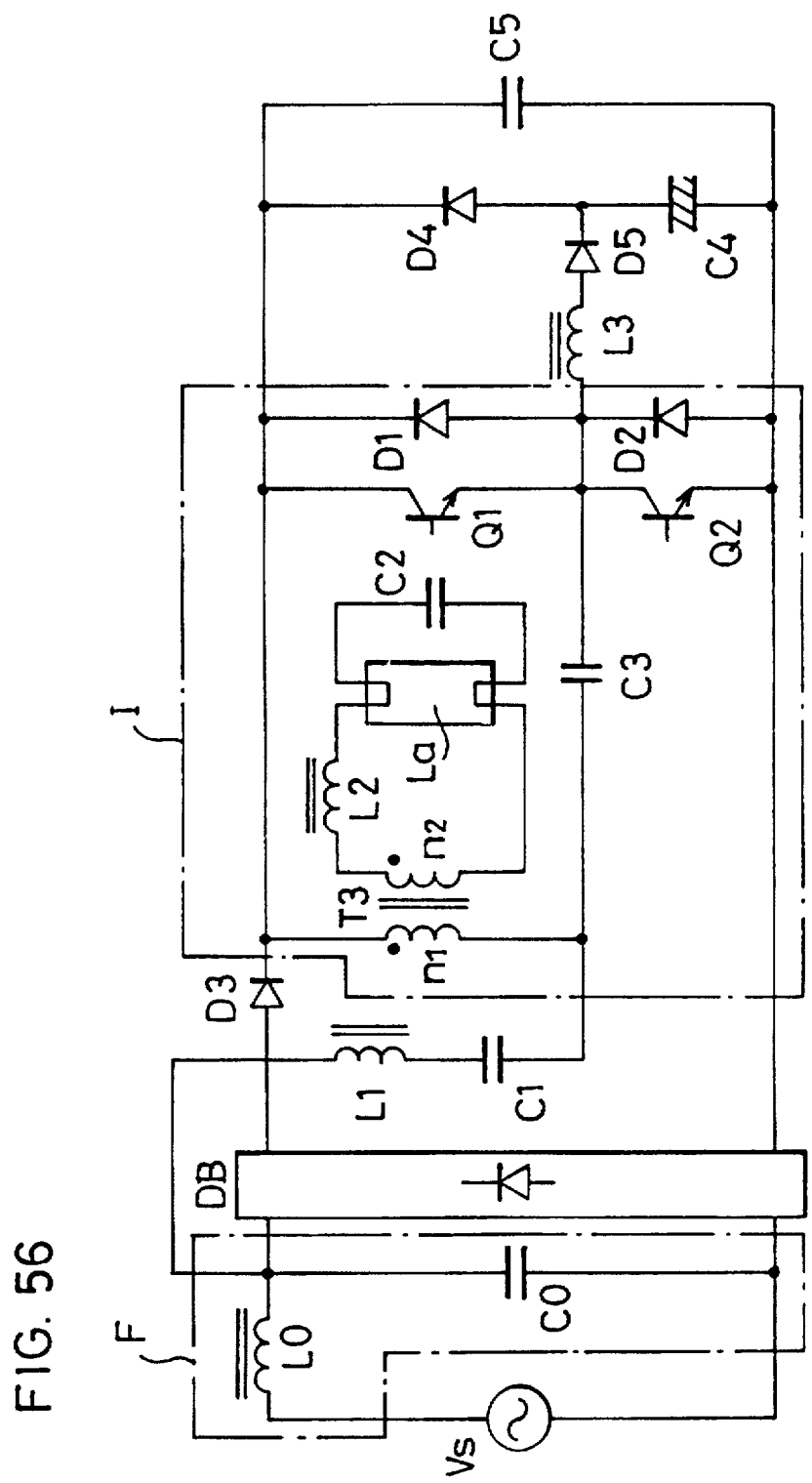
FIGS. 56 and 57 show circuit diagrams in accordance with embodiments 27 and 28 of the present invention.

The present embodiment is nearly the same in arrangement as the embodiment 26 of FIG. 43, but different therefrom in that, shown in FIG. 56, the impedance element comprising the series circuit of the inductor L1 and capacitor C1 in the embodiment 26 is connected at its one end not to positive one of the output ends of the rectifier DB but to one of the input ends of the rectifier DB.

The basic operation of the present embodiment is substantially the same as that of the embodiment 26. However, when a current flowing through the inductor L1 has an upward direction (in FIG. 56) (operational modes shown in FIGS. 44, 45, 49, 50, 51 and 55), the current flows through the rectifier DB and diode D3; whereas, when a current flowing through the inductor L1 has a downward direction (in FIG. 56) (operational modes shown in FIGS. 46, 47, 48, 52, 53 and 54), the current flows from the A.C. power source Vs to the inductor L1 not through the rectifier DB but through the filter circuit F. Other arrangement and operation are substantially the same as those of the embodiment 26.

(Embodiment 28)

Figure 57:
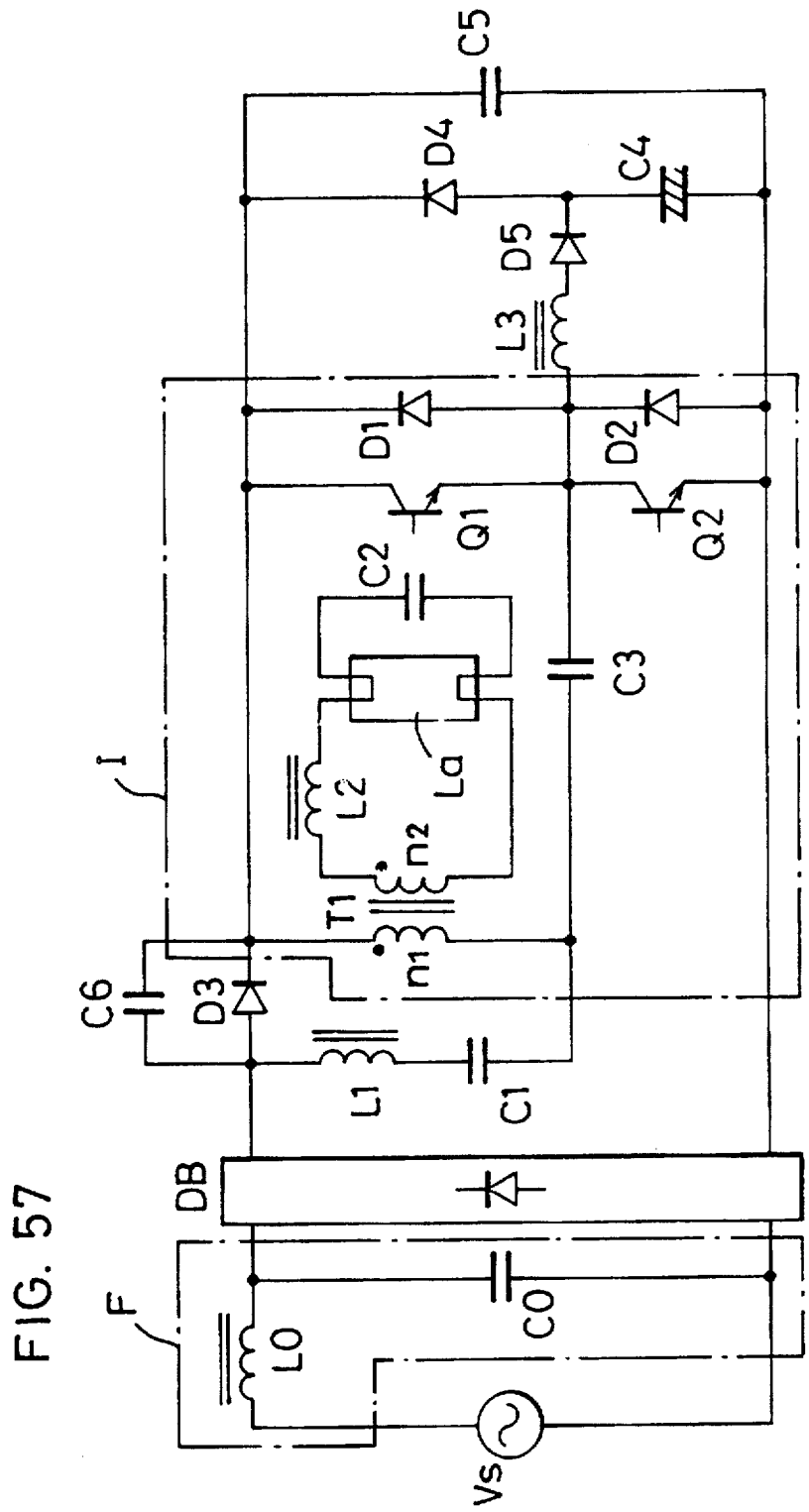

The present embodiment is different from the embodiment 26 of FIG. 43 in that, as shown in FIG. 57, the capacitor C6 is wired in parallel with the diode D3. The capacitor C6 is provided for the purpose of further improving the input distortion. That is, the input current of the present embodiment is designed to have a waveform much closer to a sinusoidal waveform than in the embodiment 26 through the operation of the present embodiment, which will be detailed below.

Figure 58:
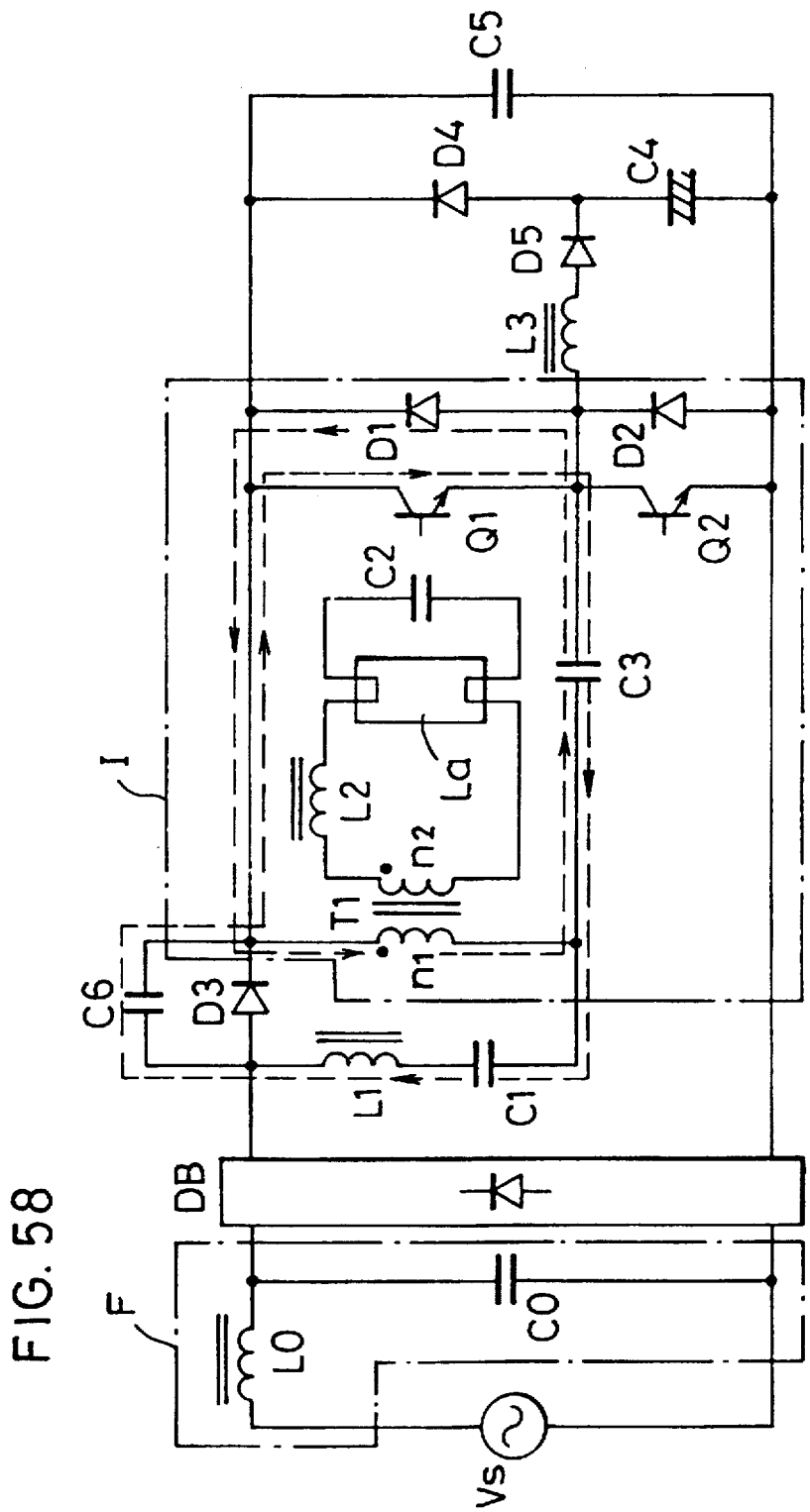
FIGS. 58 to 63 show circuit diagrams for explaining the operations of the embodiment 27 of FIG. 57.

Since the operation of the present embodiment is the same as that of the embodiment 26 at a peak value (mountain parts) of the output voltage of the rectifier DB, only the operation in the vicinity of zero-cross points in the A.C. power source will be explained. Explanation will first be made as to the operational mode wherein the transistor Q1 is in the ON state and the transistor Q2 is in the OFF state. That is, there is present such an operational mode that currents flow as shown in FIG. 58. Under this condition, the oscillating current of the resonance circuit of the transformer T1 and capacitor C3, as in the embodiment 26, flows downwardly (in FIG. 58) through the primary winding n1 of the output transformer T1. That is, the current flows through a path of the primary winding of the transformer T1, capacitor C3 and diode D1. Meanwhile, the oscillating current of the resonance circuit of the capacitor C1 and inductor L1 flows upwardly (in FIG. 58) through the inductor L1, that is, through a path of the capacitor C1, inductor L1, capacitor C6, transistor Q1 and capacitor C3. Since the output voltage of the rectifier DB is low and the capacitor C6 is not sufficiently charged, the current flows into the capacitor C6 and the diode D3 is kept in its OFF state.

Figure 59:
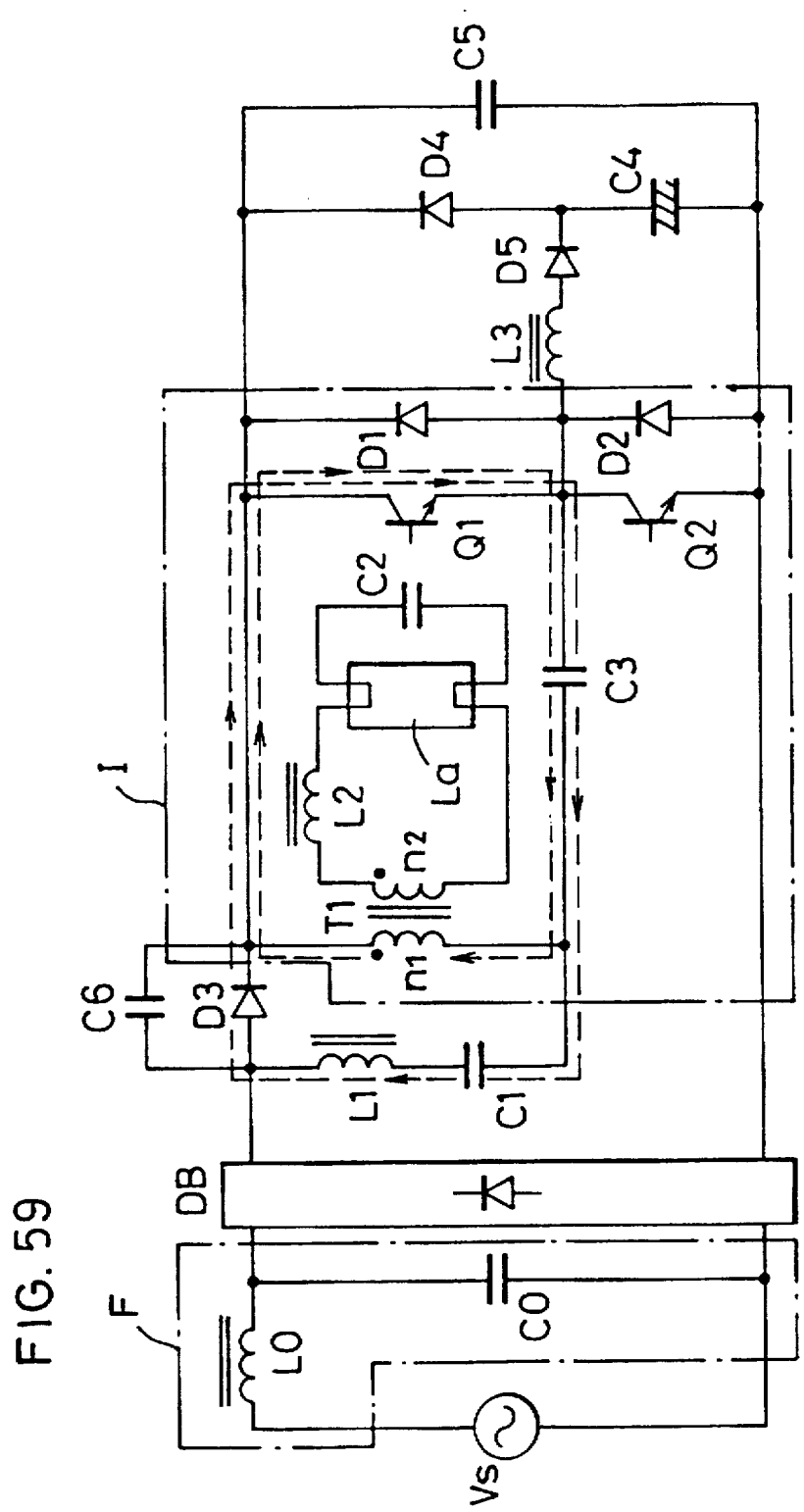

Thereafter, the current flowing through the resonance circuit of the transformer T1 and capacitor C3 is reversed in its flowing direction, so that, as shown in FIG. 59, a current starts flowing through a path of the capacitor C3, primary winding n1 of the output transformer T1 and transistor Q1. At this time, since the voltage across the capacitor C3 is added to the voltage across the series circuit of the capacitor C1 and inductor L1, this causes generation of a potential difference enough to turn ON the diode D3 across the diode D3, thus turning ON the diode D3. This results in that a current starts flowing through a path of the capacitor C1, inductor L1, diode D3, transistor Q1 and capacitor C3.

Figure 60:
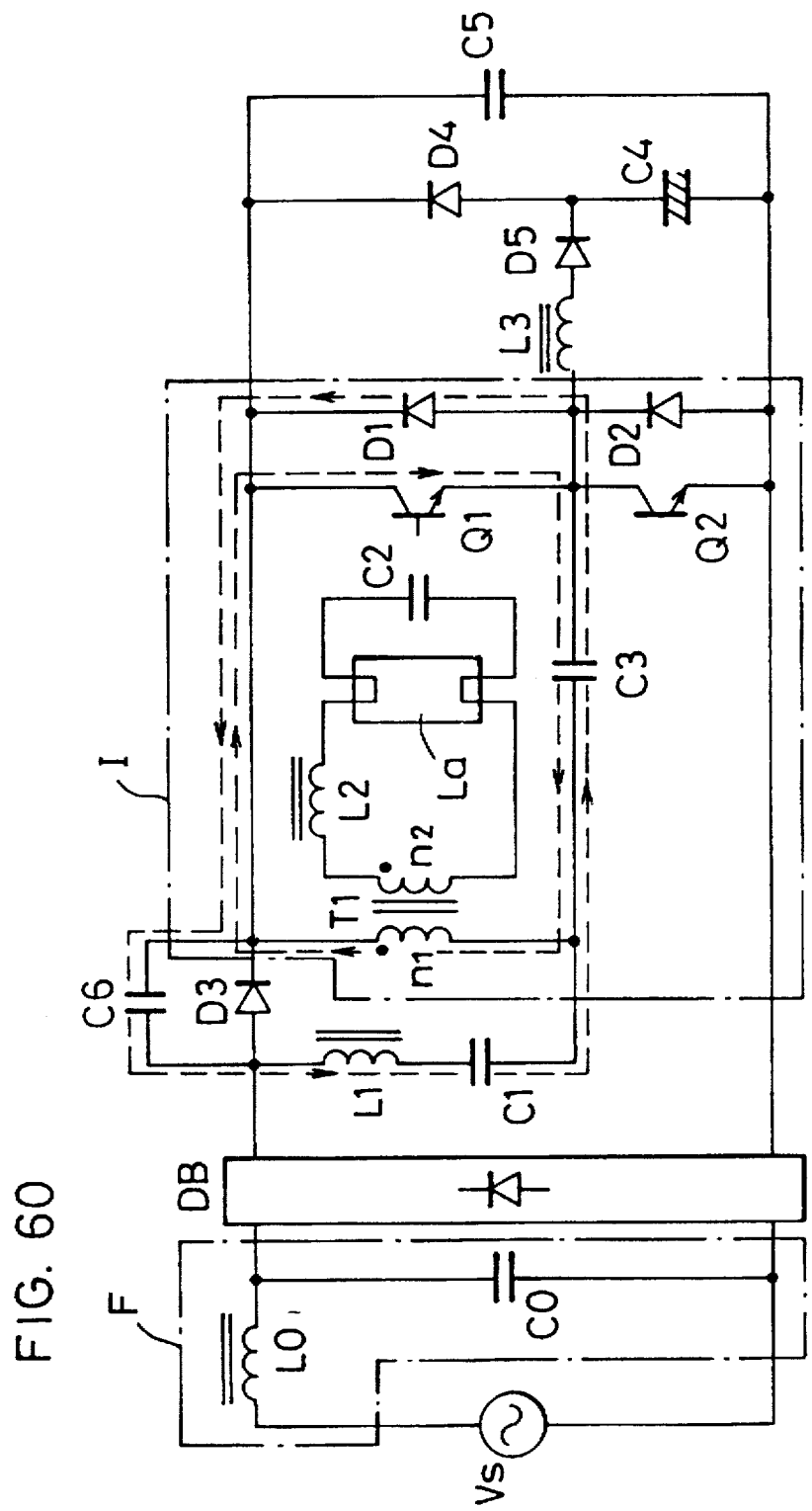

When the oscillating current flowing through the resonance circuit of the inductor L1 and capacitor C1 is next reversed in its flowing direction, a current flows through a path of the capacitor C1, capacitor C3, diode D1 and capacitor C6 as shown in FIG. 60. In other words, the current flowing through the inductor L1 and capacitor C1 is supplied from the rectifier DB in the embodiment 26; whereas, the provision of the capacitor C6 causes generation of a potential difference across the capacitor C6 in the present embodiment, such that a current flows from the rectifier DB not through a path of the inductor L1, capacitor C1, capacitor C3, diode D1 and capacitor C5 but through a path of the inductor L1, capacitor C1, capacitor C3, diode D1 and capacitor C6. During this period, the current flowing through a path of the capacitor C3, primary winding n1 of the output transformer T1 and transistor Q1 is continued.

Figure 61:
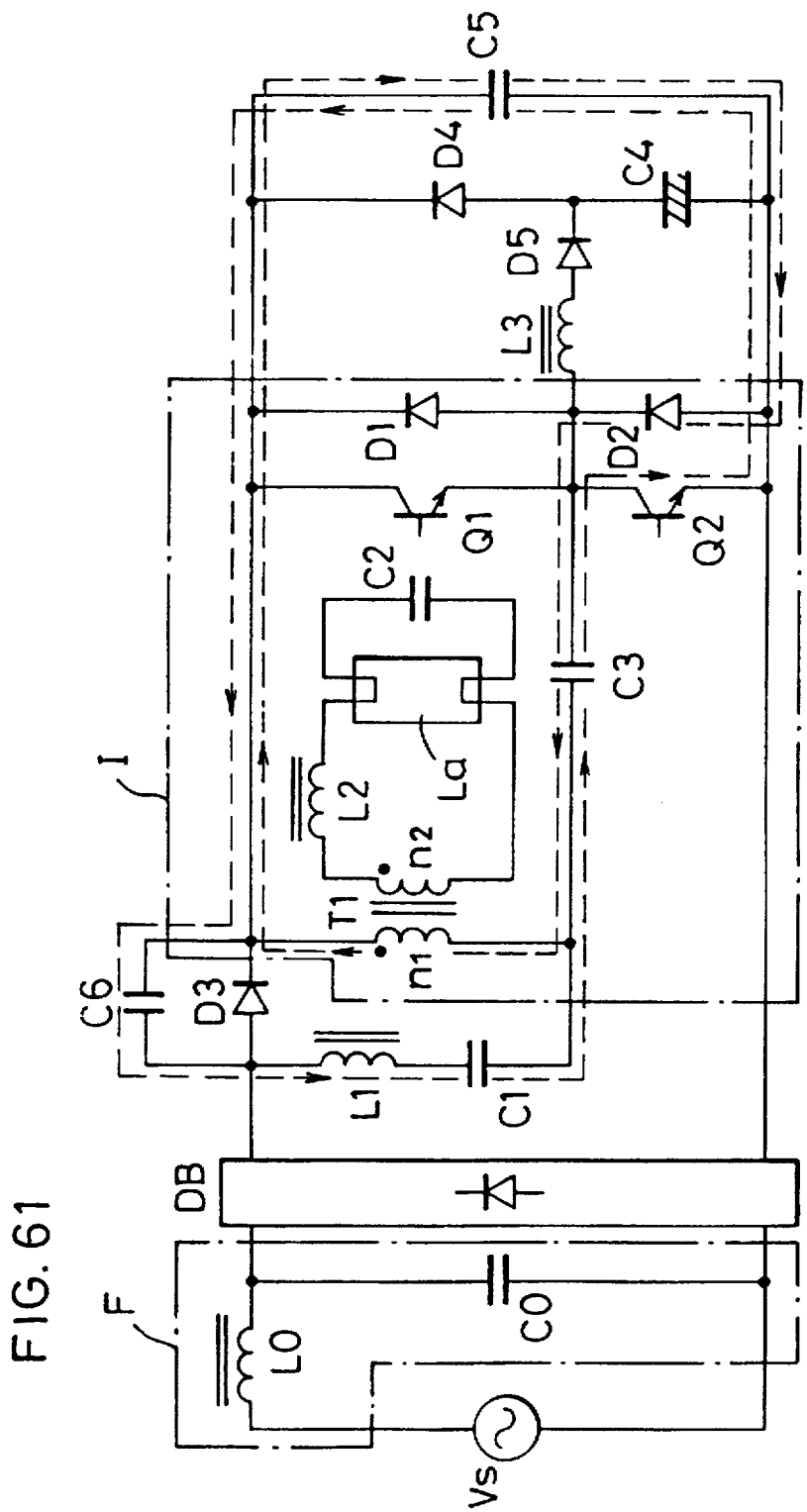

Now, when the transistor Q1 is turned OFF and the transistor Q2 is turned ON, as shown in FIG. 61, the current flowing through the transistor Q1 is interrupted so that the current so far flowing through the transistor Q1 takes a detour and starts flowing through a path of the capacitor C5 and diode D2. Further, the cathode potential of the diode D1 becomes higher than the anode potential thereof, so that the diode D1 is also put in its OFF state and a current flows through a path of the capacitor C1, capacitor C3, transistor Q2, capacitor C5, capacitor C6 and inductor L1.

Figure 62:
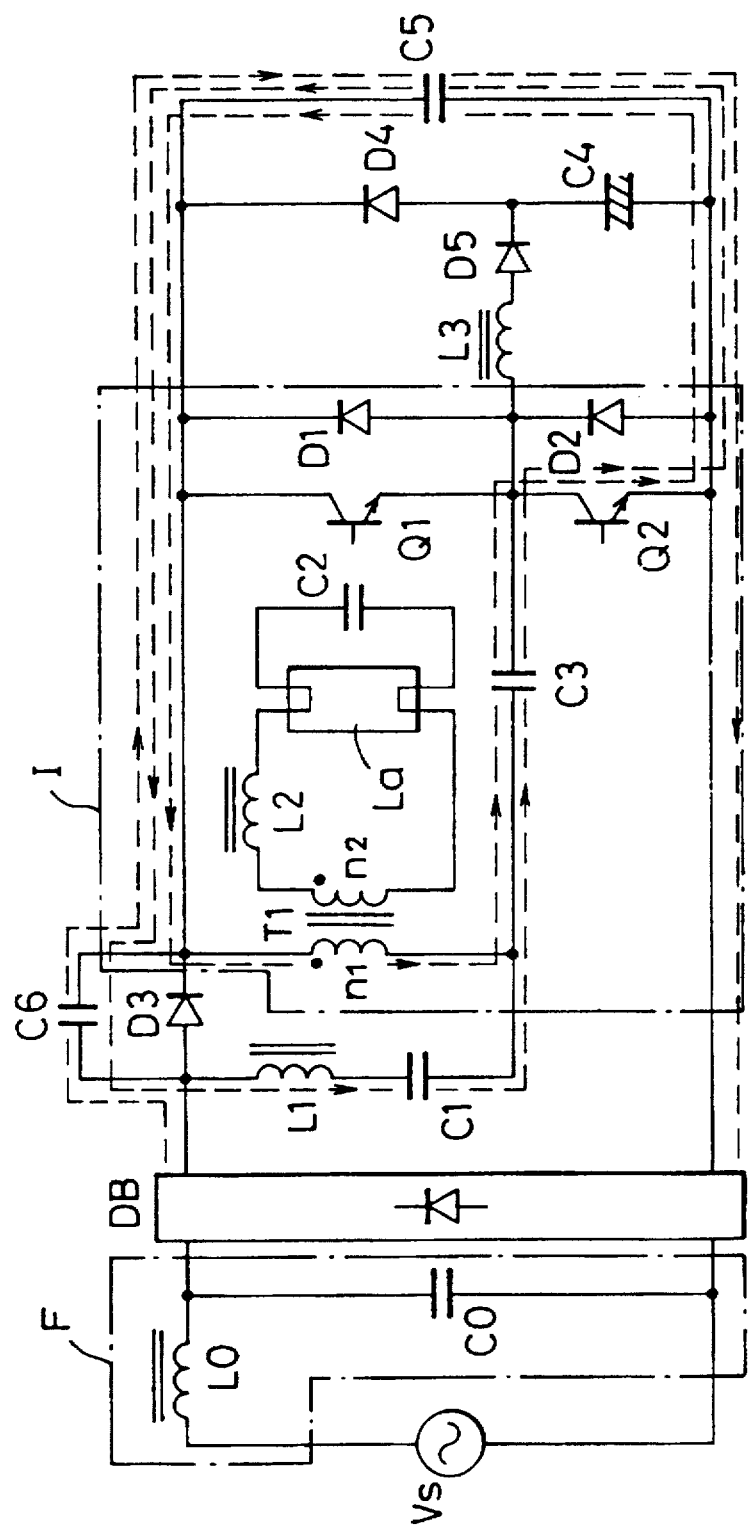

Thereafter, the oscillating current flowing the resonance circuit of the capacitor C3 and transformer T1 is immediately reversed in its flowing direction so that, as shown in FIG. 62, the oscillating current starts flowing through a path of the capacitor C5, primary winding n1 of the output transformer T1, capacitor C3 and transistor Q2. In this case, the current flowing through the path of the capacitor C1, capacitor C3, transistor Q2, capacitor C5, capacitor C6 and inductor L1 is not changed. Further, a current starts flowing from the rectifier DB through a path of the capacitor C6 and capacitor C5, only during which the input current flows into the rectifier DB.

Figure 63:
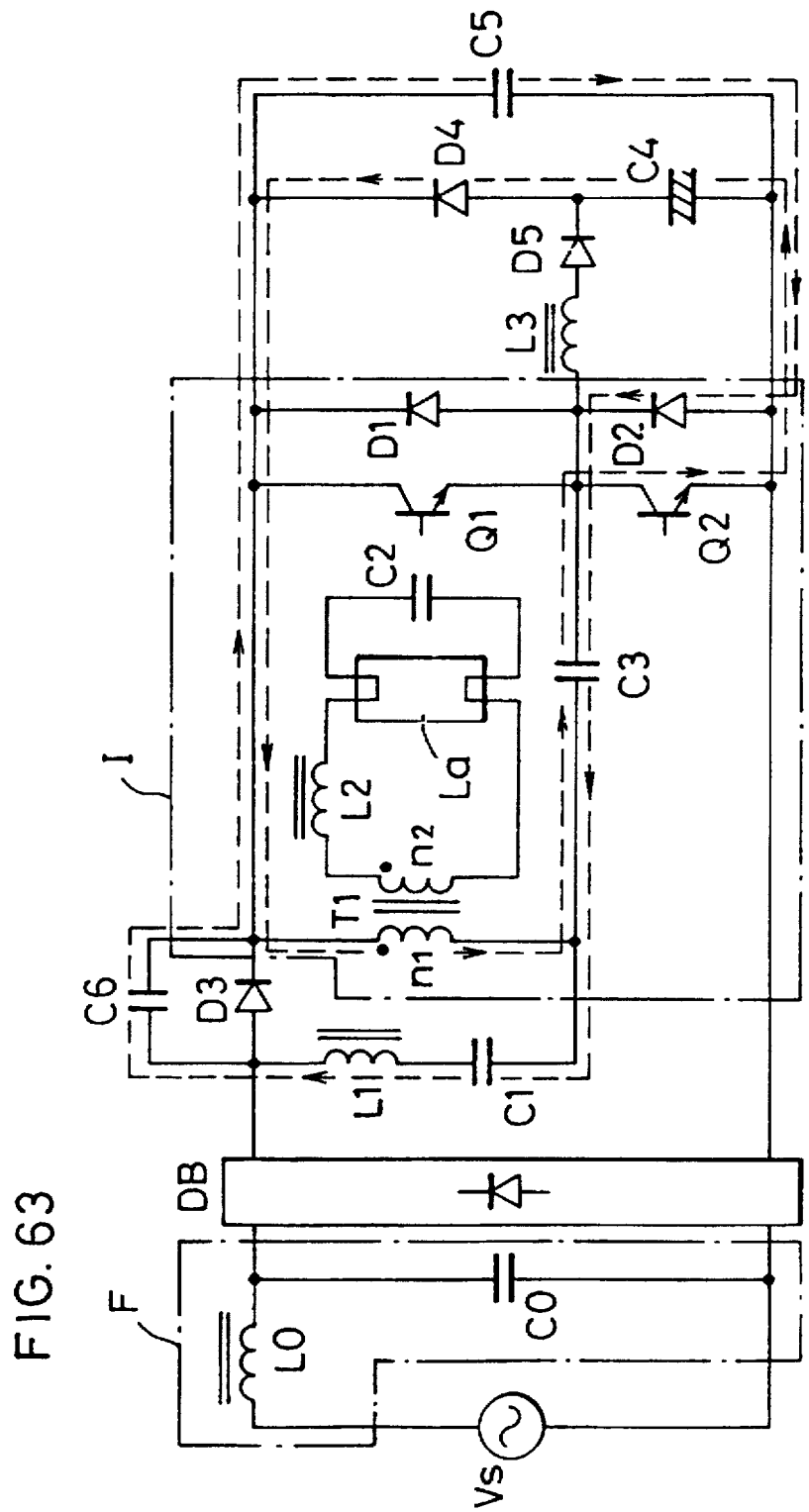

Then, as shown in FIG. 63, the oscillating current flowing through the resonance circuit of the inductor L1 and capacitor C1 is reversed in its flowing direction so that a current flows through a path of the capacitor C1, inductor L1, capacitor C6, capacitor C5, diode D2 and capacitor C3. The discharging operation of charge accumulated in the capacitor C4 causes a current to flow through a path of the capacitor C4, diode D4, primary winding n1 of the output transformer T1, capacitor C3 and transistor Q2. When the transistor Q1 is turned ON and the transistor Q2 is turned OFF, the discharging operation from the capacitor C4 is stopped and the current mode is shifted to such a mode as shown in FIG. 58.

As has been explained in the foregoing, the input current to the rectifier DB occurs only in such an operational mode as shown in FIG. 62. That is, the input current flows into the rectifier DB only in one of the 6 operational modes. More specifically, even in the present embodiment, the input current flows intermittently at a high frequency as in the embodiment 26, but the current flowing duration is shorter than that in the embodiment 26 so that the input current can be pulled down from the input current in the case of the embodiment 26. This means that the input current approaches zero in the vicinity of zero-cross points in the voltage of the A.C. power source Vs and thus the waveform of the input current becomes close to a sinusoidal waveform. In short, when the current abruptly varies in the vicinity of zero-cross points in the voltage of the A.C. power source Vs in the arrangement of the embodiment 26, the provision of the capacitor C6 as in the present embodiment enables the current change to be softened so that the input current can have a waveform closer to a sinusoidal waveform and thus high frequency components can be further reduced.

(Embodiment 29)

Figure 64:
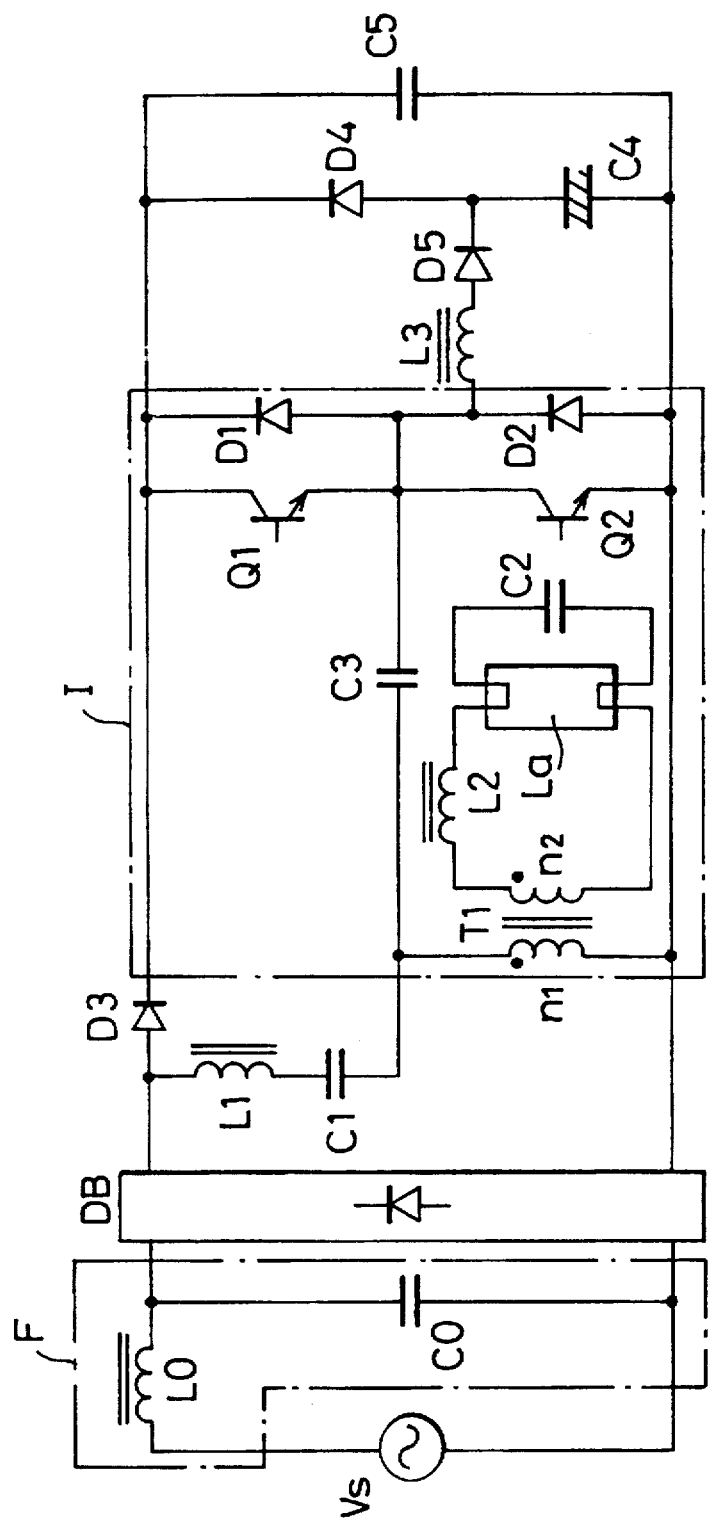
FIGS. 64 to 68 show circuit diagrams in accordance with embodiments 29 to 33 of the present invention.

In the present embodiment, as shown in FIG. 64, the insertion position of the primary winding n1 of the output transformer T1 in the arrangement of the embodiment 26 shown in FIG. 43 is modified. More specifically, although the series circuit of the diode D3 and primary winding n1 of the output transformer T1 has been connected in parallel with the series circuit of the inductor L1 and capacitor C1 in the embodiment 26; the primary winding n1 of the output transformer T1 is connected in series with the series circuit of the inductor L1 and capacitor C1, and a series circuit of the inductor L1, capacitor C1 and primary winding n1 of the output transformer T1 is connected between the output ends of the rectifier DB in the present embodiment.

The present embodiment is slightly different from the embodiment 26 in the operation of the inverter circuit I, and the current flowing through the series circuit of the inductor L1 and capacitor C1 is the same as that in the embodiment 26. Accordingly, explanation will be made briefly as to the current flowing through the inverter circuit I at valley parts of the output voltage of the rectifier DB. In the operational mode corresponding to FIG. 50, a current flows through a path of the primary winding n1 of the output transformer T1, capacitor C3, diode D1 and capacitor C5; in the operational mode corresponding to FIG. 51, a current flows through a path of the capacitor C5, transistor Q1, capacitor C3 and primary winding n1 of the output transformer T1. In the operational mode corresponding to FIG. 52, further, a current flows through a path of the capacitor C4, diode D4, transistor Q1, capacitor C3 and primary winding n1 of the output transformer T1. Thereafter, when the transistors Q1 and Q2 are reversed in their ON and OFF states, the mode is shifted to the mode corresponding to FIG. 53, in which a current flows through a path of the transformer T1, diode D2 and capacitor C3. In the modes corresponding to FIGS. 54 and 55, a current flows through a path of the capacitor C3, transistor Q2 and transformer Ti.

Other arrangement and operation are substantially the same as those of the embodiment 26.

(Embodiment 30)

Figure 65:
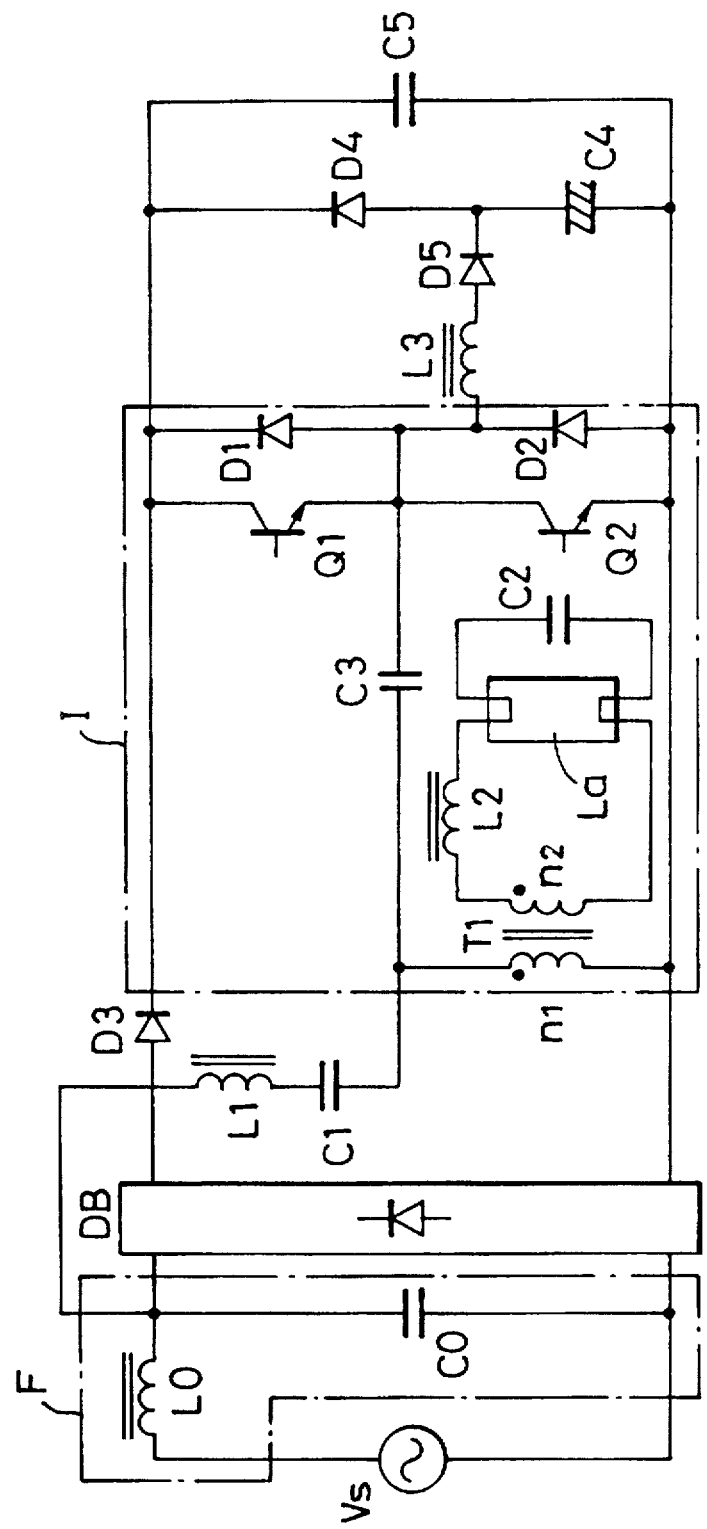

The present embodiment is different from the embodiment 29 of FIG. 64 in that, as shown in FIG. 65, the inductor L1 is connected at its one end not to the junction point of the anode of the diode D3 and positive one of the output ends of the rectifier DB in the embodiment 29 but to one of the input ends of the rectifier DB. The difference between the embodiments 29 and 30 in the connection relationship is the same as the difference between the embodiments 27 and 26, and the present embodiment is operated basically in the same manner as the embodiment 29, except that the current directed from the capacitor C1 toward the inductor L1 flows to the diode D3 through the rectifier DB and that the current directed from the inductor L1 toward the capacitor C1 flows from the A.C. power source Vs not through the rectifier DB but through the filter circuit F.

(Embodiment 31)

Figure 66:
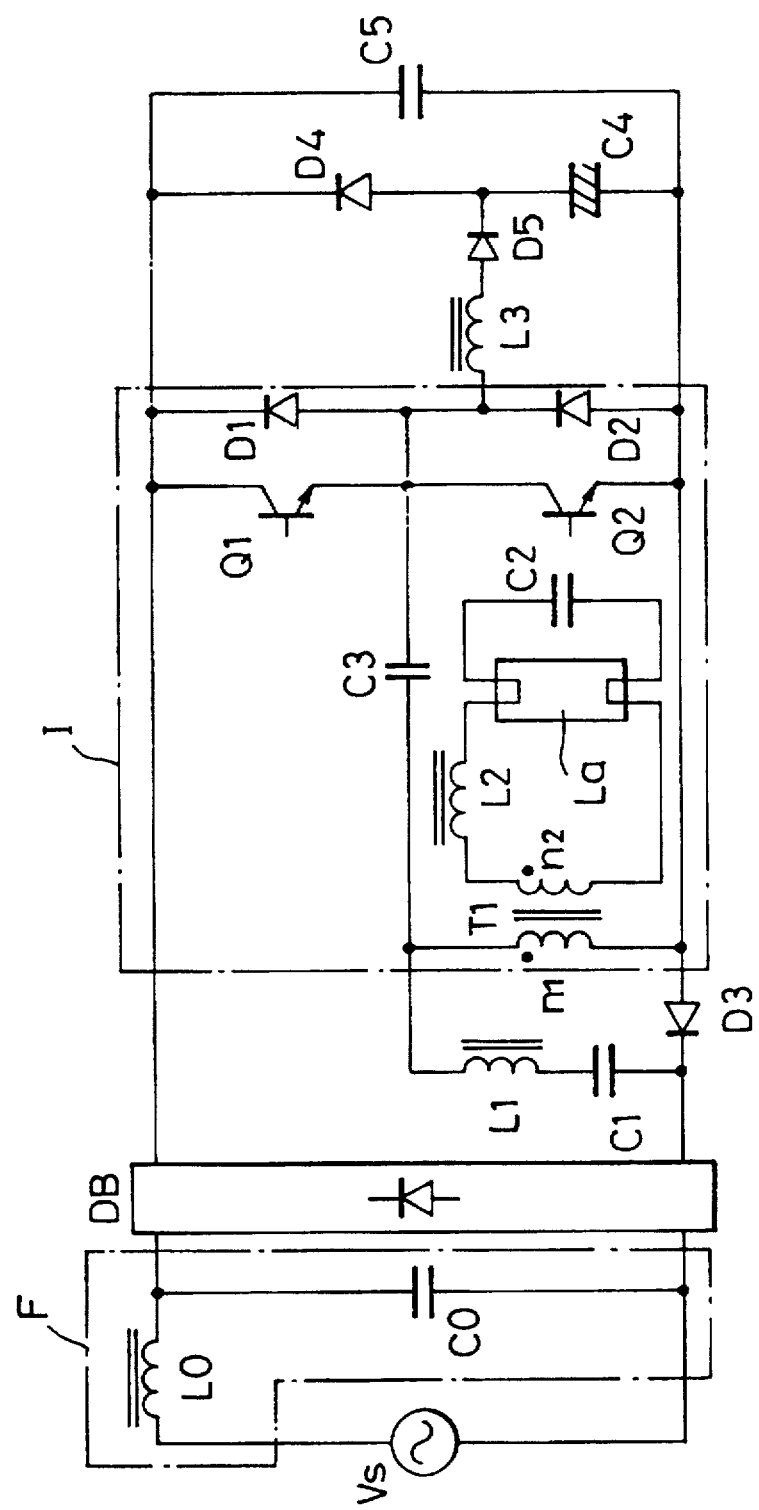

In the present embodiment, as shown in FIG. 66, the inductor L1, capacitor C1 and diode D3 in the embodiment 29 are provided on negative one of the output ends of the rectifier DB. More in detail, a series circuit of the capacitor C5 and diode D3 is connected between the output ends of the rectifier DB, and the diode D3 is connected at its cathode to negative one of the output ends of the rectifier DB. Further connected in parallel with a series circuit of the primary winding nil of the output transformer T1 and diode D3 is the series circuit of the inductor L1 and capacitor C1 so that the capacitor C1 is connected at its one end to the cathode of the diode D3.

The operation of the inverter circuit I is substantially the same as that of the embodiment 29 and thus explanation thereof is omitted, but the operation of the inverter circuit I at valley parts of the output voltage of the rectifier DB will be briefly explained in the following. That is, the operation of the present embodiment is divided into 6 operational modes as in the embodiment 26. In operational modes corresponding to FIGS. 50 and 51 in the embodiment 26, a current flows from the rectifier DB through a path of the transistor Q1, capacitor C3, inductor L1 and capacitor C1; in an operational mode corresponding to FIG. 52, a current flows through a path of the capacitor C1, inductor L1, capacitor C3, diode D1, capacitor C5 and diode D3. In operational modes corresponding to FIGS. 53 and 54, further, a current flows through a path of the capacitor C1, inductor L1, capacitor C3, transistor Q2 and diode D3. In an operational mode corresponding to FIG. 55, a current flows from the rectifier DB through a path of the capacitor C5, diode D2, capacitor C3, inductor L1 and capacitor C1.

At mountain parts of the output voltage of the rectifier DB, as in the foregoing other embodiments, a function as a voltage step-down chopper circuit is added so that a current flows from the rectifier DB through a path of the transistor Q1, inductor L3, diode D5, capacitor C4 and diode D3 during the ON period of the transistor Q1 to charge the capacitor C4 and at the same time to store energy in the inductor L3. The energy stored in the inductor L3 is discharged through a path of the diode D5, capacitor C4 and diode D2 during ON period of the transistor Q2 to charge the capacitor C4. At mountain parts of the output voltage of the rectifier DB, further, a current also flows from the rectifier DB through a path of the capacitor C5 and diode D3 to charge the capacitor C5.

As has been explained above, since the current flows into the rectifier DB intermittently at a high frequency at valley parts of the output voltage of the rectifier DB even in the present embodiment, high frequency components in the input current can be reduced as in the foregoing respective embodiments. Other arrangement and operation are substantially the same as those of the embodiment 26.

(Embodiment 32)

Figure 67:
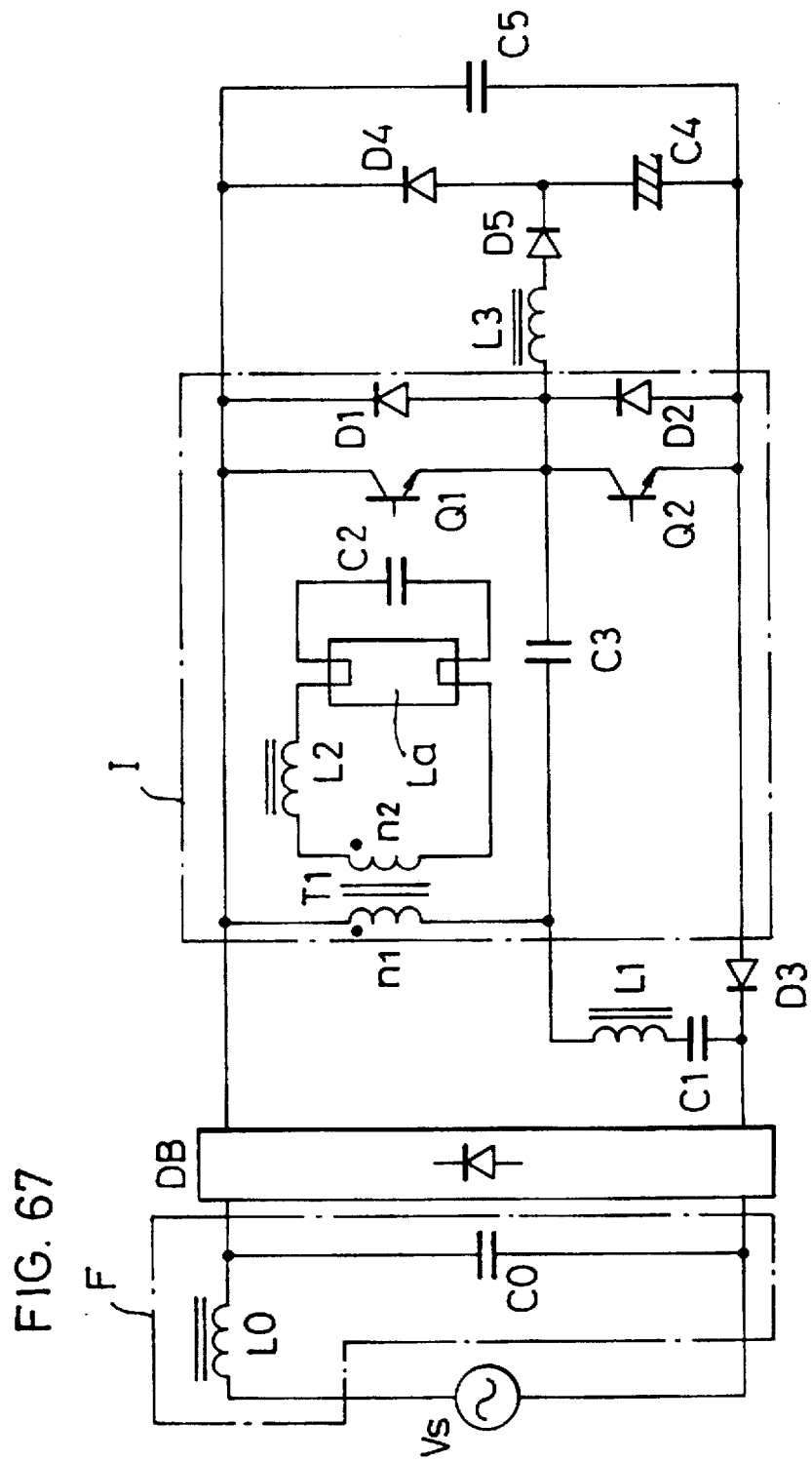

The present embodiment is different from the foregoing embodiment 31 in that, as shown in FIG. 67, a series circuit of the primary winding n1 of the output transformer T1, inductor L1 and capacitor C1 is connected between the output ends of the rectifier DB, and the primary winding n1 of the output transformer T1 is connected not to negative one of the output ends of the rectifier DB in the embodiment 31 but to positive one of the output ends thereof. The operation of the inverter circuit I is substantially the same as that in the embodiment 26 and the operation thereof at valley parts of the output voltage of the rectifier DB is substantially the same as that in the embodiment 31.

(Embodiment 33)

Figure 68:
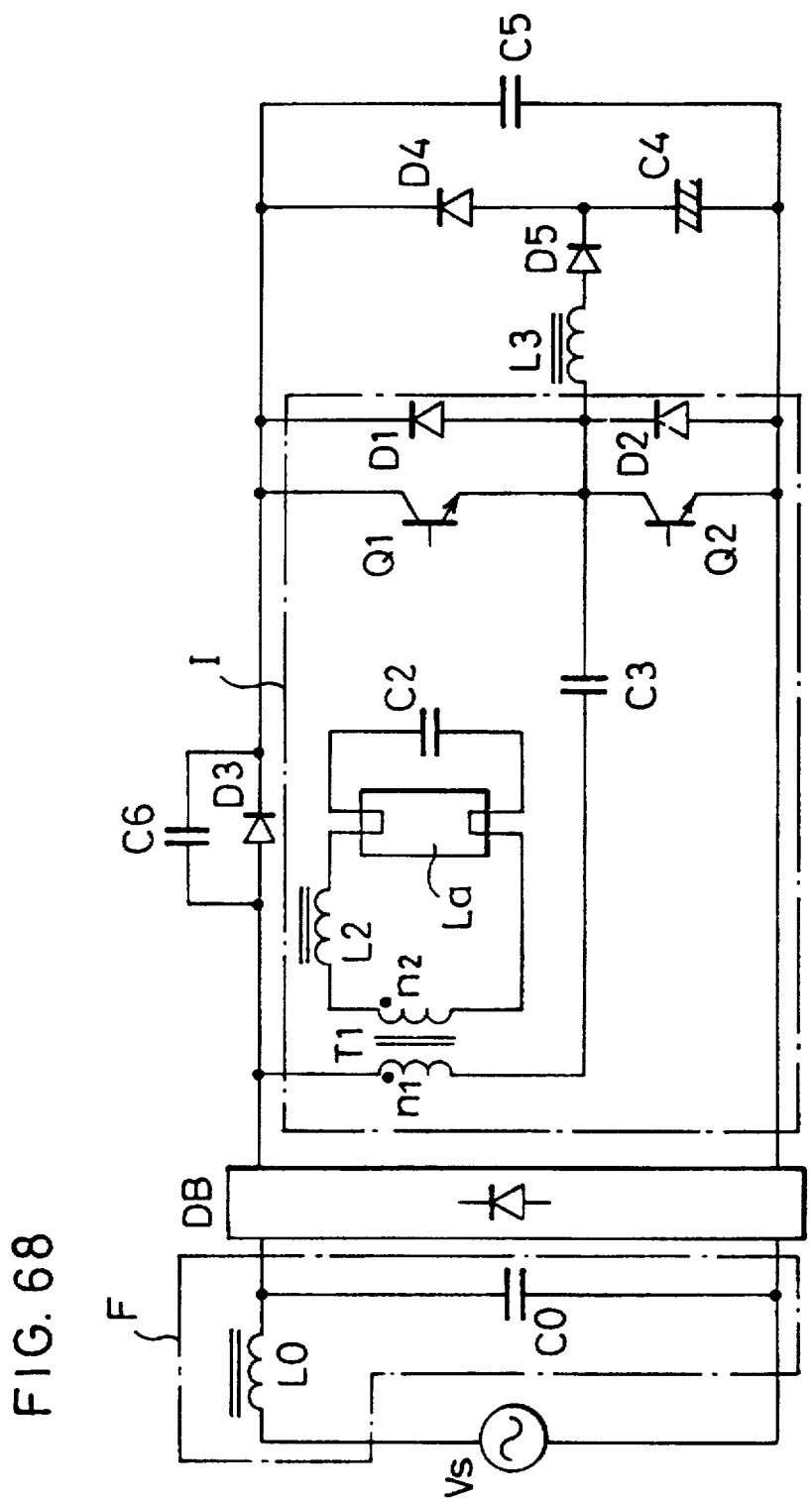

In the present embodiment, as shown in FIG. 68, the inductor L1 and capacitor C1 in the arrangement of the embodiment 28 of FIG. 57 are omitted and the primary winding n1 of the output transformer T1 is inserted in place of the series circuit of the inductor L1 and capacitor C1.

Figure 69:
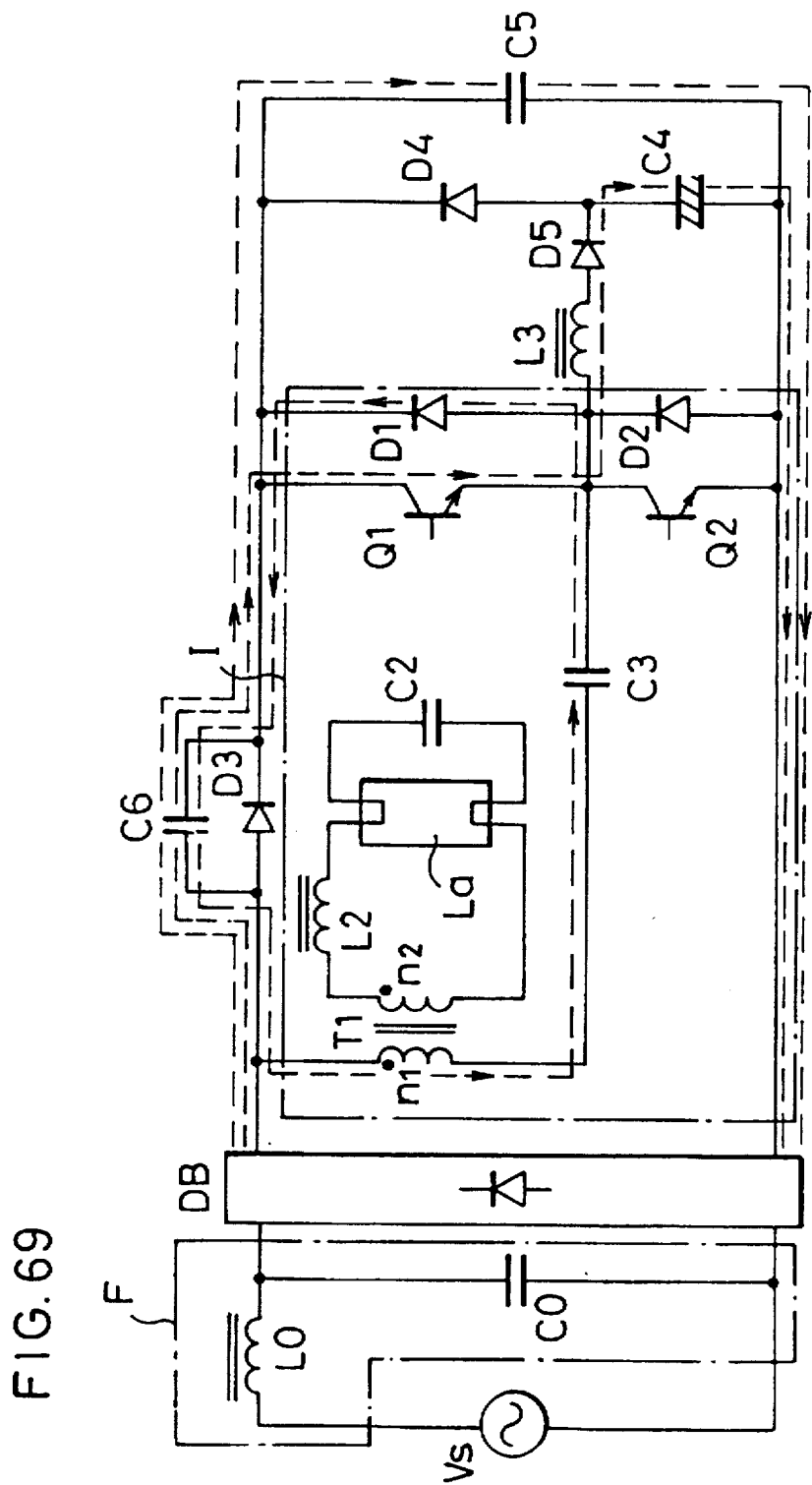
FIGS. 69 to 78 show circuit diagrams for explaining the operations of the embodiment 33 of FIG. 68.
Figure 70:
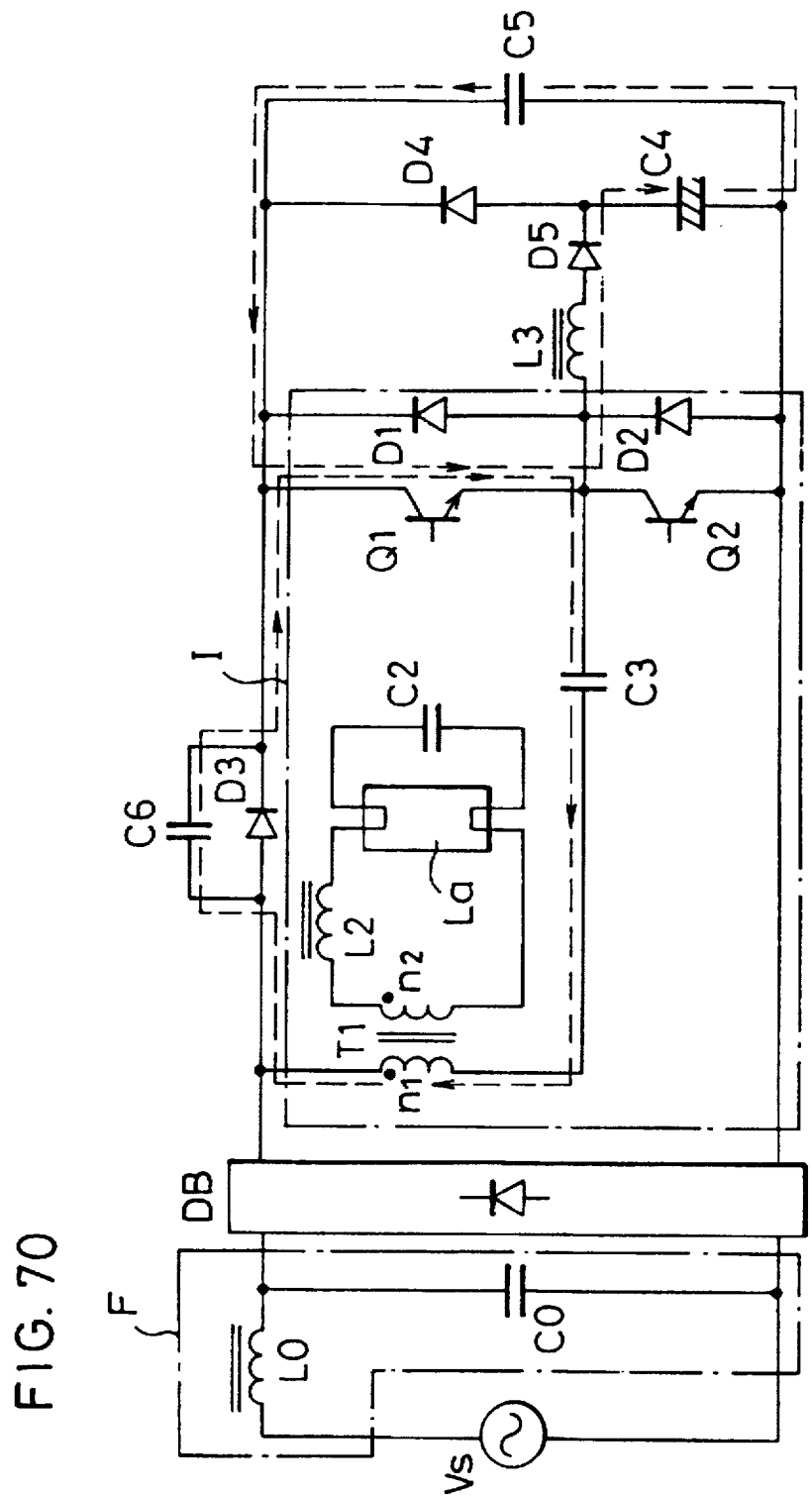
Figure 71:
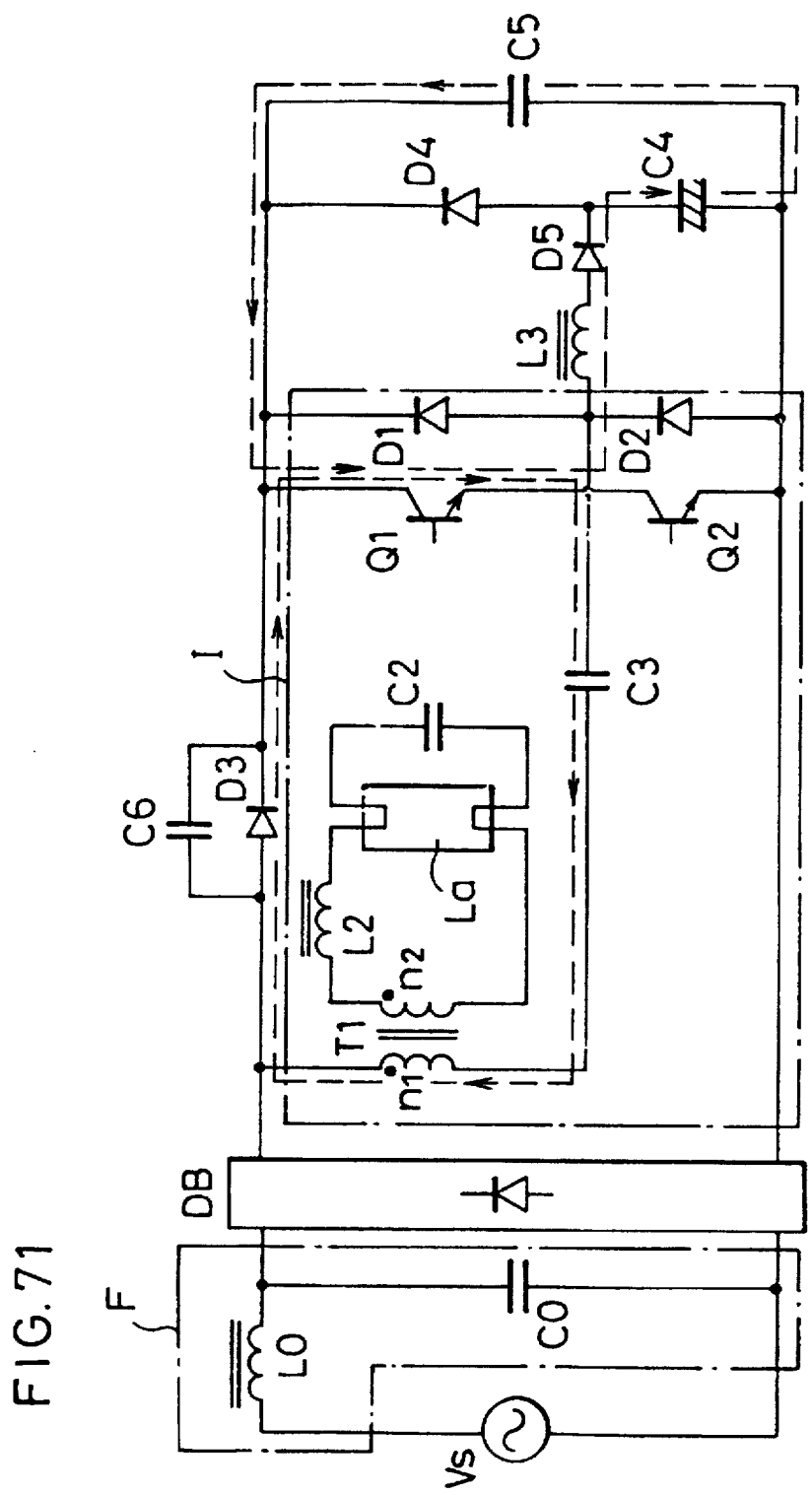
Figure 72:
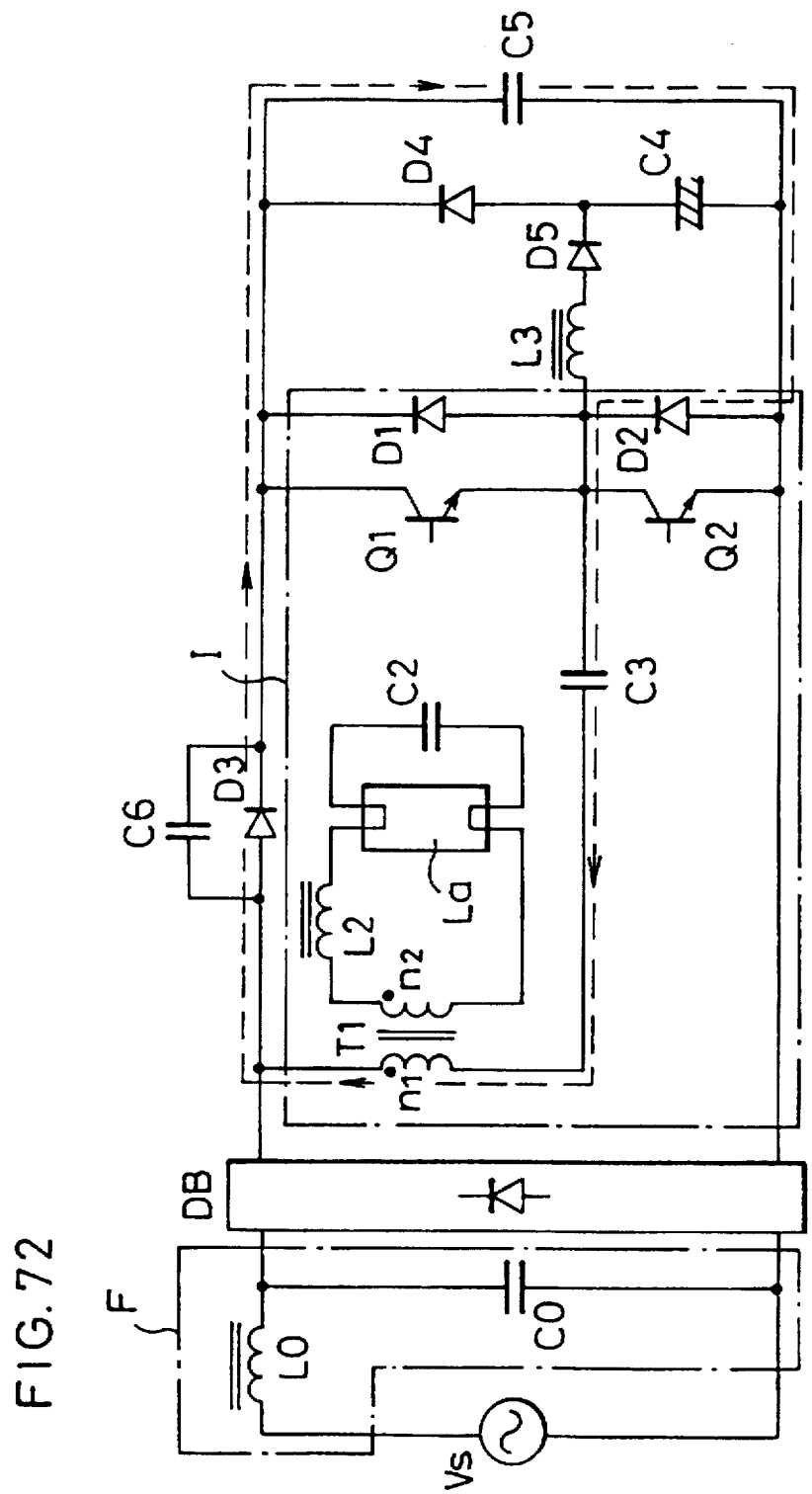
Figure 73:
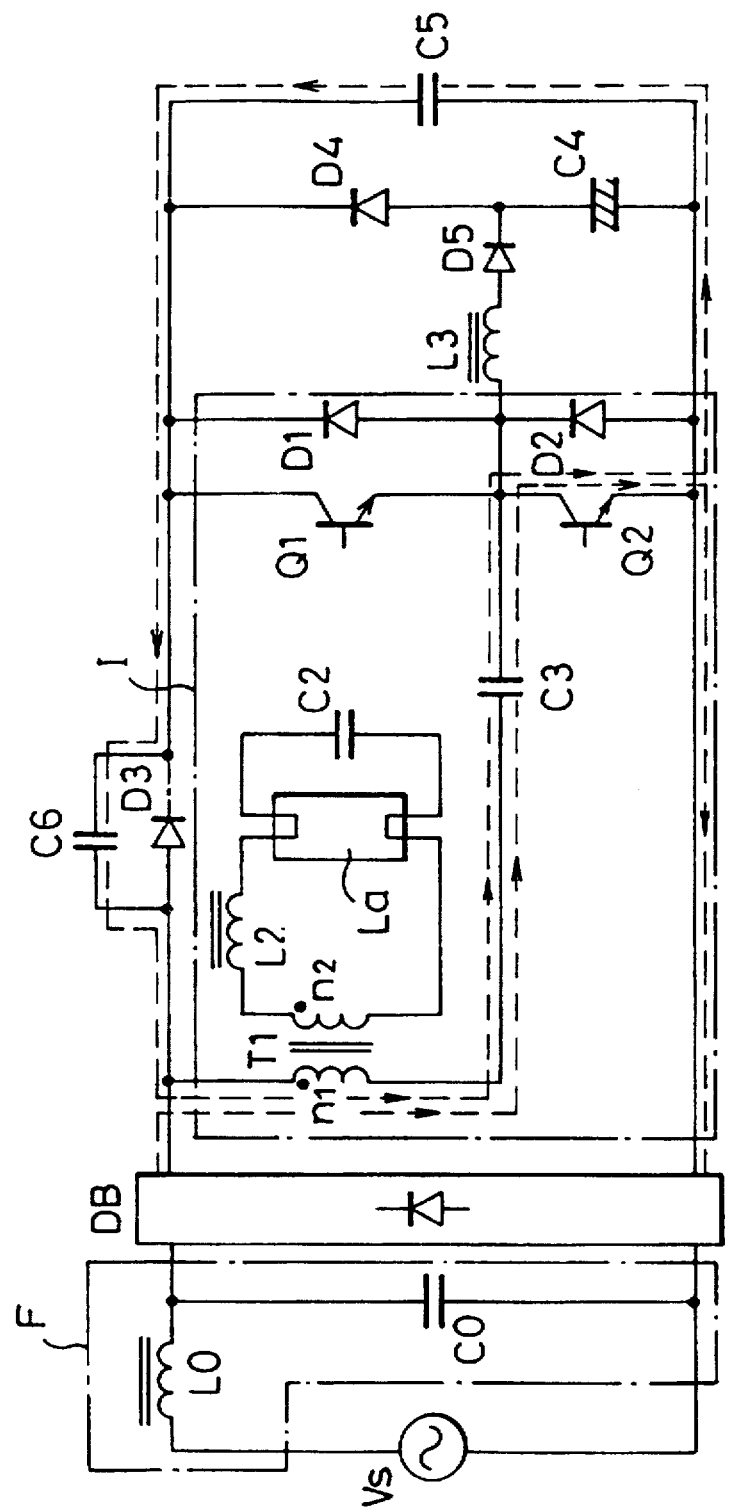

The operation of each of the foregoing embodiments has 6 operational modes respectively at mountain and valley parts of the output voltage of the rectifier DB. On the other hand, the operation of the present embodiment is operated in 5 operational modes respectively at mountain and valley parts of the output voltage of the rectifier DB. More specifically, at mountain parts of the output voltage, the present embodiment is operated in such modes as shown in FIGS. 69 to 73. Explanation will first be made in connection with a case where the transistor Q1 is in ON the state and the transistor Q2 is in the OFF state. This case corresponds to such an operational mode as shown in FIG. 69, in which a current flow through a path of the primary winding n1 of the output transformer T1, capacitor C3, diode D1 and capacitor C6, and currents also flow respectively through a path of the rectifier DB, capacitor C6, transistor Q1, inductor L3, diode D5 and capacitor C4 and through a path of the rectifier DB, capacitor C6 and capacitor C5 to thereby charge the capacitors C4 and C5. Then the oscillating current flowing through the resonance circuit contained in the inverter circuit I is reversed in its flowing direction, so that, as shown in FIG. 70, currents flow respectively through a path of the capacitor C3, primary winding n1 of the output transformer T1, capacitor C6 and transistor Q1 and through a path of the capacitor C5, transistor Q1, inductor L3, diode D5 and capacitor C4. Thereafter, when the charging operation of the capacitor C6 advances until the current to the capacitor C6 stops, a current starts flowing through the diode D3 as shown in FIG. 71. When the transistor Q1 is turned OFF and the transistor Q2 is turned ON, the energy stored in the transformer T1 causes a current to flow through a path of the primary winding n1 of the output transformer T1, diode D3, capacitor C5, diode D2 and capacitor C3, while the energy stored in the inductor L3 causes a current to flow through a path of the inductor L3, diode D5, capacitor C4 and diode D2 to thereby charge the capacitors C4 and C5, as shown in FIG. 72. Thereafter, the oscillating current flowing through the inverter circuit I is reversed in its flowing direction, so that, as shown in FIG. 73, currents flow respectively through a path of the rectifier DB, primary winding n1 of the output transformer T1, capacitor C3 and transistor Q2 and through a path of the capacitor C5, capacitor C6, primary winding n1 of the output transformer T1, capacitor C3 and transistor Q2. In short, in such operational modes as shown in FIGS. 69 to 72, the inverter circuit I acts as a step-down chopper for charging the capacitor C4 with a voltage lower than the output voltage of the rectifier DB.

Figure 74:
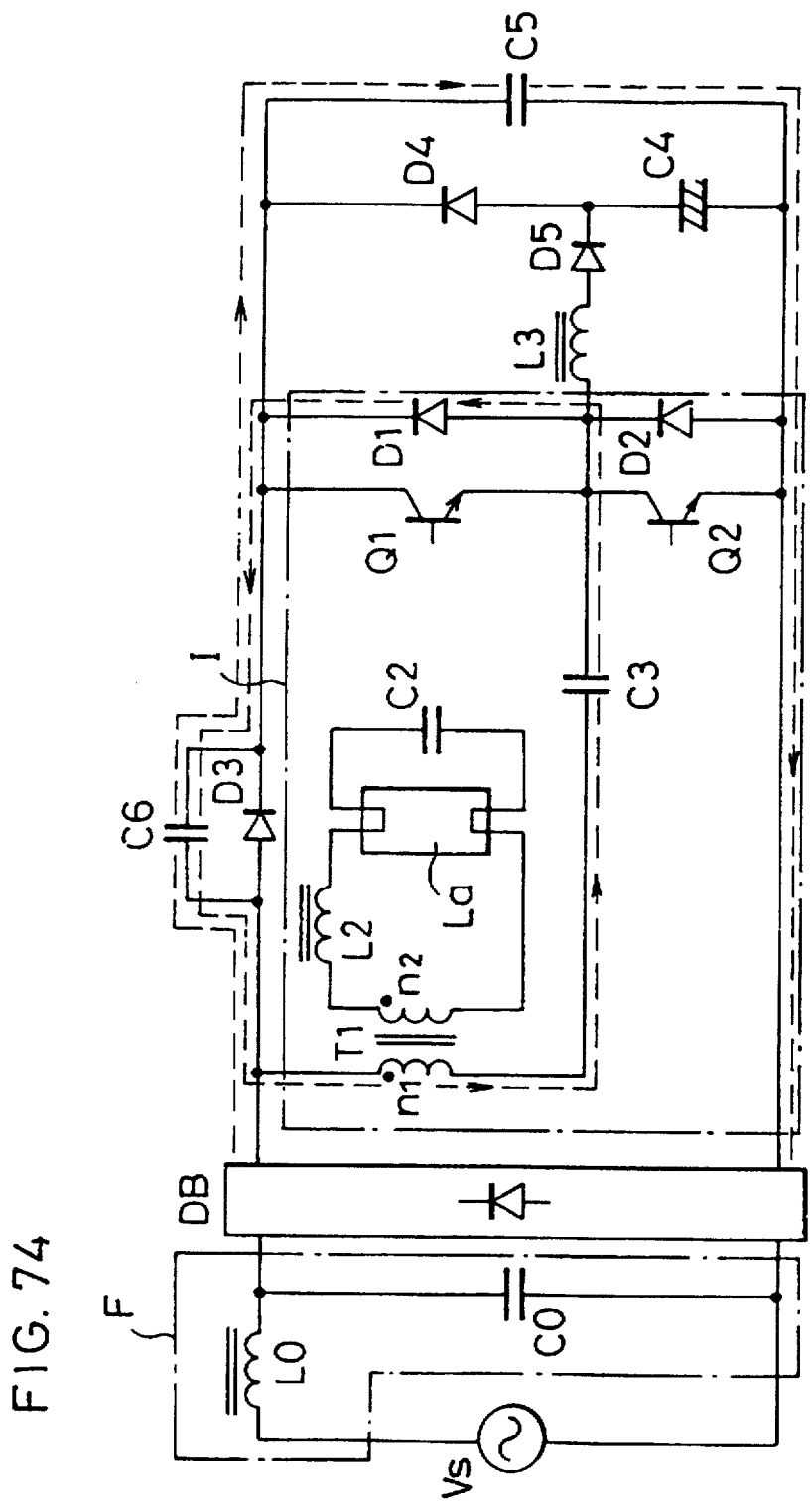
Figure 75:
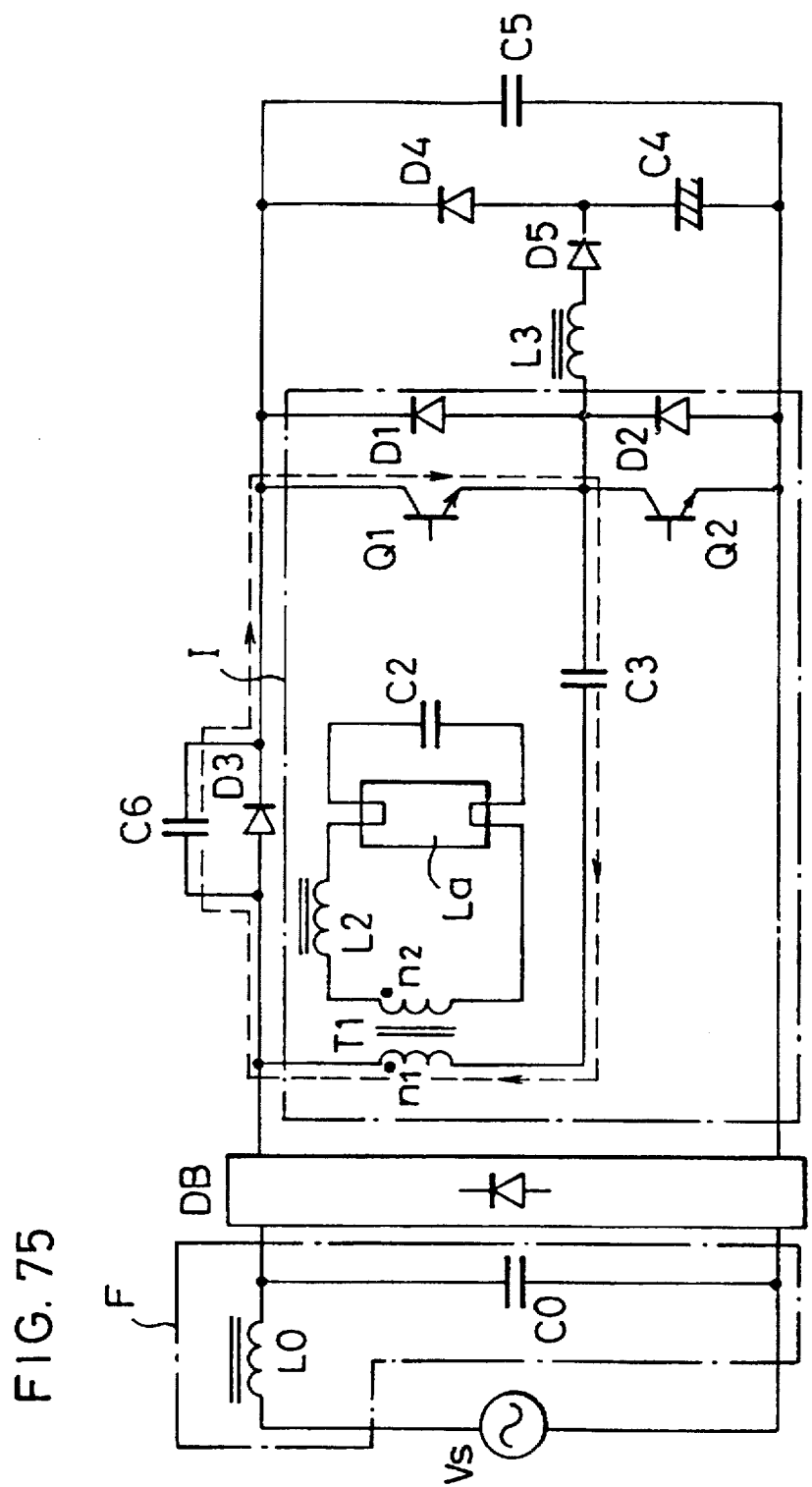

Meanwhile, at valley parts of the output voltage of the rectifier DB, as shown in FIG. 74, a current flows from the rectifier DB through a path of the capacitor C6 and capacitor C5, while, as in the ON mode of the transistor Q1 at mountain parts of the output voltage of the rectifier DB. a current flows through a path of the primary winding n1 of the output transformer T1, capacitor C3, diode D1 and capacitor C6. When the oscillating current flowing through the inverter circuit I is then reversed in its flowing direction, a current flows through a path of the capacitor C3, primary winding n1 of the output transformer T1, capacitor C6 and transistor Q1, as shown in FIG. 75. At this time the current from the rectifier DB is stopped.

Figure 76:
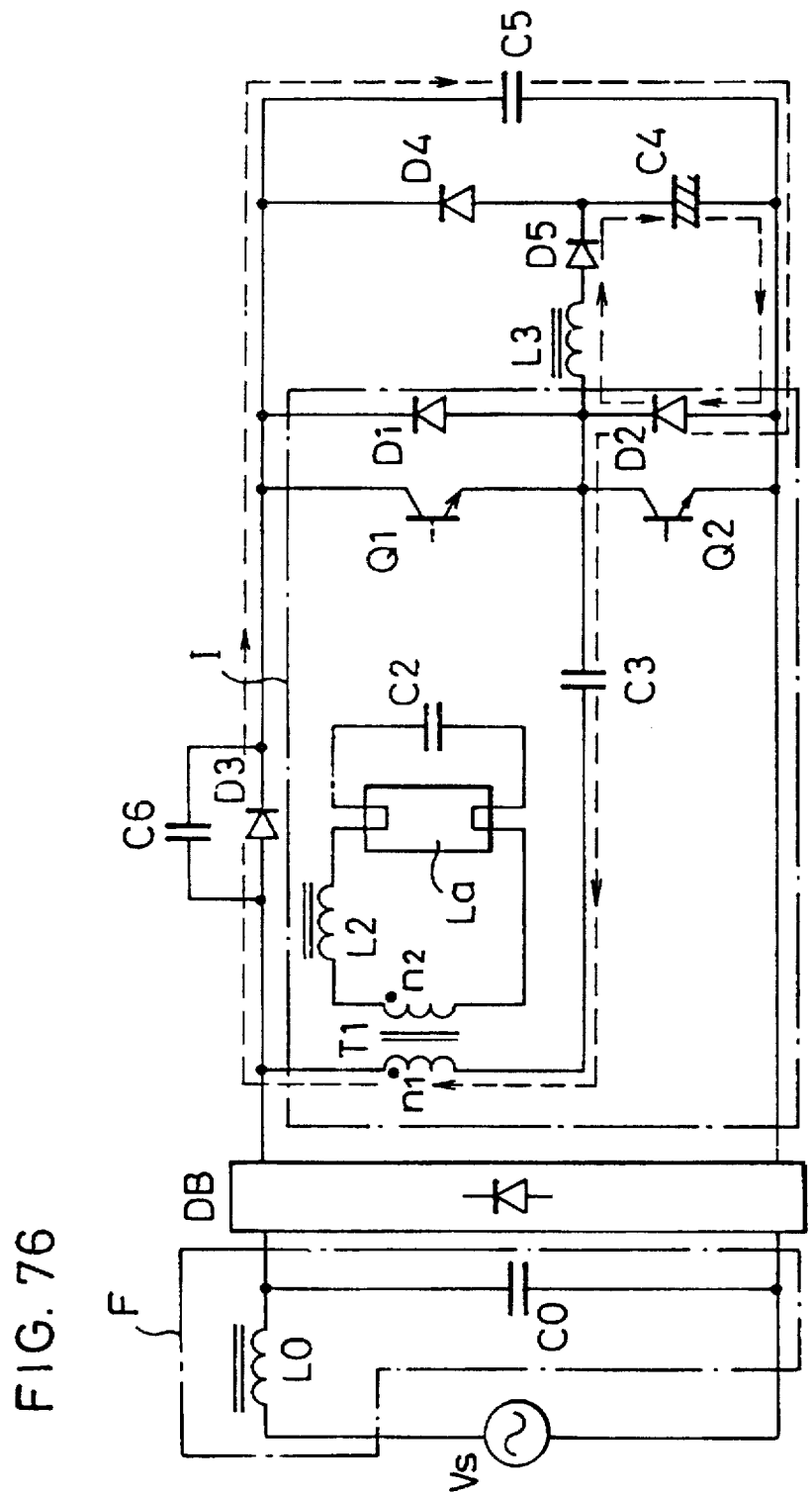
Figure 77:
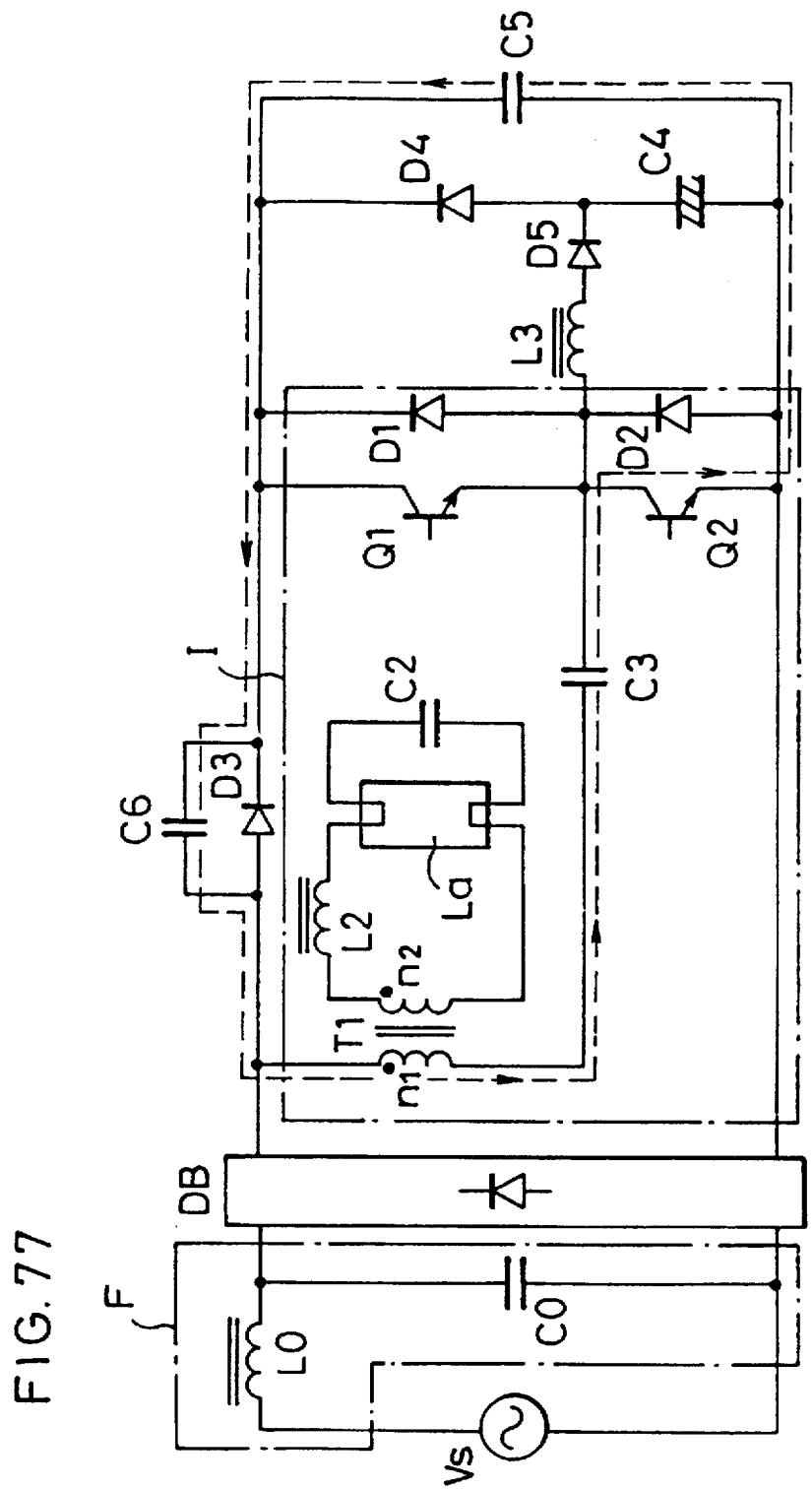
Figure 78:
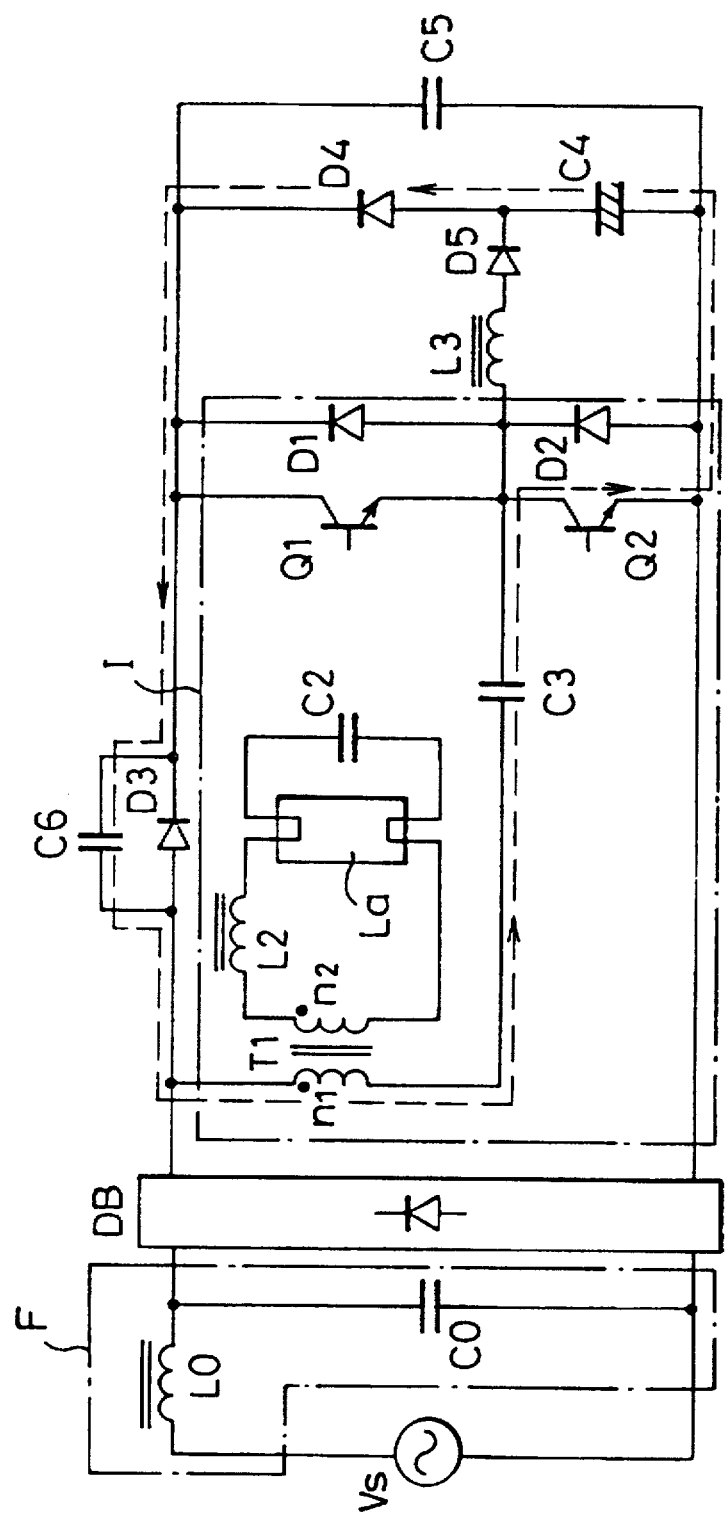

Thereafter, when the transistor Q1 is turned OFF and the transistor Q2 is turned ON, a current flows, as in the case of valley parts of the output voltage of the rectifier, through a path of the capacitor C3, primary winding n1 of the output transformer T1, diode D3, capacitor C5 and diode D2, as shown in FIG. 76. Further, when the oscillating current flowing through the inverter circuit I is reversed in its flowing direction, a current flows through a path of the capacitor C5, capacitor C6, primary winding n1 of the output transformer T1, capacitor C3 and transistor Q2 as shown in FIG. 77. When the voltage across the capacitor C5 drops to a level lower than the voltage across the series circuit of the capacitor C4 and diode D4, the discharging operation of the capacitor C4 starts and as shown in FIG. 78, a current flows through a path of the capacitor C4, diode D4, capacitor C6, primary winding n1 of the output transformer T1, capacitor C3 and transistor Q2.

Eventually, even in the present embodiment, there is a period during which the current flows from the rectifier DB at valley parts of the output voltage of the rectifier and the input current is supplied intermittently at a high frequency, whereby harmonics components in the input current can be reduced. With the arrangement of the present embodiment, an impedance element comprising the series circuit of the inductor L1 and smoothing capacitor C1 is not present but there exists such a time period that a current flows from the full-wave rectifier DB through the capacitor C5 at valley parts of the output voltage of the full-wave rectifier DB. whereby the current can be supplied through the capacitor C5 intermittently at a high frequency. The time period during which the current flows from the full-wave rectifier DB is shorter than that in the embodiment 8 at valley parts of the output voltage of the full-wave rectifier DB, so that the input current will not be stopped in the vicinity of zero-point positions in output voltage of the full-wave rectifier DB but can approach zero volts and thus the waveform of the input current can approach a sinusoidal waveform. Further, since no impedance element is present, the inverter device can be made much smaller in size. Other arrangement and operation are substantially the same as those of the embodiment 28.

(Embodiment 34)

Figure 79:
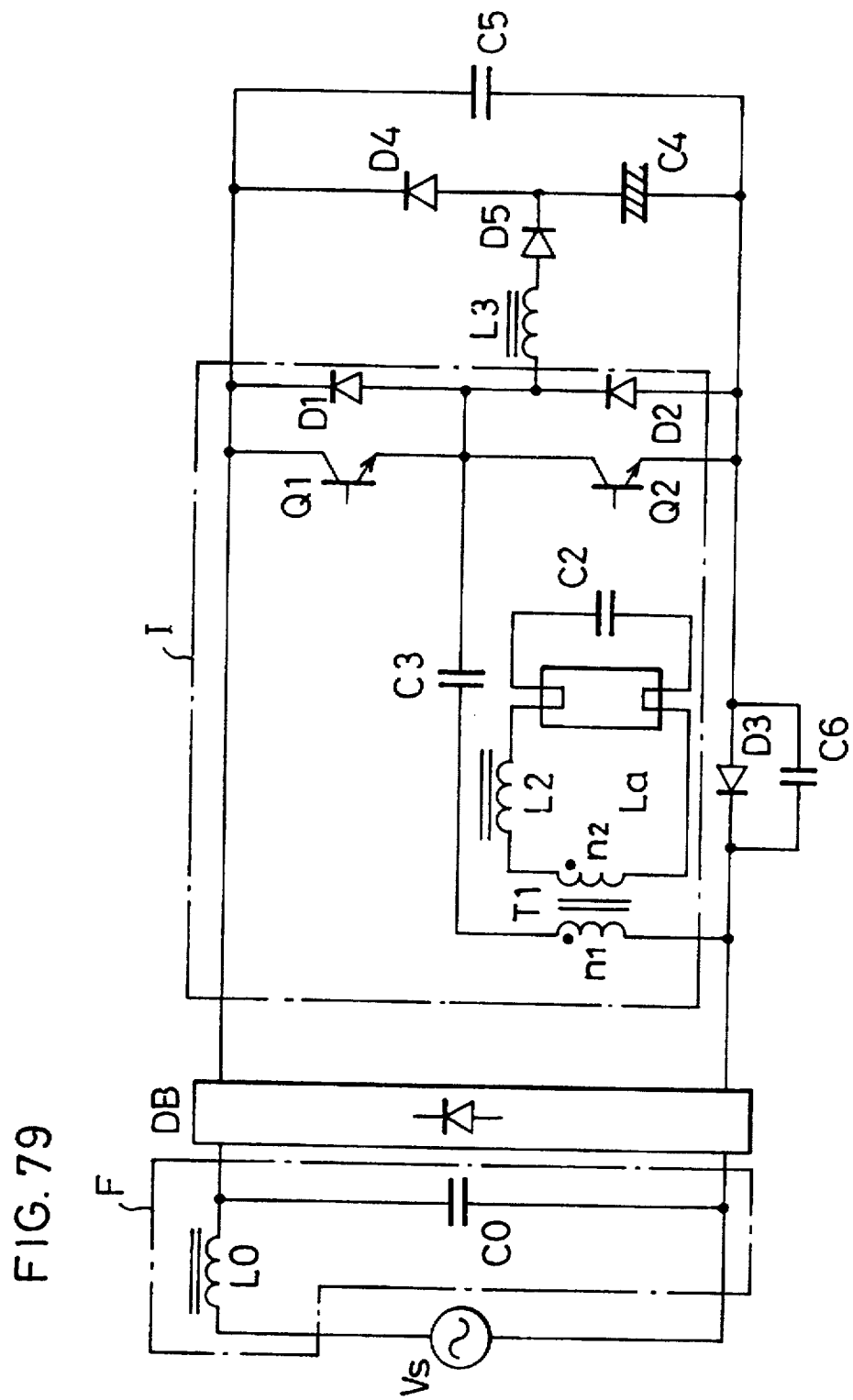
FIG. 79 is a circuit diagram in accordance with an embodiment 34 of the present invention.

Although the primary winding n1 of the transformer T1, diode D3 and capacitor C6 have been connected to positive one of the output ends of the full-wave rectifier DB in the inverter circuit I in the embodiment 33, the present embodiment has such an arrangement that these elements are connected to negative one of the output ends of the full-wave rectifier DB as shown in FIG. 79. The operation of the present embodiment is substantially the same as that of the embodiment 33.

In operation, the present embodiment has a function as a voltage step-down chopper circuit similar to the embodiment 33 at mountain parts of the output voltage of the full-wave rectifier DB, and the output voltage of the full-wave rectifier DB is used as the power supply of the inverter circuit I. The operation of the present embodiment at valley parts of the output voltage of the full-wave rectifier DB is substantially the same as that of the embodiment 33 but will be briefly explained. When the transistor Q1 is turned ON, a current flows through a path of the primary winding n1 of the transformer T1, capacitor C3, diode D1, capacitor C5 and capacitor C6. This current is for discharging the energy stored in the transformer T1 in the previous mode. When the oscillating current of the inverter circuit I is then inverted in its flowing direction, a current flows through a path of the capacitor C5, transistor Q1, capacitor C3, primary winding n1 of the transformer T1 and capacitor C6. Thereafter, when a voltage across the capacitor C5 becomes lower than a voltage across a series circuit of the capacitor C4 and diode D4, the discharging operation of the capacitor C4 causes a current to be supplied to the inverter circuit I through a path of the capacitor C4, diode D4, transistor Q1, capacitor C3, primary winding n1 of the transformer T1 and capacitor C6.

Next, when the transistor Q1 is turned OFF and the transistor Q2 is turned ON, the energy stored in the transformer T1 is discharged so that a current flows through a path of the primary winding n1 of the transformer T1, capacitor C6, diode D2 and capacitor C3 and a current also flows from the full-wave rectifier DB through the capacitor C5 and capacitor C6. Thereafter, the inversion of direction of the oscillating current of the inverter circuit I causes a current to flow through a path of the capacitor C3, transistor Q2, capacitor C6 and primary winding n1 of the transformer T1.

As a result, the current from the full-wave rectifier DB flows into the inverter circuit I only in single one of the 5 operational modes and the operation similar to that of the embodiment 33 enables the input current to be supplied intermittently at a high frequency and also enables the input current to have a sinusoidal waveform, thus reducing high frequency components. Other arrangement and operation are substantially the same as those of the embodiment 33.

What is claimed is:

1. An inverter device providing a high frequency output converted from DC obtained through rectification and smoothing of AC power, the inverter device comprising:

a rectifier for rectifying an AC voltage produced by an AC power source;

an inverter circuit receiving a DC output voltage of the rectifier and outputting a high frequency voltage;

a load circuit including a resonance inductor, a resonance capacitor, and a discharge lamp for receiving the high frequency voltage from the inverter circuit; and auxiliary power supply means including a smoothing capacitor connected between output ends of the rectifier for supplying a continuous current of a sufficient level to maintain the discharge lamp substantially lighted without need for retriggering the discharge lamp, wherein:

the auxiliary power supply means includes a series circuit of a first capacitor, a first forward diode, and a second capacitor, a first backward diode connected in parallel with a series circuit of the first capacitor and the first forward diode, and a second backward diode connected in parallel with a series circuit of the first forward diode and the second capacitor, the auxiliary power supply means being connected to an output of the rectifier through a parallel circuit of a second forward diode and a third capacitor, and including a fourth capacitor connected in parallel to the auxiliary power supply means; and the inverter circuit includes a series circuit of first and second switching elements connected in parallel with the auxiliary power supply means, diodes connected respectively to the first and second switching elements in inverse parallel relationship with the first and second switching elements, a series circuit of a DC blocking capacitor and a primary winding of a transformer connected between a cathode of the first diode and a junction of the first and second switching elements, a series circuit of a resonance inductor and a discharge lamp connected in parallel with a secondary winding of the transformer, a resonance capacitor connected between ends of the discharge lamp, and a bypass circuit forming part of DC/DC conversion means having a series circuit of an inductor and a capacitor connected between a junction of a series circuit of the DC blocking capacitor and a primary winding of the transformer and one of the output ends of the rectifier wherein the auxiliary power supply means supplies a DC voltage to the inverter circuit at a level below a predetermined value of a voltage of the AC power source.

2. An inverter device providing a high frequency output converted from DC obtained through rectification and smoothing of AC power, the inverter device comprising:

a rectifier for rectifying an AC voltage produced by an AC power source;

an inverter circuit receiving a DC output voltage of the rectifier and outputting a high frequency voltage;

a load circuit receiving the high frequency voltage from the inverter circuit; and auxiliary power supply means including a smoothing capacitor connected between output ends of the rectifier and for continuously supplying a current to a load circuit wherein the inverter circuit includes DC/DC conversion means for receiving the DC output voltage of the rectifier and receiving a pulsating current from the AC power source through substantially all of a half cycle of the AC voltage and for outputting a DC output voltage below a peak value of the output voltage of the rectifier, the inverter circuit also including DC/AC conversion means receiving the DC output voltage of the DC/DC conversion means and outputting the high frequency voltage, at least one switching element being common to the DC/DC conversion means and the DC/AC conversion means, and wherein the auxiliary power supply means supplies a DC voltage to the DC/AC conversion means at a level below a predetermined value of a voltage of the AC power source.

3. The inverter device as set forth in claim 2 comprising control means for changing at least one of pulse width and period of a drive signal for the first and second switching elements.

4. The inverter device as set forth in claim 2 wherein the auxiliary power supply means includes step-down chopper means sharing a switching element with the inverter circuit and wherein the auxiliary power supply means supplies a DC voltage to the inverter circuit at a level below a predetermined value of a voltage of the AC power source.

5. The inverter device as set forth in claim 4 wherein: the inverter circuit includes a series circuit of first and second switching elements connected between ends of the rectifier through a first diode;

the load circuit includes an oscillating circuit having a resonance inductor, a resonance capacitor, and a discharge lamp, connected in parallel with at least one of the switching elements, and a bypass circuit forming part of the DC/DC conversion means including magnetic and electrical impedance elements connected between part of the load circuit and the AC power source; and the auxiliary power supply means includes a series circuit of a backward diode and a smoothing capacitor connected in parallel to the first and second switching elements of the inverter circuit, and chopper means including a series circuit of a voltage dropping chopper inductor and a diode connected in a direction for charging the smoothing capacitor, connected between a junction of the first and second switching elements of the inverter circuit and a junction of the backward diode and the smoothing capacitor, the auxiliary power supply means supplying a DC voltage to the inverter circuit at the level below the predetermined value of a voltage of the AC power source.

6. The inverter device as set forth in claim 4 wherein:

the inverter circuit includes a series circuit of first and second switching elements connected between ends of the rectifier through a first diode;

the load circuit includes an oscillating circuit having a resonance inductor, a resonance capacitor, and a discharge lamp, connected in parallel with at least one of the switching elements, and a bypass circuit forming part of the DC/DC conversion means including magnetic and electrical impedance elements connected between part of the load circuit and an end of the rectifier; and the auxiliary power supply means includes a series circuit of a backward diode and a smoothing capacitor connected in parallel with the first and second switching elements of the inverter circuit, and chopper means including a series circuit of a voltage dropping chopper inductor and a diode connected in a direction for charging the smoothing capacitor, connected between a junction of the first and second switching elements of the inverter circuit and a junction of the backward diode and the smoothing capacitor, the auxiliary power supply means supplying a DC voltage to the inverter circuit at the level below the predetermined value of a voltage of the AC power source.

7. The inverter device as set forth in claim 6 comprising control means for suppressing flow of input current through the magnetic and electrical impedance elements of the bypass circuit when the input current flows through the oscillating circuit of the inverter circuit.

8. The inverter device as set forth in claim 6 comprising control means for stopping flow of input current through the magnetic and electrical impedance elements of the bypass circuit when the input current flows through the oscillating circuit of the inverter circuit.

9. The inverter device as set forth in claim 6 including a second diode inserted between one end of the rectifier and the first diode and wherein the bypass circuit is connected at one end to a junction of the first and second diodes.

10. An inverter device providing a high frequency output converted from DC obtained through rectification and smoothing of AC power, the inverter device comprising:

a rectifier for rectifying an AC voltage produced by an AC power source;

an inverter circuit receiving a DC output voltage of the rectifier and outputting a high frequency voltage;

a load circuit including a resonance inductor, a resonance capacitor, and a discharge lamp for receiving the high frequency voltage from the inverter circuit; and auxiliary power supply means including a smoothing capacitor connected between output ends of the rectifier for supplying a continuous current of a sufficient level to maintain the discharge lamp substantially lighted without need for retriggering the discharge lamp, wherein the inverter circuit includes DC/DC conversion means receiving the DC output voltage of the rectifier and receiving a pulsating current from the AC power source through substantially all of a half cycle of the AC voltage and for outputting a DC output voltage below a peak value of the output voltage of the rectifier, the inverter circuit also including DC/AC conversion means for receiving the DC output voltage of the DC/DC conversion means and outputting the high frequency voltage, at least one switching element being common to the DC/DC conversion means and the DC/AC conversion means, and wherein the auxiliary power supply means is arranged for charging in a series relationship and in a parallel relationship a plurality of capacitors through a plurality of diodes and for supplying a DC voltage to the DC/AC conversion means at a level below a predetermined value of a voltage of the AC power source.

11. The inverter device of claim 10 wherein a capacitor is connected in parallel with the auxiliary power supply means.

12. The inverter device as set forth in claim 10 wherein:

the auxiliary power supply means is connected to one of the output ends of the rectifier through a first diode;

the auxiliary power supply means comprises a series circuit of a first capacitor, a forward diode, and a first capacitor, a backward diode being connected in parallel with the first capacitor and the forward diode in the series circuit, and a second backward diode connected in parallel with the forward diode and the second capacitor in the series circuit; and the inverter circuit includes a series circuit of first and second switching elements connected between ends of the auxiliary power supply means, the load circuit including an oscillating circuit incorporating the resonance inductor, the resonance capacitor, and the discharge lamp, connected in parallel with one of the switching elements, and a bypass circuit forming part of the DC/DC conversion means and including an impedance element magnetically and electrically connected between part of the load circuit and one end of the AC power source, wherein the auxiliary power supply means supplies a DC voltage to the inverter circuit at a level below a predetermined value of a voltage of the AC power source.

13. The inverter device as set forth in claim 10 wherein:

the auxiliary power supply means is connected to an output end of the rectifier through a first diode;

the auxiliary power supply means includes a series circuit of a first capacitor, a first forward diode, and a second capacitor, a first backward diode connected in parallel with a series circuit of the first capacitor and a second forward diode and also includes a second backward diode connected in parallel to a series circuit of the first forward diode and the second capacitor;

the inverter circuit includes a series circuit of first and second switching elements connected between ends of the auxiliary power supply means; and the load circuit includes an oscillating circuit incorporating the resonance inductor, the resonance capacitor, and the discharge lamp, connected in parallel with at least one of the switching elements, and a bypass circuit forming part of the DC/DC conversion means and including an impedance element magnetically and electrically connected between part of the load circuit and one of the output ends of the rectifier, wherein the auxiliary power supply means supplies a DC voltage to the inverter circuit at a level below a predetermined value of a voltage of the AC power source.

14. The inverter device as set forth in claim 13 wherein the bypass circuit includes a primary winding connected between the AC power source and an anode of the first diode and a secondary winding in part of the load circuit, the primary and secondary windings being magnetically coupled to each other.

15. The inverter device as set forth in claim 13 wherein the bypass circuit includes a primary winding connected to one of the input and output ends of the rectifier and a secondary winding in part of the load circuit, the primary and secondary windings being magnetically coupled to each other.

16. The inverter device as set forth in claim 13 including a capacitor connected in parallel with the first diode.

17. The inverter device as set forth in claim 13 wherein the impedance element of the bypass circuit is also an oscillating element of the inverter circuit.

18. The inverter device as set forth in claim 13 comprising control means for suppressing flow of input current through the impedance element of the bypass circuit when the input current flows through the oscillating circuit of the inverter circuit.

19. The inverter device as set forth in claim 13 including a second diode inserted between one end of the rectifier and the first diode and wherein the bypass circuit is connected at one end to a junction of the first and second diodes.

20. The inverter device as set forth in claim 13 comprising control means for stopping flow of input current through the impedance element of the bypass circuit when the input current flows through the oscillating circuit of the inverter circuit.

21. The inverter device as set forth in claim 20 wherein the control means comprises means for changing at least one of pulse width and period of a drive signal for the first and second switching elements.

* * * * *